US012787111B2

(12) United States Patent
Zhou et al.

(10) Patent No.: US 12,787,111 B2
(45) Date of Patent: Nov. 3, 2026

(54) DISCONTINUOUS TRANSMISSION AND DISCONTINUOUS RECEPTION FOR ENERGY SAVING

(71) Applicant: Comcast Cable Communications, LLC, Philadelphia, PA (US)

(72) Inventors: Hua Zhou, Vienna, VA (US); Ali Cagatay Cirik, Chantilly, VA (US); Esmael Hejazi Dinan, McLean, VA (US); Mohammad Ghadir Khoshkholgh Dashtaki, Burnaby (CA); Kai Xu, Herndon, VA (US); Bing Hui, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 377 days.

(21) Appl. No.: 18/348,419

(22) Filed: Jul. 7, 2023

(65) Prior Publication Data

US 2025/0280466 A1 Sep. 4, 2025

Related U.S. Application Data

(60) Provisional application No. 63/359,041, filed on Jul. 7, 2022.

(51) Int. Cl.
*H04W 72/23* (2023.01)
*H04B 7/06* (2006.01)
(Continued)

(52) U.S. Cl.
CPC .......... *H04W 76/28* (2018.02); *H04B 7/0626* (2013.01); *H04W 52/0235* (2013.01); *H04W 72/232* (2023.01)

(58) Field of Classification Search
CPC ........... H04W 72/232; H04W 72/0446; H04W 76/28; H04W 36/0066; H04W 52/0235;
(Continued)

(56) References Cited

U.S. PATENT DOCUMENTS

| | | | |
|---|---|---|---|
| 11,191,071 | B2 | 11/2021 | Yi et al. |
| 11,229,022 | B2 | 1/2022 | Lin et al. |

(Continued)

FOREIGN PATENT DOCUMENTS

| | | | |
|---|---|---|---|
| EP | 3154308 | A1 | 4/2017 |
| WO | 2012092066 | A1 | 7/2012 |
| WO | 2021259343 | A1 | 12/2021 |

OTHER PUBLICATIONS

3GPP TR 36.887 V12.0.0 (Jun. 2014), 3rd Generation Partnership Project; Technical Specification Group Radio Access Network; Evolved Universal Terrestrial Radio Access Network (E-UTRAN); Study on energy saving enhancement for E-UTRAN (Release 12).

(Continued)

*Primary Examiner* — Wei Zhao
(74) *Attorney, Agent, or Firm* — Banner & Witcoff, Ltd.

(57) ABSTRACT

A base station may enable a power saving operation for a wireless device. The power saving operation may comprise a base station periodically operating a discontinuous transmission (DTX) mode, wherein at least one cell is in a power-on state for a first duration and in a power-off state for a second duration. Instead of following the same on/off durations of the at least one cell, the wireless device may operate a wireless device-specific discontinuous reception (DRX) mode, wherein the DRX on/off states may be implemented based on one or more messages indicating cell DTX configurations.

21 Claims, 49 Drawing Sheets

(51) Int. Cl.
*H04W 52/02* (2009.01)
*H04W 72/232* (2023.01)
*H04W 76/28* (2018.01)

(58) Field of Classification Search
CPC ............. H04W 52/0229; H04B 7/0626; H04B 7/062
See application file for complete search history.

(56) References Cited

U.S. PATENT DOCUMENTS

| | | | |
|---|---|---|---|
| 2011/0170466 | A1 | 7/2011 | Kwun |
| 2013/0128785 | A1 | 5/2013 | Guey et al. |
| 2014/0302855 | A1 | 10/2014 | Nory et al. |
| 2015/0009877 | A1 | 1/2015 | Chiang et al. |
| 2016/0174150 | A1 | 6/2016 | Comsa et al. |
| 2018/0279343 | A1 | 9/2018 | Zhou et al. |
| 2019/0174466 | A1* | 6/2019 | Zhang .................. H04L 5/0057 |
| 2020/0119800 | A1 | 4/2020 | Rune et al. |
| 2021/0258900 | A1 | 8/2021 | Park et al. |
| 2021/0336687 | A1 | 10/2021 | Pezeshki et al. |
| 2021/0385747 | A1 | 12/2021 | Prasad |
| 2025/0081101 | A1* | 3/2025 | Soldati .............. H04W 36/0066 |
| 2025/0203707 | A1* | 6/2025 | Tsai ...................... H04W 76/28 |
| 2025/0254617 | A1* | 8/2025 | Xu ........................ H04W 76/28 |

OTHER PUBLICATIONS

3GPP TR 36.927 V16.0.0 (Jul. 2020), 3rd Generation Partnership Project; Technical Specification Group Radio Access Network; Evolved Universal Terrestrial Radio Access (E-UTRA); Potential solutions for energy saving for E-UTRAN (Release 16).

3GPP TS 38.133 V17.4.0 (Dec. 2021), 3rd Generation Partnership Project; Technical Specification Group Radio Access Network; NR; Requirements for support of radio resource management (Release 17).

3GPP TS 38.211 V17.1.0 (Mar. 2022), 3rd Generation Partnership Project; Technical Specification Group Radio Access Network; NR; Physical channels and modulation (Release 17).

3GPP TS 38.212 V17.1.0 (Mar. 2022), 3rd Generation Partnership Project; Technical Specification Group Radio Access Network; NR; Multiplexing and channel coding (Release 17).

3GPP TS 38.213 V17.1.0 (Mar. 2022), 3rd Generation Partnership Project; Technical Specification Group Radio Access Network; NR; Physical layer procedures for control (Release 17).

3GPP TS 38.214 V17.1.0 (Mar. 2022) 3rd Generation Partnership Project; Technical Specification Group Radio Access Network; NR; Physical layer procedures for data (Release 17).

3GPP TS 38.215 V17.1.0 (Mar. 2022), 3rd Generation Partnership Project; Technical Specification Group Radio Access Network; NR; Physical layer measurements (Release 17).

3GPP TS 38.300 V16.7.0 (Sep. 2021), Technical Specification, 3rd Generation Partnership Project; Technical Specification Group Radio Access Network; NR; NR and NG-RAN Overall Description; Stage 2 (Release 16).

3GPP TS 38.321 V17.0.0 (Mar. 2022), 3rd Generation Partnership Project; Technical Specification Group Radio Access Network;NR;Medium Access Control (MAC) protocol specification (Release 17).

3GPP TS 38.331 V16.7.0 (Dec. 2021) 3rd Generation Partnership Project; Technical Specification Group Radio Access Network; NR; Radio Resource Control (RRC) protocol specification (Release 16).

R1-2203173 3GPP TSG RAN WG1 Meeting #109-e, e-Meeting, May 9-May 20, 2022, Source: Huawei, HiSilicon, Title: Discussion on network energy saving techniques.

R1-2203225 3GPP TSG RAN WG1 Meeting #109-e, e-Meeting, May 9-May 20, 2022, Source: Nokia, Nokia Shanghai Bell, Title: Network Energy Saving Techniques.

R1-2203342 3GPP TSG RAN WG1 Meeting #109-e, e-Meeting, May 9-May 20, 2022, Source: Spreadtrum Communications, Title: Discussion on network energy saving techniques.

R1-2203482 3GPP TSG RAN WG1 Meeting #109-e, e-Meeting, May 9-May 20, 2022, Source: CATT, Title: Network Energy Saving techniques in time, frequency, and spatial domain.

R1-2203576 3GPP TSG RAN WG1 Meeting #109-e, e-Meeting, May 9-May 20, 2022, Source: vivo, Title: Discussions on network energy saving techniques.

R1-2203604 3GPP TSG RAN WG1 Meeting #109-e, e-Meeting, May 9-May 20, 2022, Source: ZTE, Sanechips, Title: Discussion on NW energy saving techniques.

R1-2203636 3GPP TSG RAN WG1 Meeting #109-e, e-Meeting, May 9-May 20, 2022, Source: Fraunhofer IIS, Fraunhofer HHI, Title: On Network Energy Saving Techniques.

R1-2203663 3GPP TSG RAN WG1 Meeting #109-e, e-Meeting, May 9-May 20, 2022, Source: China Telecom, Title: Discussion on network energy saving techniques.

R1-2203831 3GPP TSG RAN WG1 Meeting #109-e, e-Meeting, May 9-May 20, 2022, Source: Xiaomi, Title: Discussions on performance evaluation of network energy saving.

R1-2203920 3GPP TSG RAN WG1 Meeting #109-e, e-Meeting, May 9-May 20, 2022, Source: Samsung, Title: Network energy saving techniques.

R1-2203936 3GPP TSG RAN WG1 Meeting #109-e, e-Meeting, May 9-May 20, 2022, Source: NEC, Title: Discussion on network energy saving techniques.

R1-2204010 3GPP TSG RAN WG1 Meeting #109-e, e-Meeting, May 9-May 20, 2022, Source: OPPO, Title: Study on network energy saving techniques.

R1-2204043 3GPP TSG RAN WG1 Meeting #109-e, e-Meeting, May 9-May 20, 2022, Source: CENC, Title: Discussion on network energy saving techniques.

R1-2204074 3GPP TSG RAN WG1 Meeting #109-e, e-Meeting, May 9-May 20, 2022, Source: Panasonic, Title: Discussion on potential network energy saving techniques.

R1-2204101 3GPP TSG RAN WG1 Meeting #109-e, e-Meeting, May 9-May 20, 2022, Source: Futurewei, Title: Potential enhancements for network energy saving.

R1-2204257 3GPP TSG RAN WG1 Meeting #109-e, e-Meeting, May 9-May 20, 2022, Source: Apple, Title: Discussion on Network energy saving techniques.

R1-2204319 3GPP TSG RAN WG1 Meeting #109-e, e-Meeting, May 9-May 20, 2022, Source: CMCC, Title: Discussion on network energy saving techniques.

R1-2204392 3GPP TSG RAN WG1 Meeting #109-e, e-Meeting, May 9-May 20, 2022, Source: NTT Docomo, Inc., Title: Discussion on NW energy saving techniques.

R1-2204424 3GPP TSG RAN WG1 Meeting #109-e, e-Meeting, May 9-May 20, 2022, Source: Lenovo, Title: Network energy saving techniques.

R1-2204443 3GPP TSG RAN WG1 Meeting #109-e, e-Meeting, May 9-May 20, 2022, Source: ITRI, Title: Study on potential L1 network energy saving techniques for NR.

R1-2204629 3GPP TSG RAN WG1 Meeting #109-e, e-Meeting, May 9-May 20, 2022, Source: LG Electronics, Title: Discussion on physical layer techniques for network energy savings.

R1-2204687 3GPP TSG RAN WG1 Meeting #109-e, e-Meeting, May 9-May 20, 2022, Source: MediaTek Inc., Title: Network energy saving techniques.

R1-2204756 3GPP TSG RAN WG1 Meeting #109-e, e-Meeting, May 9-May 20, 2022, Source: CEWiT, IIT-M, IIT-K, Reliance Jio, Saankhya Labs, Title: Network energy saving techniques.

R1-2204812 3GPP TSG RAN WG1 Meeting #109-e, e-Meeting, May 9-May 20, 2022, Source: Intel Corporation, Title: Discussion on Network Energy Saving Techniques.

R1-2204832 3GPP TSG RAN WG1 Meeting #109-e, e-Meeting, May 9-May 20, 2022, Source: InterDigital, Inc., Title: Potential techniques for network energy saving.

R1-2204882 3GPP TSG RAN WG1 Meeting #109-e, e-Meeting, May 9-May 20, 2022, Source: Ericsson, Title: Network energy saving techniques.

R1-2205046 3GPP TSG RAN WG1 Meeting #109-e, e-Meeting, May 9-May 20, 2022, Source: Qualcomm Incorporated, Title: Network energy saving techniques.

(56) References Cited

OTHER PUBLICATIONS

R1-2205070 3GPP TSG RAN WG1 Meeting #109-e, e-Meeting, May 9-May 20, 2022, Source: Rakuten Mobile Inc., Title: Potential Techniques of Network Energy Savings.
R1-2205141 3GPP TSG RAN WG1 Meeting #109-e, e-Meeting, May 9-May 20, 2022, Source: Moderator (Intel Corporation), Title: Summary #1 for email discussion on energy saving techniques of NW energy saving SI.
R1-2205533 3GPP TSG RAN WG1 Meeting #109-e, e-Meeting, May 9-May 20, 2022, Source: Moderator (Intel Corporation), Title: Summary #2 for email discussion on energy saving techniques of NW energy saving SI.
R3-212523 3GPP TSG-RAN WG3 Meeting #112-e, E-meeting, May 17-27, 2021, Source: Huawei, Title: Further discussions on detailed procedure and potential specification impacts of energy saving.
RP-211663 3GPP TSG RAN Meeting #93-e, Electronic Meeting, Sep. 13-17, 2021, Source: Huawei, HiSilicon, Title: Moderator's summary for discussion [RAN93e-R18Prep-13] Network energy savings.
RP-212669 3GPP TSG RAN Meeting #94-e, Electronic Meeting, Dec. 6-17, 2021, Source: Huawei, Title: Moderator's summary for [RAN94e-R18Prep-09] Network energy savings.
RP-212709 3GPP TSG RAN Meeting #94e, Electronic Meeting, Dec. 6-17, 2021, Source: Moderator (Huawei), Title: New study on network energy savings for 5G.
RWS-210064 3GPP TSG RAN Rel-18 workshop, Electronic Meeting, Jun. 28-Jul. 2, 2021, Source: Spreadtrum Communications, Title: UE power saving enhancements for R18.
RWS-210106 3GPP TSG RAN Rel-18 Workshop, Jun. 28-Jul. 2, 2021, Source: MediaTek Inc., Title: [x-area] System Energy Enhancements.
RWS-210110 3GPP TSG RAN Rel-18 Workshop, Electronic Meeting, Jun. 28-Jul. 2, 2021, Source: MediaTek Inc., Title: Draft WID: System Energy Efficiency Enhancements.
RWS-210118 RAN Rel-18 Workshop, Jun. 28-Jul. 2, 2021, Source: Nokia, Nokia Shanghai Bell, Title: Network Energy Efficiency in Rel-18.
RWS-210152 3GPP TSG RAN Rel-18 workshop, Electronic Meeting, Jun. 28-Jul. 2, 2021, Source: China Telecom, Title: Draft SID on NR network energy saving enhancement.
Jan. 2, 2024—European Search Report—EP App. No. 23184186.7.
RWS-210153 3GPP TSG RAN Rel-18 workshop, Electronic Meeting, Jun. 28-Jul. 2, 2021, Source: China Telecom, Title: NR network energy saving enhancement for Rel-18.
RWS-210168 3GPP TSG RAN Rel-18 workshop, Electronic Meeting, Jun. 28-Jul. 2, 2021, Source: vivo, Spreadtrum communications, Guangdong Genius, Title: Motivation for new study item on ultra-low power wake up signal in Rel-18.
RWS 210281 3GPP Rel-18 Workshop: 5G Advanced, Electronic Meeting, Jun. 28-Jul. 2, 2021, Source: LGU, Title: LG Uplus views on Rel-18 Non eMBB area.
RWS-210310 3GPP TSG RAN Rel-18 workshop, Electronic Meeting Jun. 28-Jul. 2, 2021, Source: Ericsson, Title: Motivation for Network Energy Saving in Rel-18.
RWS-210311 3GPP TSG RAN Rel-18 workshop, Electronic Meeting, Jun. 28-Jul. 2, 2021, Source: Ericsson, Title: New SID on NR Network Energy Saving.
RWS-210312 3GPP TSG RAN Rel-18 workshop, Electronic Meeting, Jun. 28-Jul. 2, 2021, Source: Ericsson, Title: Views on NR UE Power Saving in Rel-18.
RWS-210358 3GPP TSG RAN Rel-18 workshop, Electronic Meeting, Jun. 28-Jul. 2, 2021, Source: CMCC, Title: Network energy saving.
RWS-210363 3GPP TSG RAN Rel-18 workshop, Electronic Meeting, Jun. 28-Jul. 2, 2021, Title: KT's View on cross functionalities for Release-18.
RWS-210398 3GPP TSG RAN Rel-18 workshop, Electronic Meeting, Jun. 28-Jul. 2, 2021, Source: Lenovo, Motorola Mobility, Title: Network Power Savings in NR.
RWS-210415 3GPP TSG RAN Rel-18 workshop, Electronic Meeting, Jun. 28-Jul. 2, 2021, Source: CATT, Title: On energy saving in Rel-18.
RWS-210438 3GPP TSG RAN Meeting #92-e, Electronic Meeting, Jun. 28-Jul. 2, 2021, Source: Huawei, HiSilicon, Title: NR FR2 enhancements.
RWS-210447 3GPP TSG RAN Rel-18 workshop, Electronic Meeting, Jun. 28-Jul. 2, 2021, Source: Huawei, HiSilicon, Title: Network energy saving and green operation for NR.
RWS-210462 3GPP TSG RAN Rel-18 workshop, Electronic Meeting, Jun. 28-Jul. 2, 2021, Source: Vodafone, Title: Energy Efficiency Improvements.
RWS-210486 3GPP TSG RAN Rel-18 workshop, Electronic Meeting, Jun. 28-Jul. 2, 2021, Source: ZTE, Sanechips, Title: Discussion on network power saving for 5G Advanced.
Dec. 11, 2025—European Office Action—EP App. 23184186.7.

* cited by examiner

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 19

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 20

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 2_7 | Notifying Paging early indication and TRS availability indication for one or more UEs |
| 3_0 | Scheduling of NR sidelink in one cell |
| 3_1 | Scheduling of LTE sidelink in one cell |
| 4_0 | Schedulng of PDSCH with CRC scrambled by MCCH-RNTI/G-RNTI for broadcast |
| 4_1 | Schedulng of PDSCH with CRC scrambled by G-RNTI/G-CS-RNTI for multicast |
| 4_2 | Schedulng of PDSCH with CRC scrambled by G-RNTI/G-CS-RNTI for multicast |

FIG. 23

```
MIB ::=                        SEQUENCE {
   systemFrameNumber               BIT STRING (SIZE (6)),
   subCarrierSpacingCommon           ENUMERATED {scs15or60, scs30or120},
   ssb-SubcarrierOffset            INTEGER (0..15),
   dmrs-TypeA-Position              ENUMERATED {pos2, pos3},
   pdcch-ConfigSIB1                PDCCH-ConfigSIB1,
   cellBarred                    ENUMERATED {barred, notBarred},
   intraFreqReselection             ENUMERATED {allowed, notAllowed},
   spare                       BIT STRING (SIZE (1))}

PDCCH-ConfigSIB1 ::=            SEQUENCE {
   controlResourceSetZero          ControlResourceSetZero,
   searchSpaceZero                SearchSpaceZero}
```

FIG. 24A

| Index | SS/PBCH block and CORESET multiplexing pattern | Number of RBs per coreset | Number of Symbols per coreset | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| ... | ... | ... | ... | ... |

FIG. 24B

| Index | *O* | Number of search space sets per slot | *M* | First symbol index |
|---|---|---|---|---|
| 0 | 0 | 1 | 1 | 0 |
| 1 | 0 | 2 | 1/2 | {0, if *i* is even}, {*N*, if is odd} |
| 2 | 2 | 1 | 1 | 0 |
| 3 | 2 | 2 | 1/2 | {0, if *i* is even}, {*N*, if *i* is odd} |
| 4 | 5 | 1 | 1 | 0 |
| 5 | 5 | 2 | 1/2 | {0, if *i* is even}, *N*, if *i* is odd |
| 6 | 7 | 1 | 1 | 0 |
| 7 | 7 | 2 | 1/2 | {0, if *i* is even}, {*N*, if *i* is odd} |
| ... | ... | ... | ... | ... |

FIG. 24C

```
SIB1 ::=       SEQUENCE {
   cellSelectionInfo              SEQUENCE {
      q-RxLevMin                     Q-RxLevMin,
      q-RxLevMinOffset                 INTEGER (1..8) ...}
   cellAccessRelatedInfo           CellAccessRelatedInfo,
   connEstFailureControl           ConnEstFailureControl
   si-SchedulingInfo              SI-SchedulingInfo
   servingCellConfigCommon            ServingCellConfigCommonSIB
   ims-EmergencySupport             ENUMERATED {true}
   eCallOverIMS-Support            ENUMERATED {true}
   ue-TimersAndConstants            UE-TimersAndConstants
   uac-BarringInfo                SEQUENCE {...}
   useFullResumeID                 ENUMERATED {true}
   lateNonCriticalExtension         OCTET STRING
   nonCriticalExtension            SIB1-v16xy-IEs  }

ServingCellConfigCommonSIB ::=     SEQUENCE {
   downlinkConfigCommon              DownlinkConfigCommonSIB,
   uplinkConfigCommon              UplinkConfigCommonSIB
   supplementaryUplink            UplinkConfigCommonSIB
   n-TimingAdvanceOffset            ENUMERATED { n0, n25600, n39936 }
   ssb-PositionsInBurst           SEQUENCE {
      inOneGroup                  BIT STRING (SIZE (8)),
      groupPresence                BIT STRING (SIZE (8)) },
   ssb-PeriodicityServingCell       ENUMERATED {ms5, ms10, ms20, ms40, ms80, ms160},
   tdd-UL-DL-ConfigurationCommon      TDD-UL-DL-ConfigCommon
   ss-PBCH-BlockPower               INTEGER (-60..50),
   ...,}

DownlinkConfigCommonSIB ::=    SEQUENCE {
   frequencyInfoDL              FrequencyInfoDL-SIB,
   initialDownlinkBWP            BWP-DownlinkCommon,
   bcch-Config                  BCCH-Config,
   pcch-Config                  PCCH-Config,  ...}

PCCH-Config ::=          SEQUENCE {
   defaultPagingCycle            PagingCycle,
   nAndPagingFrameOffset             CHOICE {
      oneT                        NULL,
      halfT                      INTEGER (0..1), ...},
   ns                     ENUMERATED {four, two, one},
   firstPDCCH-MonitoringOccasionOfPO   CHOICE {
      sCS15KHZoneT       SEQUENCE (SIZE (1..maxPO-perPF)) OF INTEGER (0..139),...}
   ...,
   [[   nrofPDCCH-MonitoringOccasionPerSSB-InPO-r16  INTEGER (2..4)  ]]
```

FIG. 25

```
BWP-DownlinkCommon ::=          SEQUENCE {
   genericParameters            BWP,
   pdcch-ConfigCommon              SetupRelease { PDCCH-ConfigCommon }
   pdsch-ConfigCommon              SetupRelease { PDSCH-ConfigCommon }
   ...}
PDCCH-ConfigCommon ::=          SEQUENCE {
   controlResourceSetZero         ControlResourceSetZero
   commonControlResourceSet          ControlResourceSet
   searchSpaceZero              SearchSpaceZero
   commonSearchSpaceList            SEQUENCE (SIZE(1..4)) OF SearchSpace
   searchSpaceSIB1              SearchSpaceId
   searchSpaceOtherSystemInformation  SearchSpaceId
   pagingSearchSpace              SearchSpaceId
   ra-SearchSpace               SearchSpaceId
    [[
   firstPDCCH-MonitoringOccasionOfPO   CHOICE {
      sCS15KHZoneT    SEQUENCE (SIZE (1..maxPO-perPF)) OF INTEGER (0..139),
      ...
   }OPTIONAL    -- Cond OtherBWP
    ]]
   ...,}
PDCCH-ServingCellConfig ::=       SEQUENCE {
   slotFormatIndicator             SetupRelease { SlotFormatIndicator }...,
   [[
   availabilityIndicator-r16        SetupRelease {AvailabilityIndicator-r16}
   searchSpaceSwitchTimer-r16         INTEGER (1..80)
   ]]
}

SearchSpaceSwitchConfig-r16 ::=    SEQUENCE {
   cellGroupsForSwitchList-r16       SEQUENCE(SIZE (1..4)) OF CellGroupForSwitch-r16
   searchSpaceSwitchDelay-r16         INTEGER (10..52)
}
CellGroupForSwitch-r16 ::= SEQUENCE(SIZE (1..16)) OF ServCellIndex

ControlResourceSet ::=          SEQUENCE {
   controlResourceSetId            ControlResourceSetId,
   frequencyDomainResources          BIT STRING (SIZE (45)),
   duration                   INTEGER (1..maxCoReSetDuration),
   cce-REG-MappingType             CHOICE {
      interleaved                SEQUENCE {
         reg-BundleSize               ENUMERATED {n2, n3, n6},
         interleaverSize             ENUMERATED {n2, n3, n6},
         shiftIndex               INTEGER(0..maxNrofPhysicalResourceBlocks-1)},
      nonInterleaved               NULL},
   precoderGranularity            ENUMERATED {sameAsREG-bundle, allContiguousRBs},
   pdcch-DMRS-ScramblingID              INTEGER (0..65535)
   ...,  }
```

FIG. 26

```
SearchSpace ::=                    SEQUENCE {
  searchSpaceId                      SearchSpaceId,
  controlResourceSetId                 ControlResourceSetId
  monitoringSlotPeriodicityAndOffset     CHOICE {
    sl1                              NULL,
    sl2                              INTEGER (0..1),...}
  duration                          INTEGER (2..2559)
  monitoringSymbolsWithinSlot           BIT STRING (SIZE (14))
  nrofCandidates                     SEQUENCE {
    aggregationLevel1                   ENUMERATED {n0, n1, n2, ... n8},
    aggregationLevel2                   ENUMERATED {n0, n1, n2, ... n8},
    ...}
  searchSpaceType                     CHOICE {
    common                           SEQUENCE {
      dci-Format0-0-AndFormat1-0            SEQUENCE {...}
      dci-Format2-0                    SEQUENCE {
        nrofCandidates-SFI                SEQUENCE {
          aggregationLevel1                 ENUMERATED {n1, n2}
          aggregationLevel2                 ENUMERATED {n1, n2}...},
        ...}
      dci-Format2-1                    SEQUENCE {...}
...
    },
    ue-Specific                       SEQUENCE {
      dci-Formats       ENUMERATED {formats0-0-And-1-0, formats0-1-And-1-1},
      ...,}
  }
}

SearchSpaceExt-r16 ::=               SEQUENCE {
  controlResourceSetId-r16             ControlResourceSetId-r16
  searchSpaceType-r16                 SEQUENCE {
    common-r16                       SEQUENCE {
      dci-Format2-4-r16                 SEQUENCE {
        nrofCandidates-CI-r16                SEQUENCE {
          aggregationLevel1-r16               ENUMERATED {n1, n2}...},...}
      dci-Format2-5-r16                 SEQUENCE {
        nrofCandidates-IAB-r16               SEQUENCE {
          aggregationLevel1-r16               ENUMERATED {n1, n2}...},...}
      dci-Format2-6-r16                 SEQUENCE {...}
      ...}
  }
  searchSpaceGroupIdList-r16          SEQUENCE (SIZE (1.. 2)) OF INTEGER (0..1)
  freqMonitorLocations-r16                BIT STRING (SIZE (5))
}

SearchSpaceSwitchTrigger-r16 ::=   SEQUENCE {
  servingCellId-r16             ServCellIndex,
  positionInDCI-r16
INTEGER(0..maxSFI-DCI-PayloadSize-1)
}
```

FIG. 27

| SCS | OFDM starting Symbols of the candidate SSBs | fc<=3GHz, Lmax=4 | 3GHz<fc<=6GHz, Lmax=8 | fc>6GHz, Lmax=64 |
|---|---|---|---|---|
| CaseA: 15 KHz | {2,8}+14n | n=0,1 | n=0,1,2,3 | Not Applicable (NA) |
| CaseB: 30 KHz | {4,8,16,20}+28n | n=0 | n=0,1 | NA |
| CaseC: 30 KHz | {2,8}+14n | n=0,1 | n=0,1,2,3 | NA |
| CaseD: 120 KHz | {4,8,16,20}+28n | NA | NA | n=0,1,2,3,5,6,7,8,10,11,12,13,15,16,17,18 |
| CaseE: 240 KHz | {8,12,16,20,32,36,40,44} + 56n | NA | NA | n=0,1,2,3,5,6,7,8 |

FIG. 34

DISCONTINUOUS TRANSMISSION AND DISCONTINUOUS RECEPTION FOR ENERGY SAVING

CROSS-REFERENCE TO RELATED APPLICATIONS

This application claims the benefit of U.S. Provisional Application No. 63/359,041 filed on Jul. 7, 2022. The above referenced application is hereby incorporated by reference in its entirety.

BACKGROUND

In wireless communication systems, a base station sends downlink signals that are monitored and measured by a wireless device. The wireless device performs signal reception and transmission based on the measurements. For wireless device discontinuous reception (U-DRX), a downlink channel is monitored during a DRX on duration, and the downlink channel is not monitored during a DRX off duration. For cell discontinuous transmission (C-DTX), downlink signals are received and/or uplink signals are sent during a DTX on duration, and downlink signals are not received and/or uplink signals are not sent during a DTX off duration.

SUMMARY

The following summary presents a simplified summary of certain features. The summary is not an extensive overview and is not intended to identify key or critical elements.

Wireless communications may implement power saving operations. A base station may enable a power saving operation for a wireless device. A power saving operation may comprise a base station periodically operating a discontinuous transmission (DTX) mode, wherein at least one cell is in a power-on state for a first time duration and in a power-off state for a second time duration. Wireless devices may operate discontinuous reception (DRX) modes using the same on/off pattern as the base station DTX mode. Wireless device power consumption may be increased if a wireless device operates a DRX mode using the same on/off pattern as the base station DTX mode and if the wireless device has transmission and/or bandwidth requirements different from the DTX durations. For example, a wireless device may not need to be in a DRX on state for the same duration as its corresponding cell(s) is (are) in a power-on state. Rather than using the same on/off pattern as a base station DTX mode, wireless-device specific DRX operation may be implemented, such as by enabling/disabling DRX for a wireless device based on one or more messages indicating DTX configurations.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 19 shows example logical channel identifier (LCID) values.

FIG. 20 shows example LCID values.

FIG. 23 shows examples of various downlink control information (DCI) formats.

FIG. 24A shows an example master information block (MIB) message.

FIG. 24B shows an example configuration of a CORESET.

FIG. 24C shows an example of configuration of a search space.

FIG. 25 shows an example of a system information block (SIB).

FIG. 26 shows example RRC configuration parameters.

FIG. 27 shows an example configuration of a search space.

FIG. 34 shows an example of synchronization signal block (SSB) configurations.

DETAILED DESCRIPTION

Figure 1A:
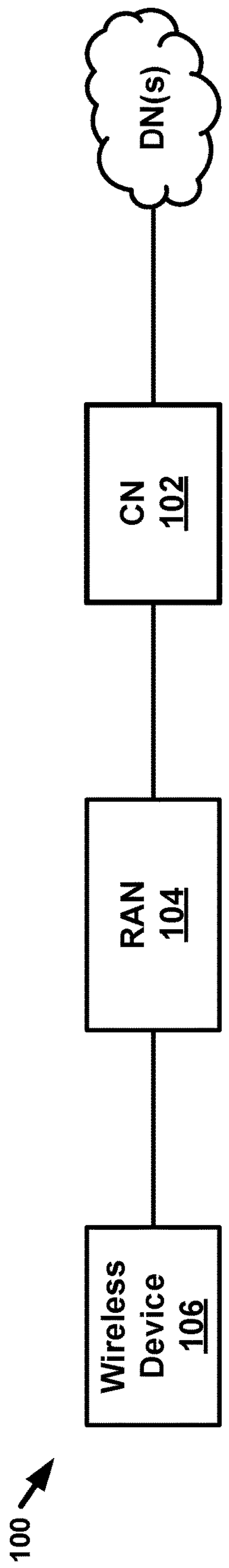
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to signaling for resource conservation.

FIG. 1A shows an example communication network 100. The communication network 100 may comprise a mobile communication network. The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with the one or more DNs 108, such as public DNS (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over/via an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a Generation Node B (gNB), an Next Generation Evolved Node B (ng-eNB), a relay node (e.g., an integrated access and backhaul (IAB) node), a donor node (e.g., a donor eNB, a donor gNB, etc.), an access point (AP) (e.g., a Wi-Fi access point), a transmission and reception point (TRP), a computing device, a device capable of wirelessly communicating, or any other device capable of sending and/or receiving signals. A base station may comprise one or more of the elements listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an eNB (e.g., associated with Evolved-Universal Terrestrial Radio Access (E-UTRA) and/or fourth-generation (4G)

standards), a remote radio head (RRH), a baseband processing unit coupled to one or more RRHs, a repeater node or relay node used to extend the coverage area of a donor node, a ng-eNB, a gNB (e.g., associated with New Radio (NR) and/or fifth-generation (5G) standards), an AP (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an AP, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
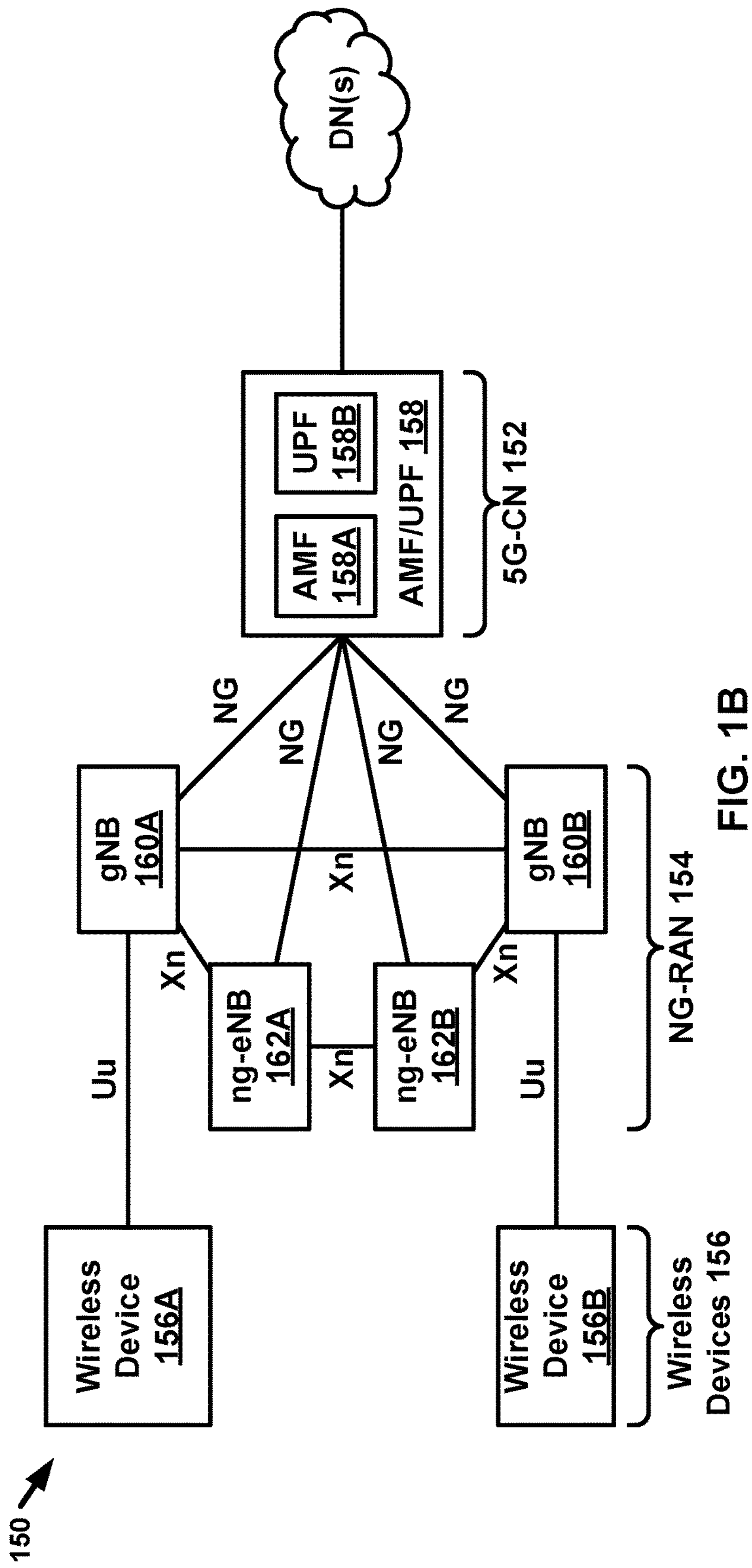

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to the one or more DNs 170. The wireless device(s) 156 may communicate with the one or more DNs 170, such as public DNS (e.g., the Internet), private DNs, and/or intra-operator DNs. As part of the interface functionality, the CN 152 (e.g., 5G-CN) may set up end-to-end connections between the wireless device(s) 156 and the one or more DNs 170, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G-CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between the RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QOS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs 170, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng-eNBs comprising an ng-eNB 162A and an ng-eNB 162B (collectively ng-eNBs 162)). The RAN 154 may comprise one or more of any quantity of types of base station. The gNBs 160 and/or ng-eNBs 162 may be referred to as base stations. The base stations (e.g., the gNBs 160 and/or ng-eNBs 162) may comprise one or more sets of antennas for communicating with the wireless device(s) 156 wirelessly (e.g., an over an air interface). One or more base stations (e.g., the gNBs 160 and/or the ng-eNBs 162) may comprise multiple sets of antennas to respectively control multiple cells (or sectors). The cells of the base stations (e.g., the gNBs 160 and/or the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G-CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide E-UTRA user plane and control plane protocol terminations towards the wireless device(s) 156 via a Uu interface (e.g., where E-UTRA may refer to the 3GPP 4G radio-access technology). A base station (e.g., the ng-eNB 162B) may provide E-UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, IoT devices, hotspots, cellular repeaters, computing devices, and/or, more generally, UE. Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
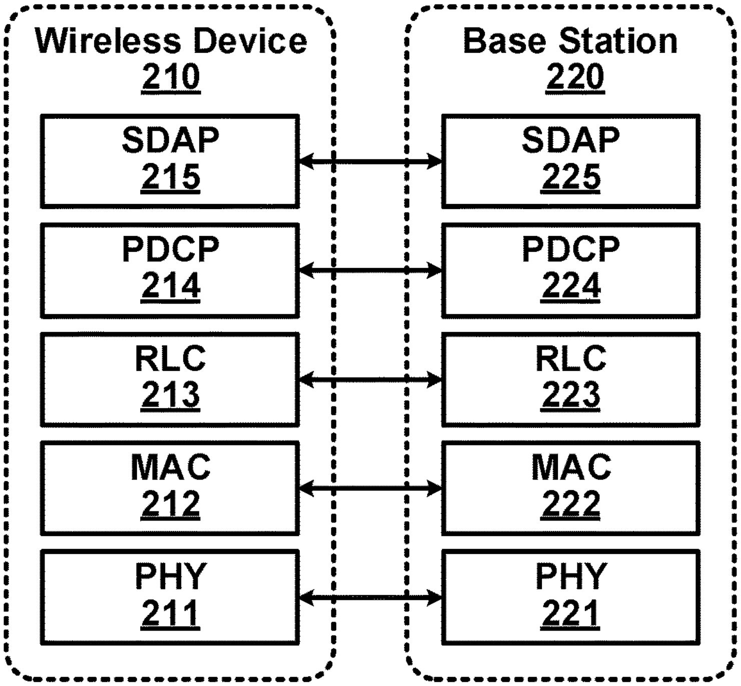
FIG. 2A shows an example user plane.
Figure 2B:
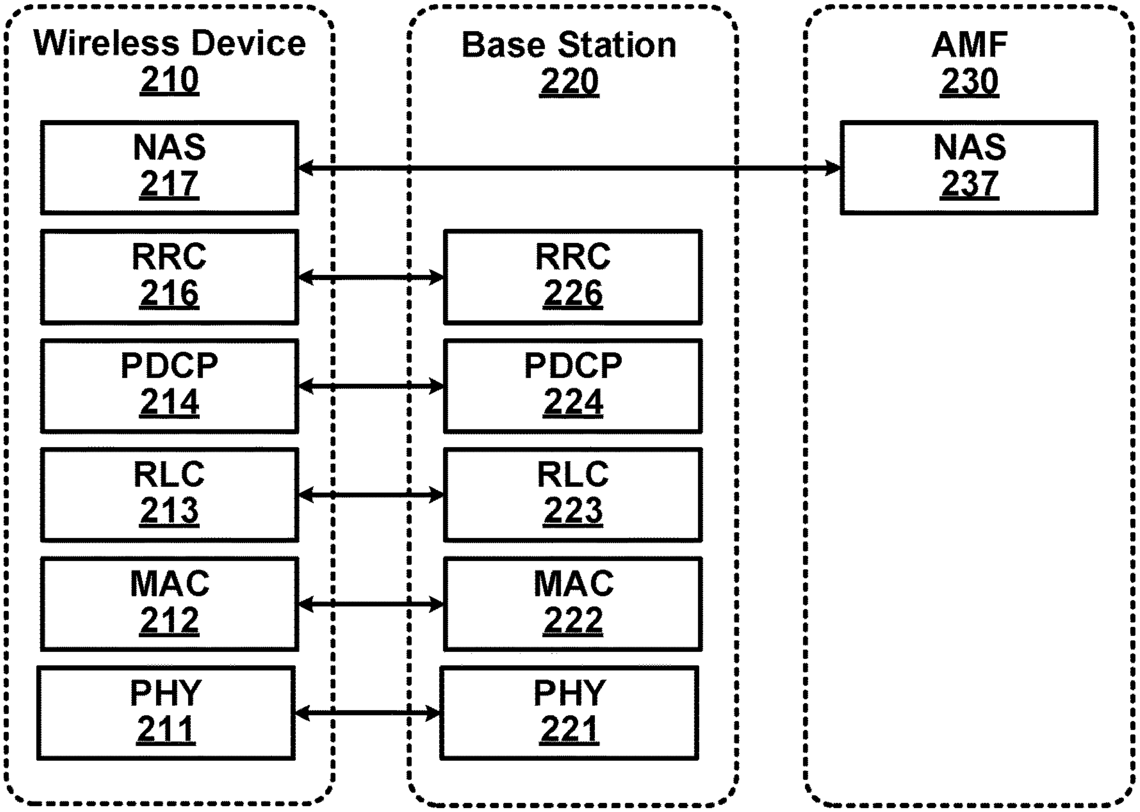
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configurations and/or the control plane configurations may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
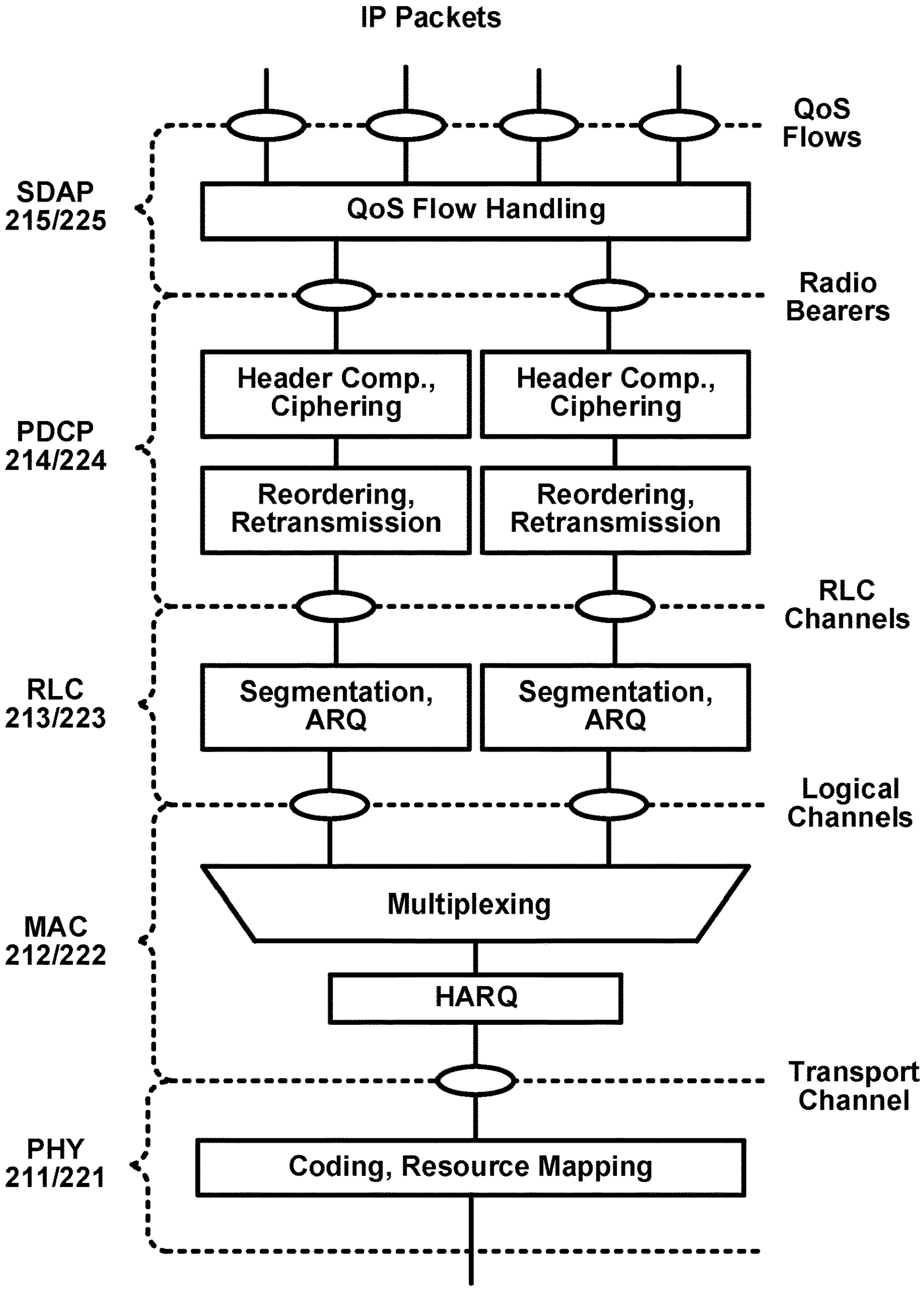
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform QoS flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows 310 of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted (e.g., sent) over the air interface, ciphering/deciphering to prevent unauthorized decoding of data transmitted (e.g., sent) over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers (e.g., RLCs 213 and 223) may perform one or more of the noted functions, for example, based on the transmission mode the RLC layer (e.g., RLCs 213 and 223) is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels 330 as a service to the PDCP layers (e.g., PDCPs 214 and 224, respectively), such as shown in FIG. 3.

The MAC layers (e.g., MACs 212 and 222) may perform multiplexing/demultiplexing of logical channels 340 and/or mapping between logical channels 340 and transport channels 350. The multiplexing/demultiplexing may comprise multiplexing/demultiplexing of data units/data portions, belonging to the one or more logical channels 340, into/from Transport Blocks (TBs) delivered to/from PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels 340 of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels 350 to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4A:
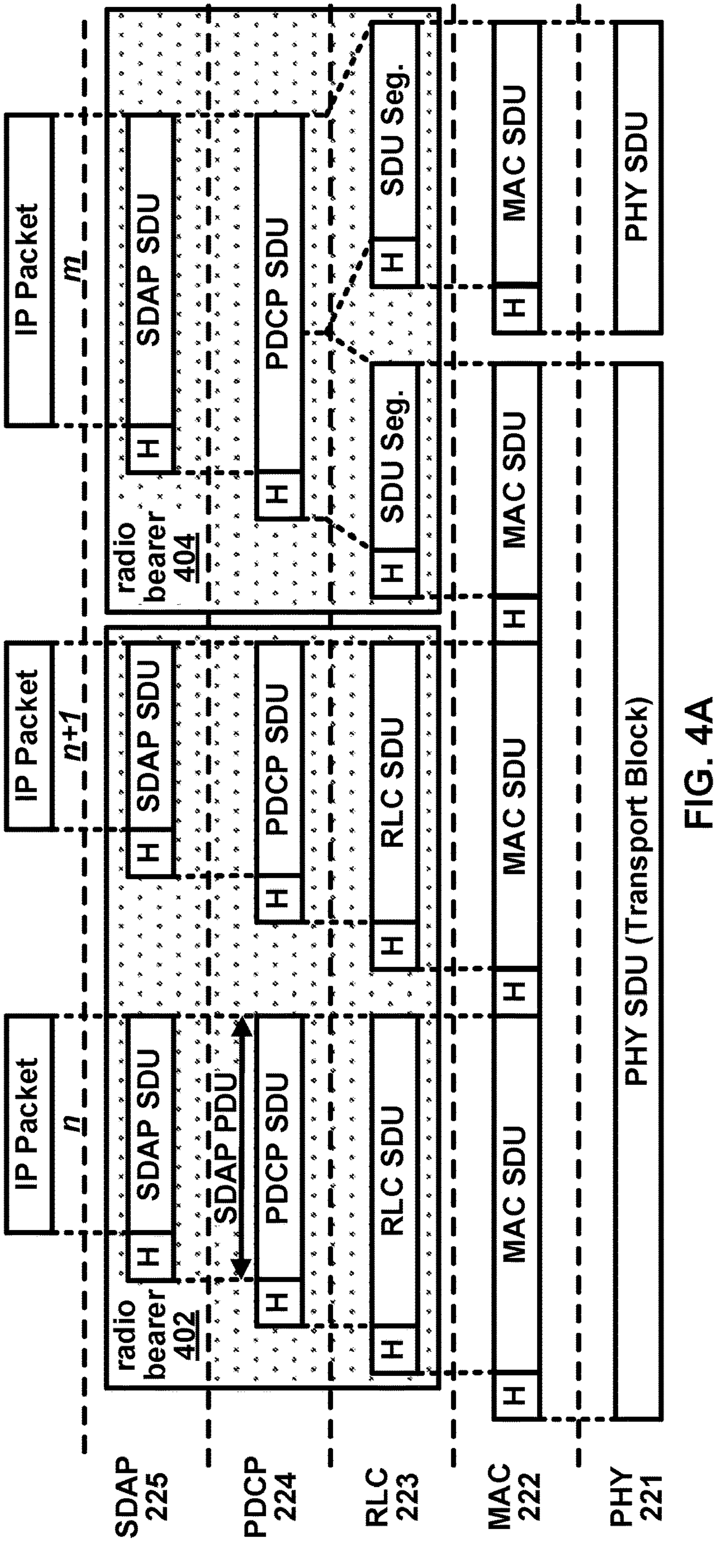
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration) . The NR MAC PDU structure may reduce a processing time and/or associated latency, for example, if the MAC PDU subheaders are computed before assembling the full MAC PDU.

Figure 4B:
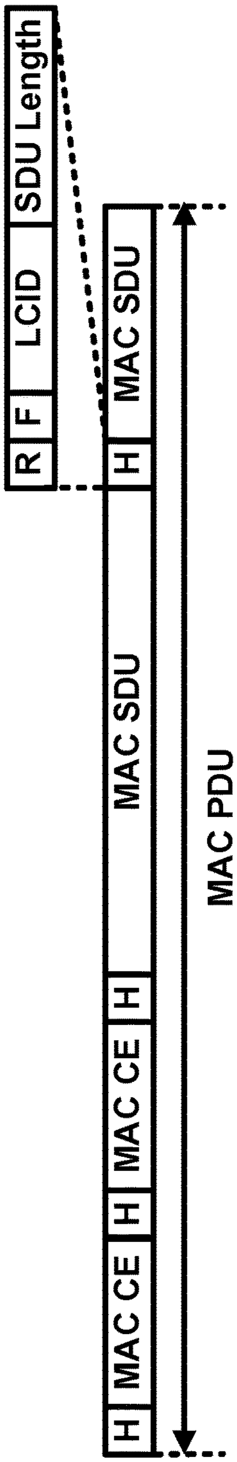
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 212 or MAC 222. As shown in FIG. 4B, two MAC CEs may be inserted into/added to the MAC PDU. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figure 5B:
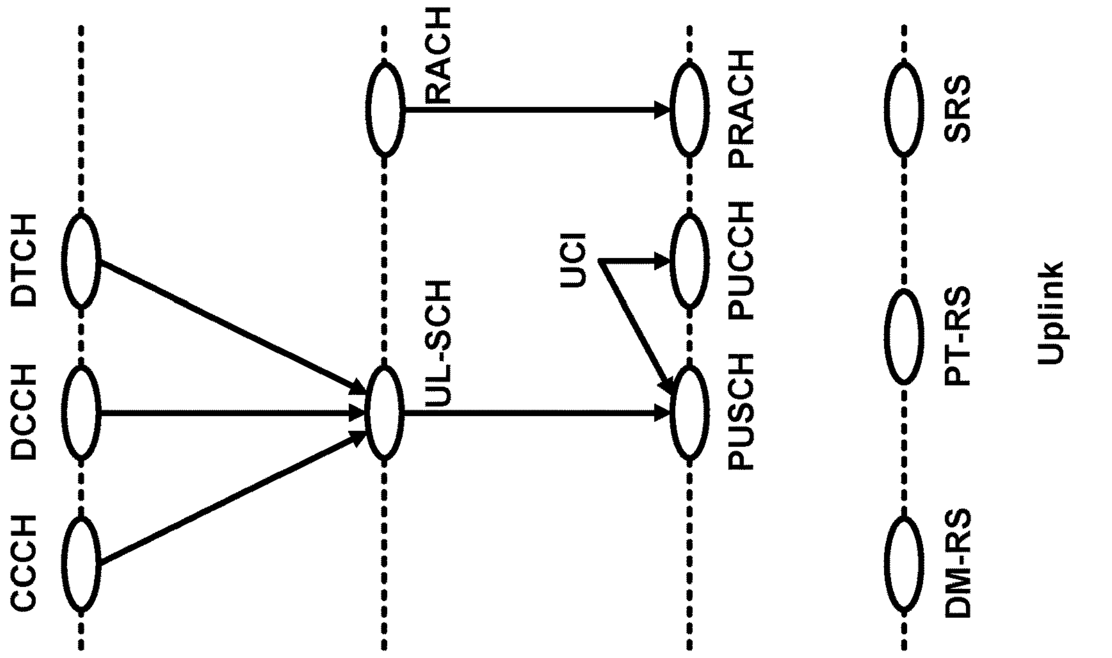
FIG. 5B shows an example mapping for uplink channels.
Figure 5A:
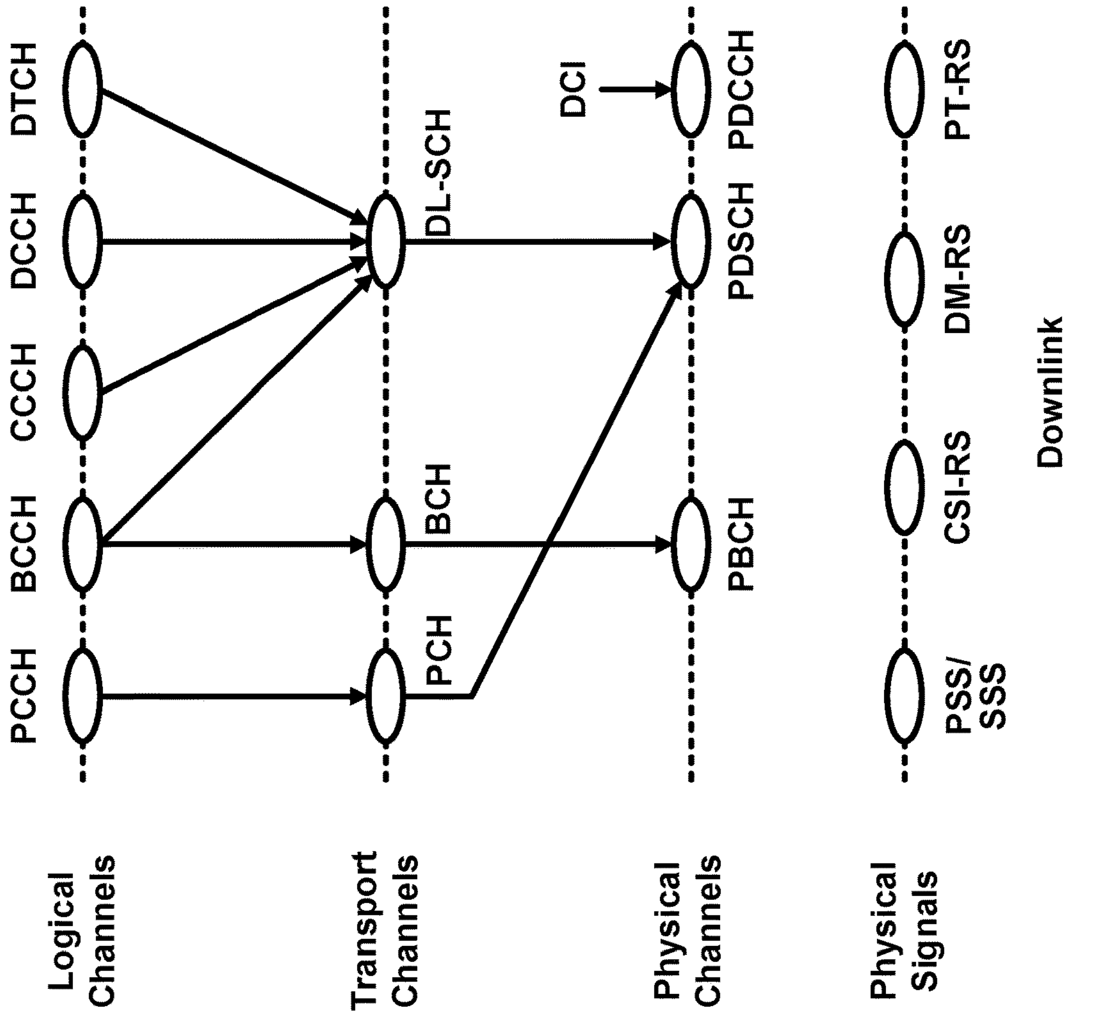
FIG. 5A shows an example mapping for downlink channels.

FIG. 5A shows an example mapping for downlink channels. The mapping for downlink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless devices).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may comprise an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The PHY layer may generate physical signals to support the low-level operation of the PHY layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), SRS, phase-tracking reference signals (PT RS), and/or any other signals.

One or more of the channels (e.g., logical channels, transport channels, physical channels, etc.) may be used to carry out functions associated with the control plane protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHYs 211 and 221, MACs 212 and 222, RLCs 213 and 223, and PDCPs 214 and 224) as the example user plane configuration (e.g., the NR user plane protocol stack). Similar four protocol layers may comprise the PHYS 211 and 221, the MACs 212 and 222, the RLCs 213 and 223, and the PDCPs 214 and 224. The control plane configuration (e.g., the NR control plane protocol stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and substantially the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting and control of the reporting; detection of and recovery from radio link failure (RLF); and/or NAS message transfer. As part of establishing an RRC connection, the RRC layers 216 and 226 may establish an RRC context, which may involve configuring parameters for communication between the wireless device 210 and the RAN (e.g., the base station 220).

Figure 6:
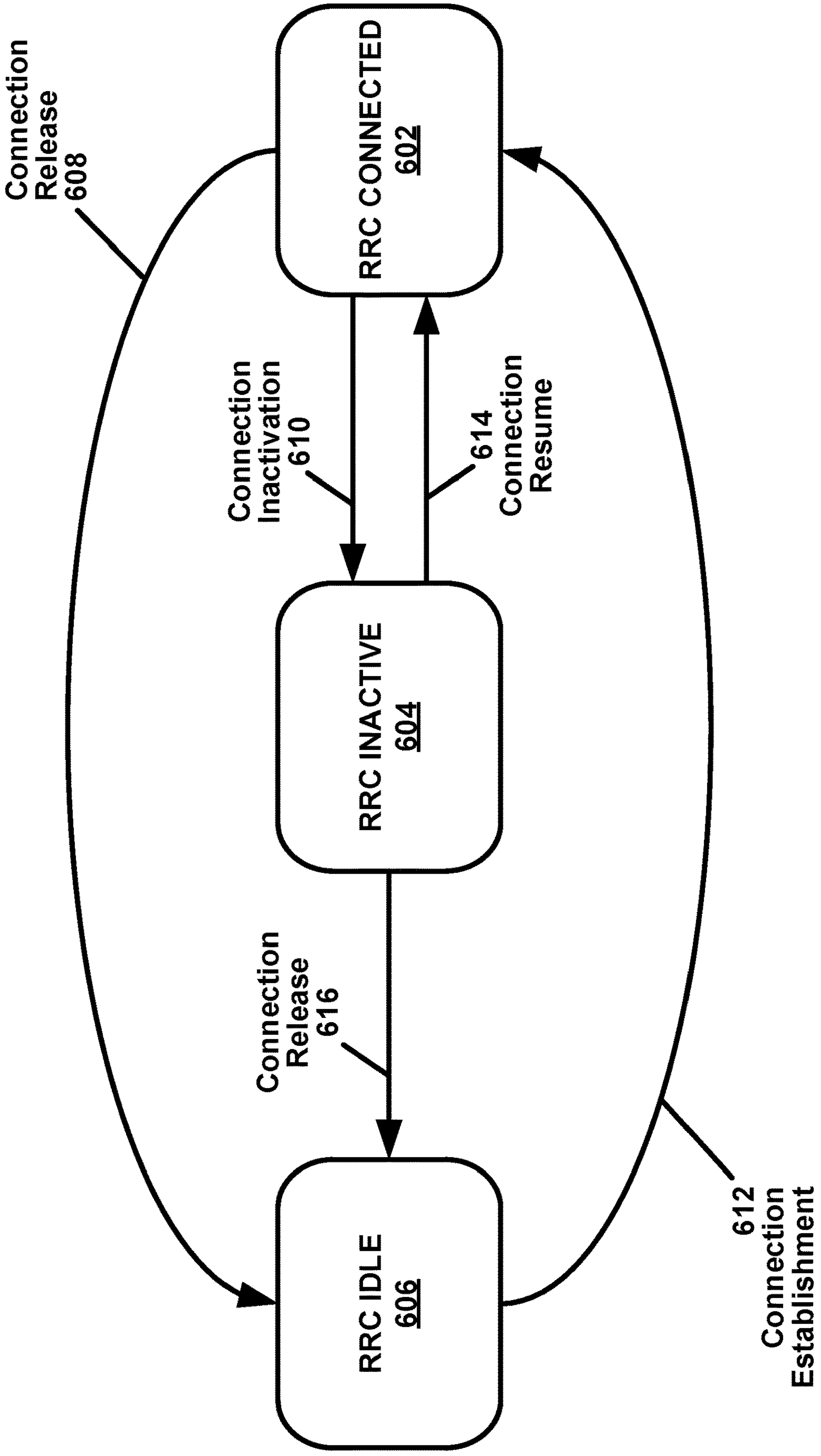
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104, the RAN 154, or any other RAN). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., the RRC connected 602) to an RRC idle state (e.g., the RRC idle 606) via a connection release procedure 608. The RRC state may transition from the RRC connected state (e.g., the RRC connected 602) to the RRC inactive state (e.g., the RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every DRX cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be substantially the same as or similar to connection release procedure 608.

An RRC state may be associated with a mobility management mechanism. During the RRC idle state (e.g., the RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC inactive state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the wireless device registration area, for example, if the wireless device moves (e.g., via a cell reselection) to a cell associated with a TAI that may not be included in the list of TAIs associated with the wireless device registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., the RRC inactive 604).

A base station (e.g., the gNBs 160 in FIG. 1B or any other base station) may be split in two parts: a central unit (e.g., a base station central unit, such as a gNB-CU) and one or more distributed units (e.g., a base station distributed unit, such as a gNB-DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM may be a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbol streams may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
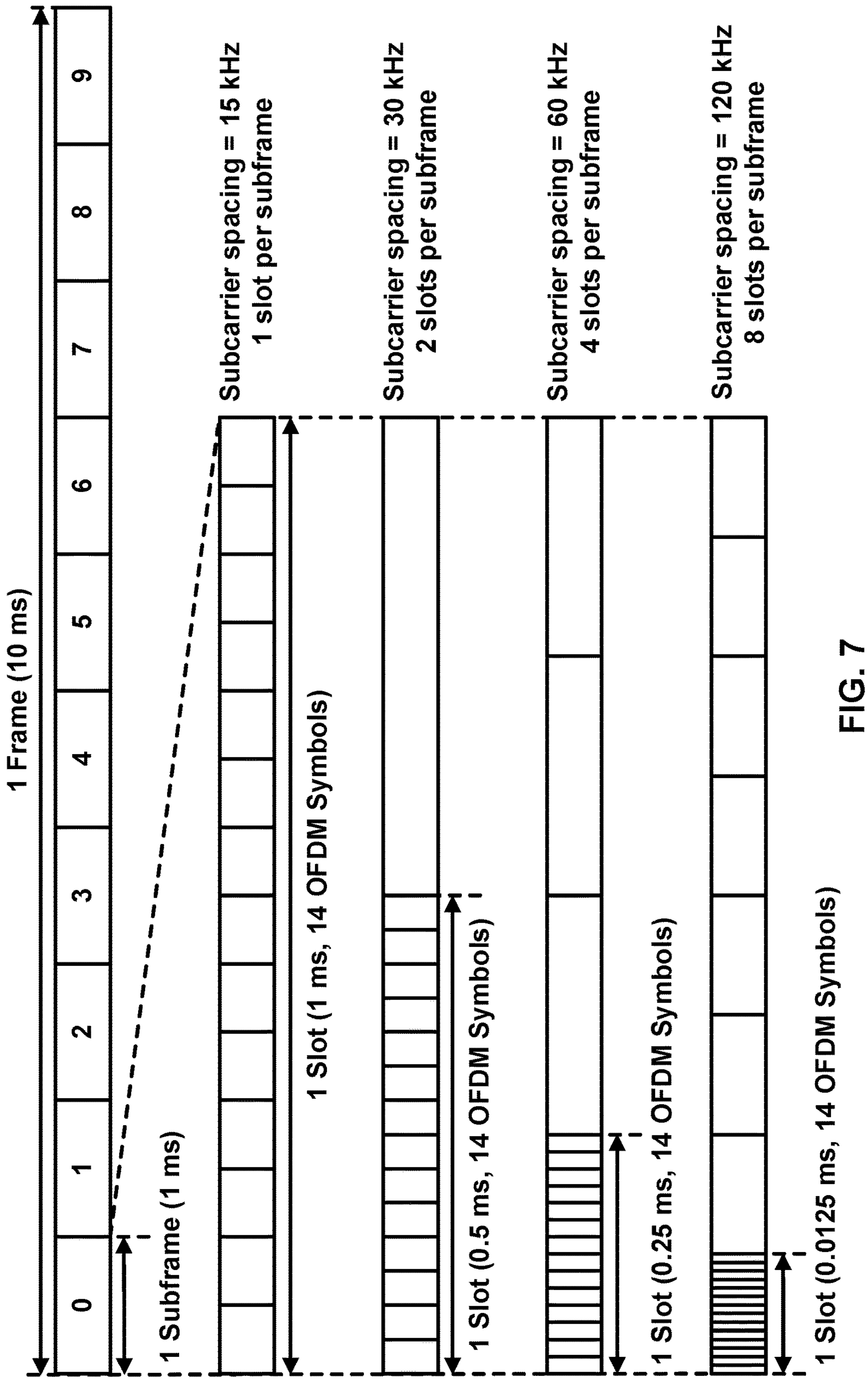
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR radio frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
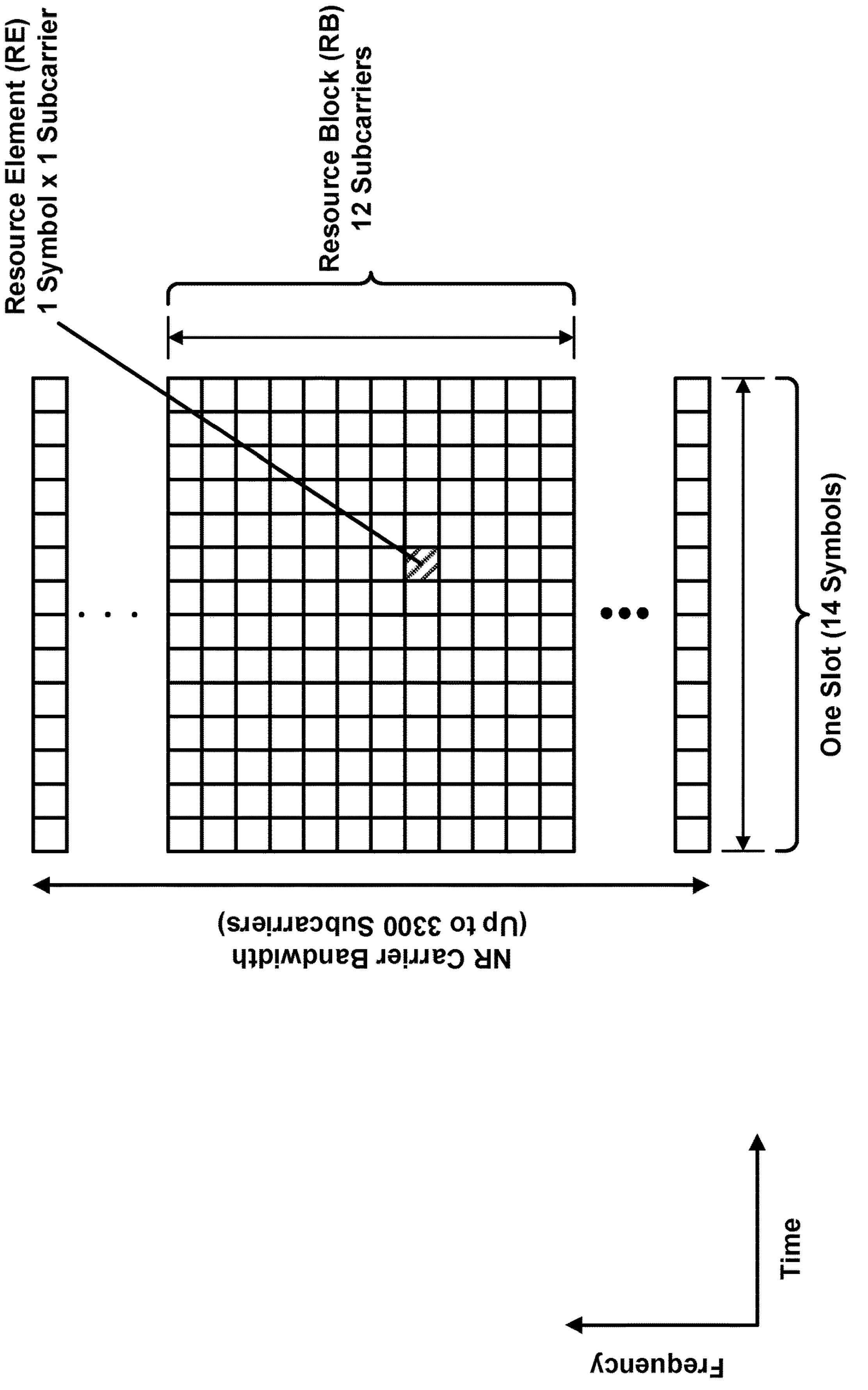
FIG. 8 shows an example resource configuration of one or more carriers.

FIG. 8 shows an example resource configuration of one or more carriers. The resource configuration may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHZ bandwidth may be set based on a 400 MHz per carrier bandwidth limit. Any other bandwidth may be set based on a per carrier bandwidth limit.

A single numerology may be used across the entire bandwidth of a carrier (e.g., an NR carrier such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in DCI. A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, based on (e.g., after or in response to) receiving DCI indicating the second BWP as an active BWP. A wireless device may switch an active BWP from a first BWP to a second BWP, for example, based on (e.g., after or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
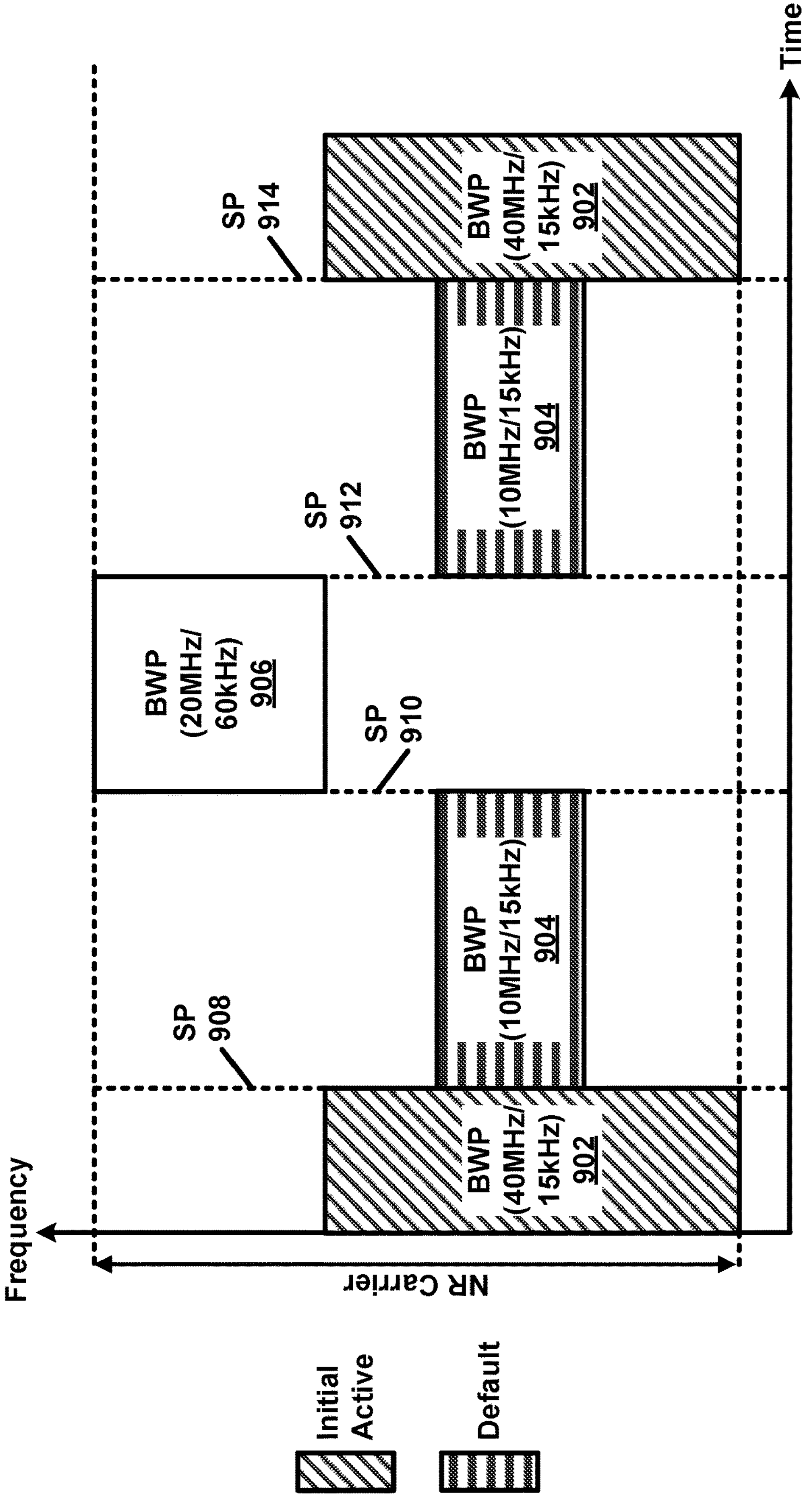
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at the switching point 908 may occur, for example, based on (e.g., after or in response to) an expiry of a BWP inactivity timer (e.g., indicating switching to the default BWP). The switching at the switching point 908 may occur, for example, based on (e.g., after or in response to) receiving DCI indicating the BWP 904 as the active BWP. The wireless device may switch at a switching point 910 from the active BWP (e.g., the BWP 904) to the BWP 906, for example, after or in response receiving DCI indicating the BWP 906 as a new active BWP. The wireless device may switch at a switching point 912 from the active BWP (e.g., the BWP 906) to the BWP 904, for example, a based on (e.g., after or in response to) an expiry of a BWP inactivity timer. The wireless device may switch at the switching point 912 from the active BWP (e.g., the BWP 906) to the BWP 904, for example, after or in response to receiving DCI indicating the BWP 904 as a new active BWP. The wireless device may switch at a switching point 914 from the active BWP (e.g., the BWP 904) to the BWP 902, for example, after or in response receiving DCI indicating the BWP 902 as a new active BWP.

Wireless device procedures for switching BWPs on a secondary cell may be substantially the same/similar as those on a primary cell, for example, if the wireless device is configured for a secondary cell with a default downlink BWP in a set of configured downlink BWPs and a timer value. The wireless device may use the timer value and the default downlink BWP for the secondary cell in substantially the same/similar manner as the wireless device uses the timer value and/or default downlink BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
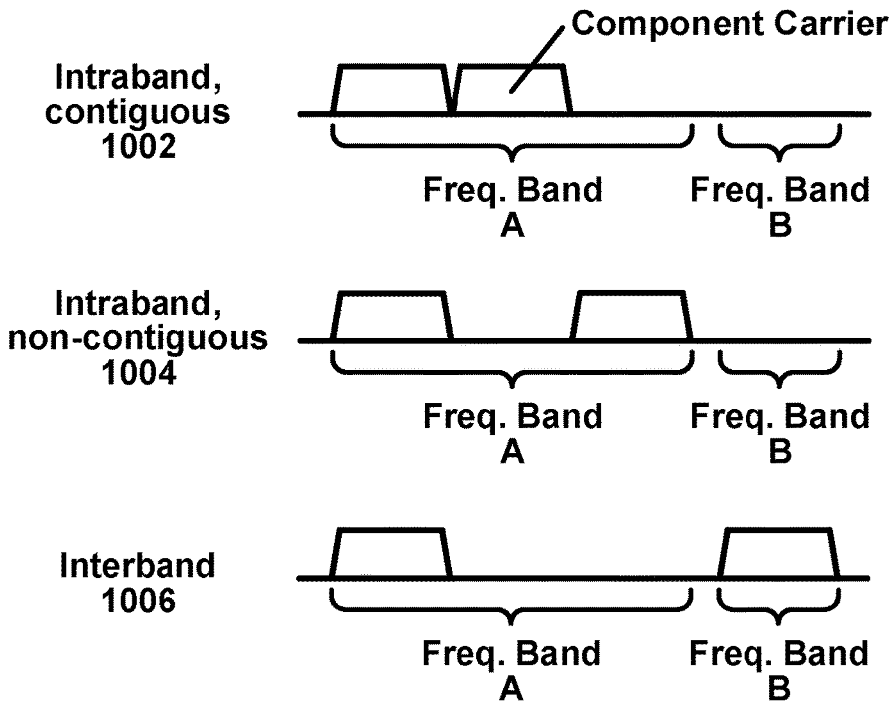
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless devices may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, based on (e.g., after or in response to) an expiration of an SCell deactivation timer (e.g., one SCell deactivation timer per SCell may be configured).

DCI may comprise control information for the downlink, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. UCI may comprise control information for the uplink, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
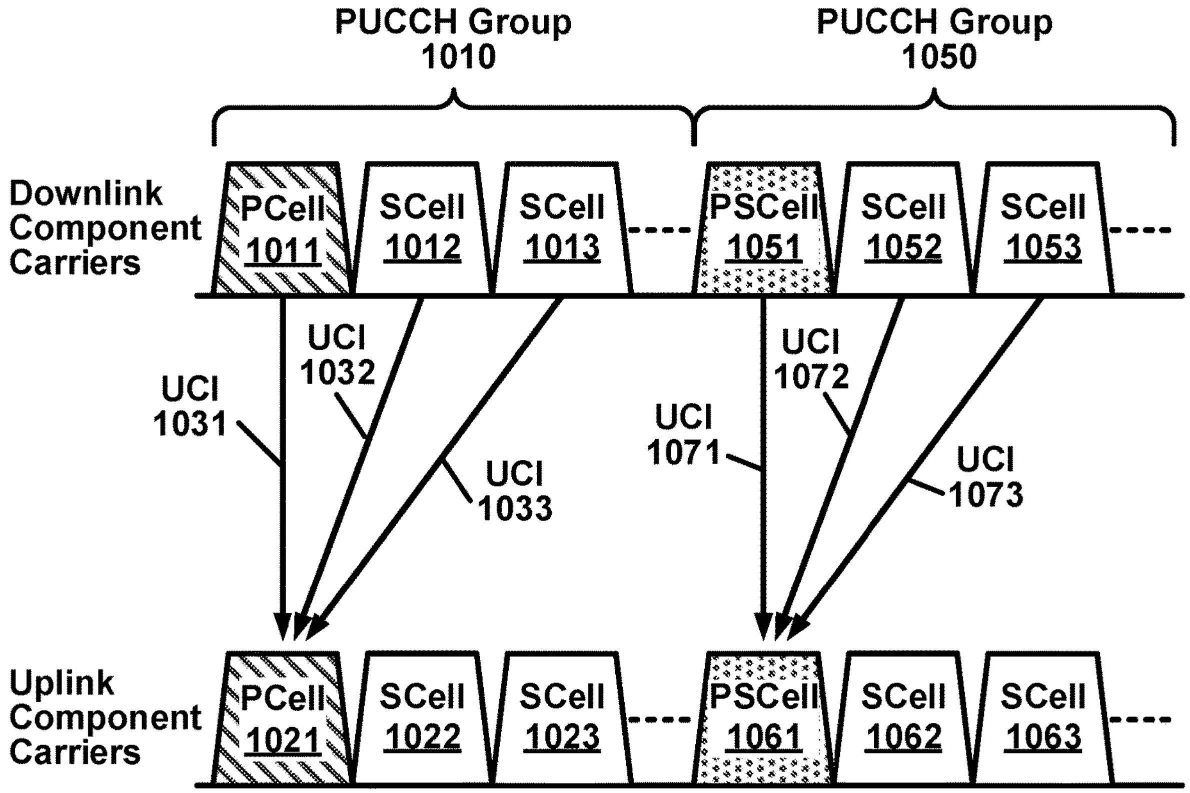
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may use/apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
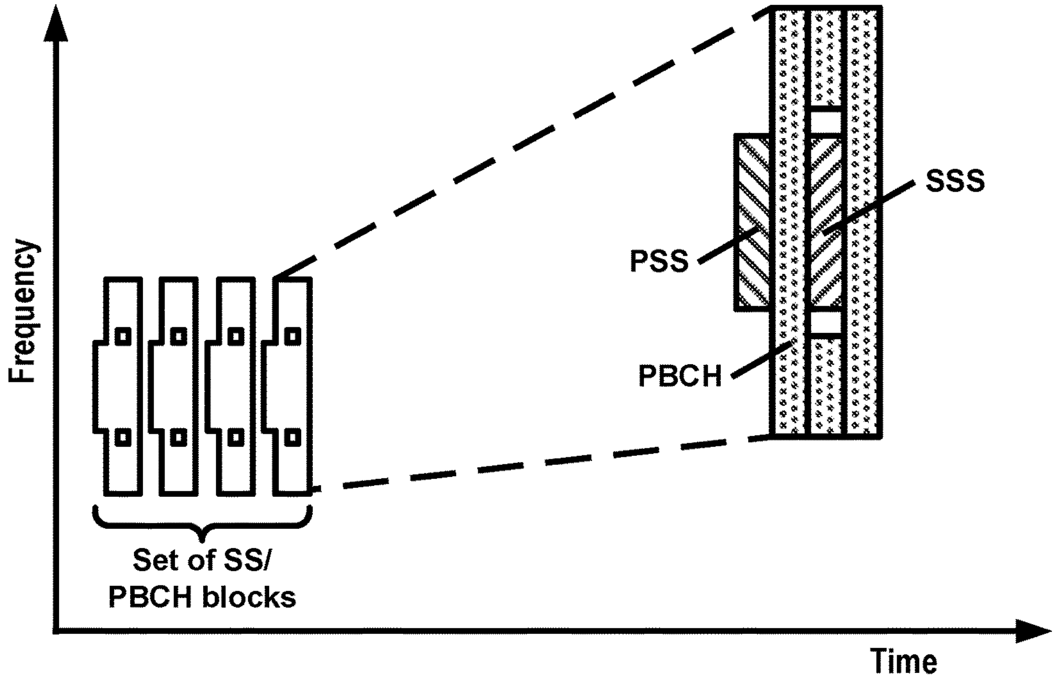
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial receiving (Rx) parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine CSI. The base station may configure the wireless device with one or more CSI-RSs for channel estimation or any other suitable purpose. The base station may configure a wireless device with one or more of substantially the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports (or any other quantity of orthogonal downlink DM-RS ports) per wireless device (e.g., for single user-MIMO). A DM-RS configuration may support up to 4 orthogonal downlink DM-RS ports (or any other quantity of orthogonal downlink DM-RS ports) per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be substantially the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with substantially the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as QCLed, for example, if one or more large-scale properties of the channel over which a first symbol on the first antenna port is conveyed may be inferred/determined from the channel over which a second symbol on a second antenna port is conveyed. The one or more large-scale properties may comprise at least one of: a delay spread; a Doppler spread; a Doppler shift; an average gain; an average delay; and/or spatial Rx parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
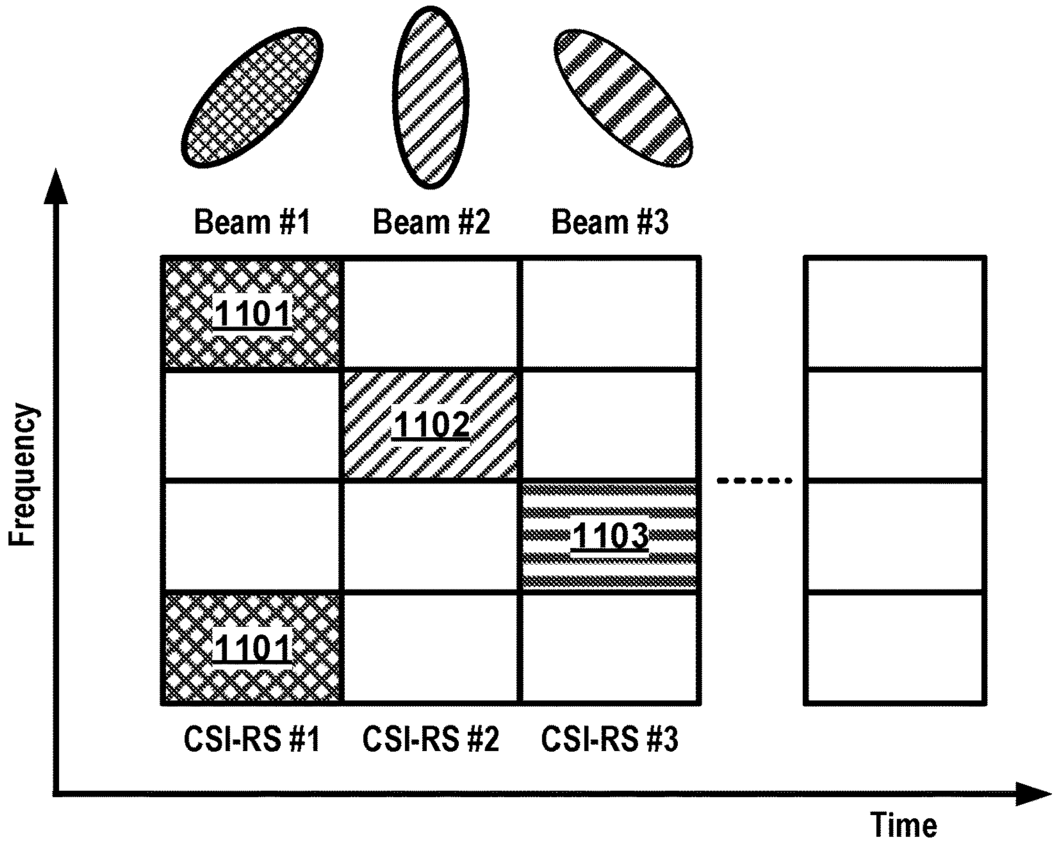
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a RB within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and RE locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, QCL parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams may be shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure a reference signal received power (RSRP) of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more SRS resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a PMI, a CQI, and/or a RI.

Figure 12A:
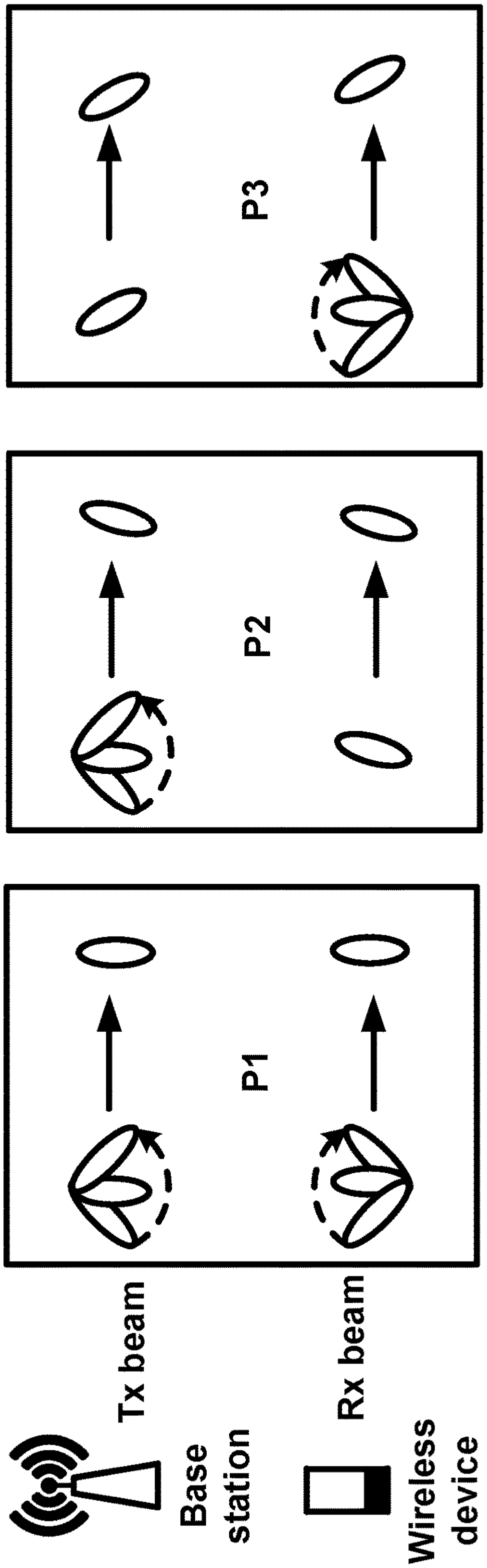
FIG. 12A shows examples of downlink beam management procedures.

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

Figure 12B:
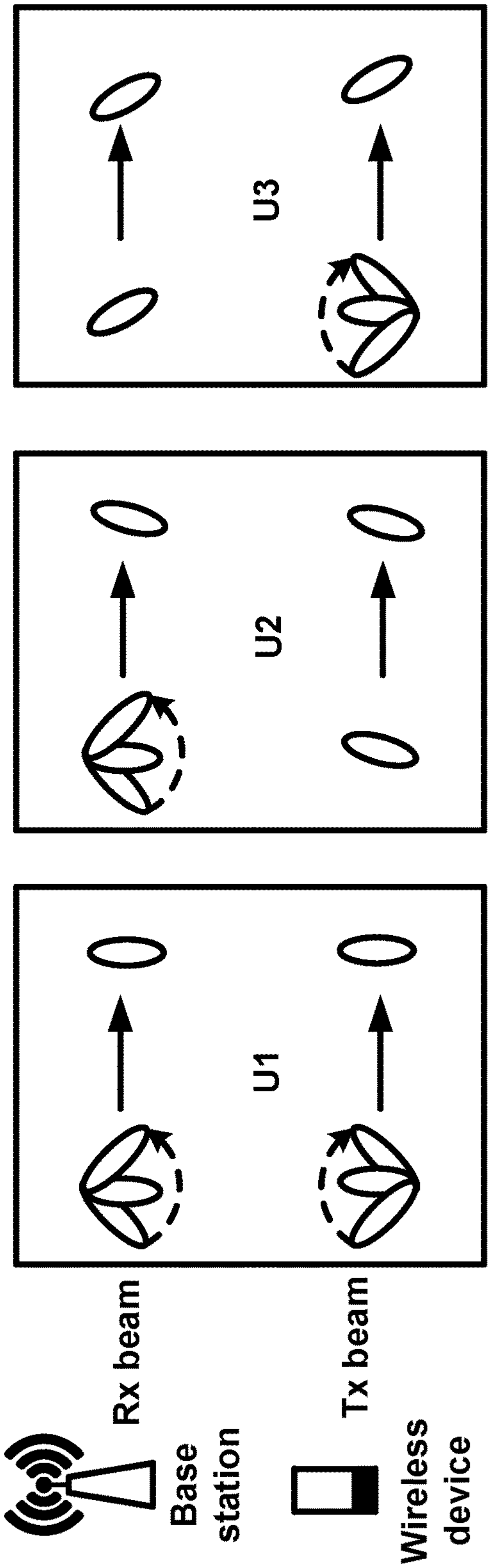
FIG. 12B shows examples of uplink beam management procedures.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the bottom row of U1 and top row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more RSs comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are substantially the same or similar as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more SIBs (e.g., or any other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figure 13C:
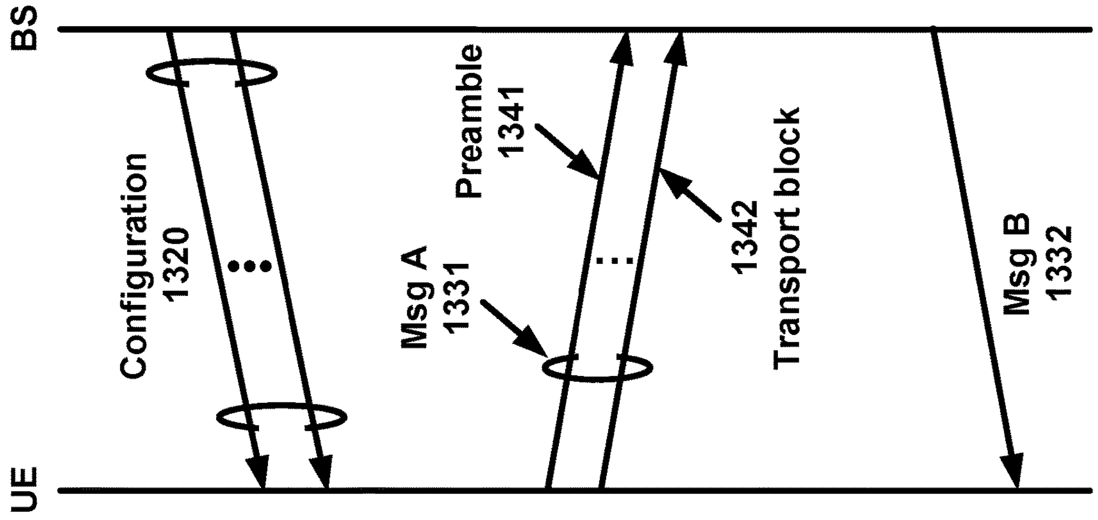
FIG. 13C shows an example two-step random access procedure.
Figure 13B:
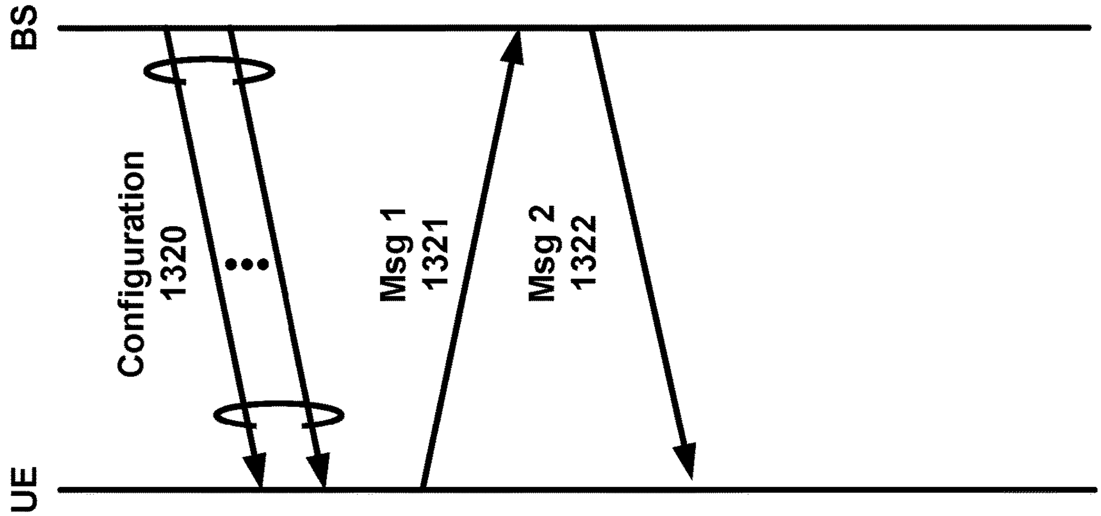
FIG. 13B shows an example two-step random access procedure.
Figure 13A:
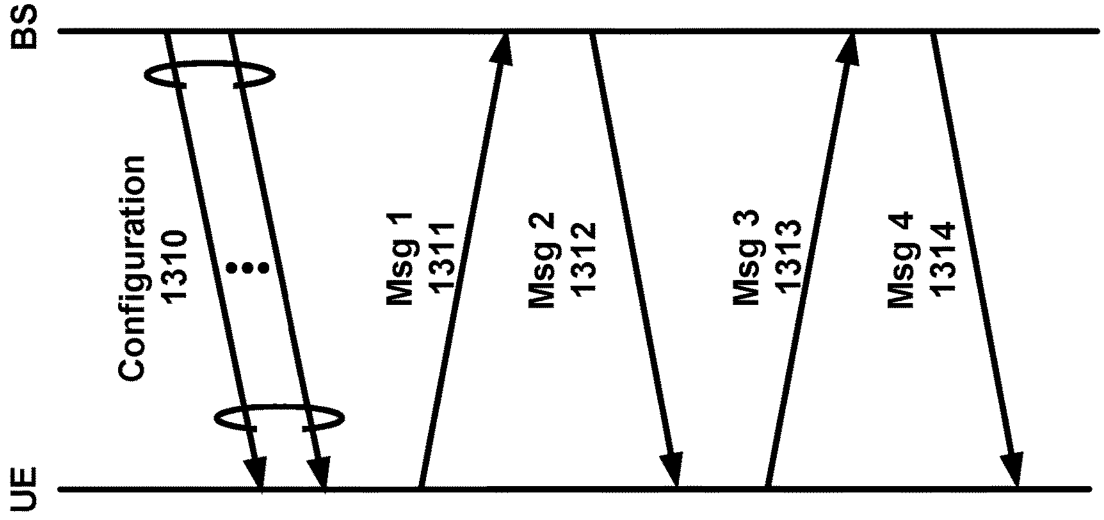
FIG. 13A shows an example four-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more RACH parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more PRACH occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate at least one of: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received based on (e.g., after or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, based on (e.g., after or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-Response Window) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. RNTIs may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA-RNTI = 1 + s\_id + 14 \times t\_id + 14 \times 80 \times f\_id + 14 \times 80 \times 8 \times ul\_carrier\_id,$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, based on (e.g., after or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, based on (e.g., after or in response to) the sending/transmitting of the third message (e.g., Msg 3 1313). The base station may address the wireless device on the PDCCH (e.g., the base station may send the PDCCH to the wireless device) using a C-RNTI, for example, if the C-RNTI was included in the third message (e.g., Msg 3 1313). The random access procedure may be determined to be successfully completed, for example, if the unique C-RNTI of the wireless device is detected on the PDCCH (e.g., the PDCCH is scrambled by the C-RNTI). The fourth message (e.g., Msg 4 1314) may be received using a DL-SCH associated with a TC-RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., for the first message (e.g., Msg 1 1311) and/or the third message (e.g., Msg 3 1313)). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, based on (e.g., after or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, based on (e.g., after or in response to) sending/transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

The first message (e.g., Msg A 1331) may be sent/transmitted in an uplink transmission by the wireless device. The first message (e.g., Msg A 1331) may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, based on (e.g., after or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as DCI. The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
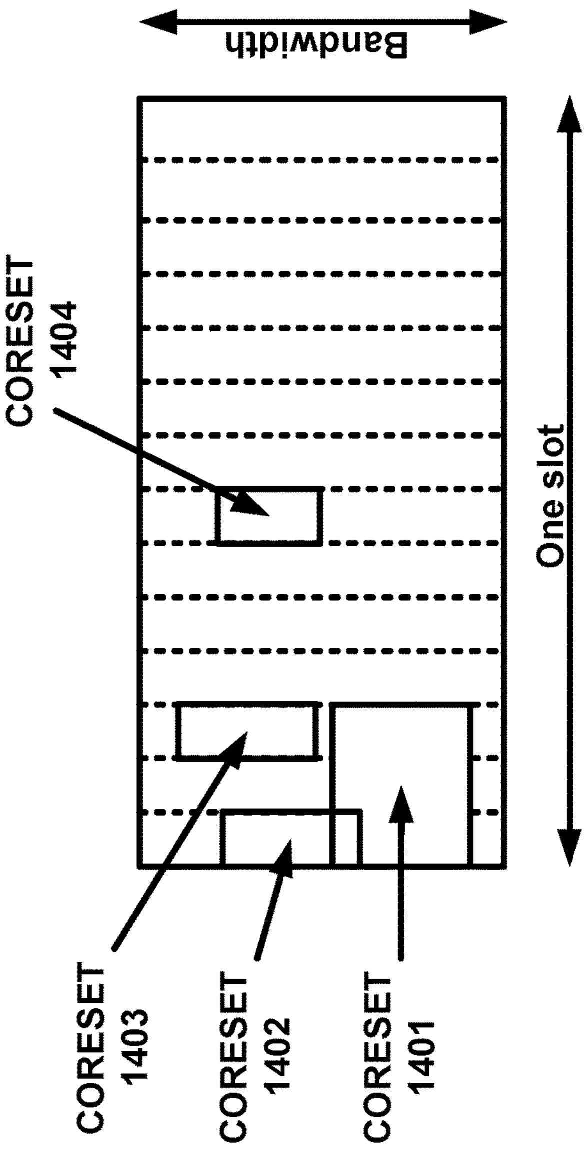
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more CORESETs. A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
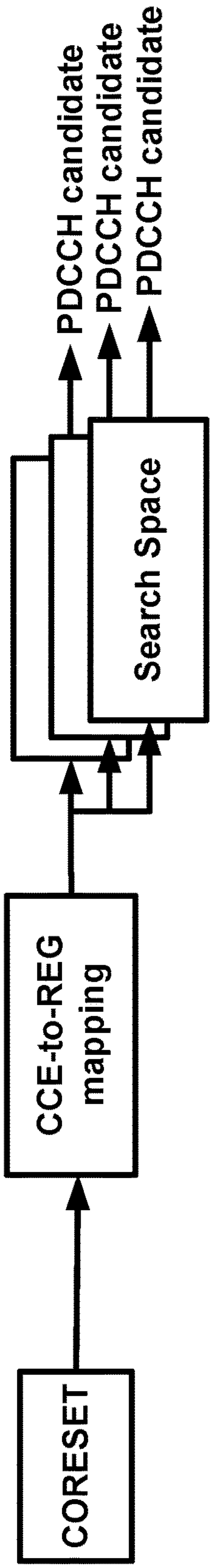
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a quantity/number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the quantity/number of CCEs, the quantity/number of PDCCH candidates in common search spaces, and/or the quantity/number of PDCCH candidates in the wireless device-specific search spaces) and possible (or configured) DCI formats. The decoding may be referred to as blind decoding. The wireless device may determine DCI as valid for the wireless device, for example, based on (e.g., after or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, based on (e.g., after or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise SR. The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a quantity/number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a quantity/number of OFDM symbols (e.g., between four and fourteen OFDM symbols) and may comprise two or fewer bits. The wireless device may use PUCCH format 1, for example, if the transmission is over/via four or more symbols and the quantity/number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a quantity/number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a quantity/number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a quantity/number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from a PUCCH resource set for UCI (HARQ-ACK, CSI, and/or SR) transmission, for example, after determining the PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
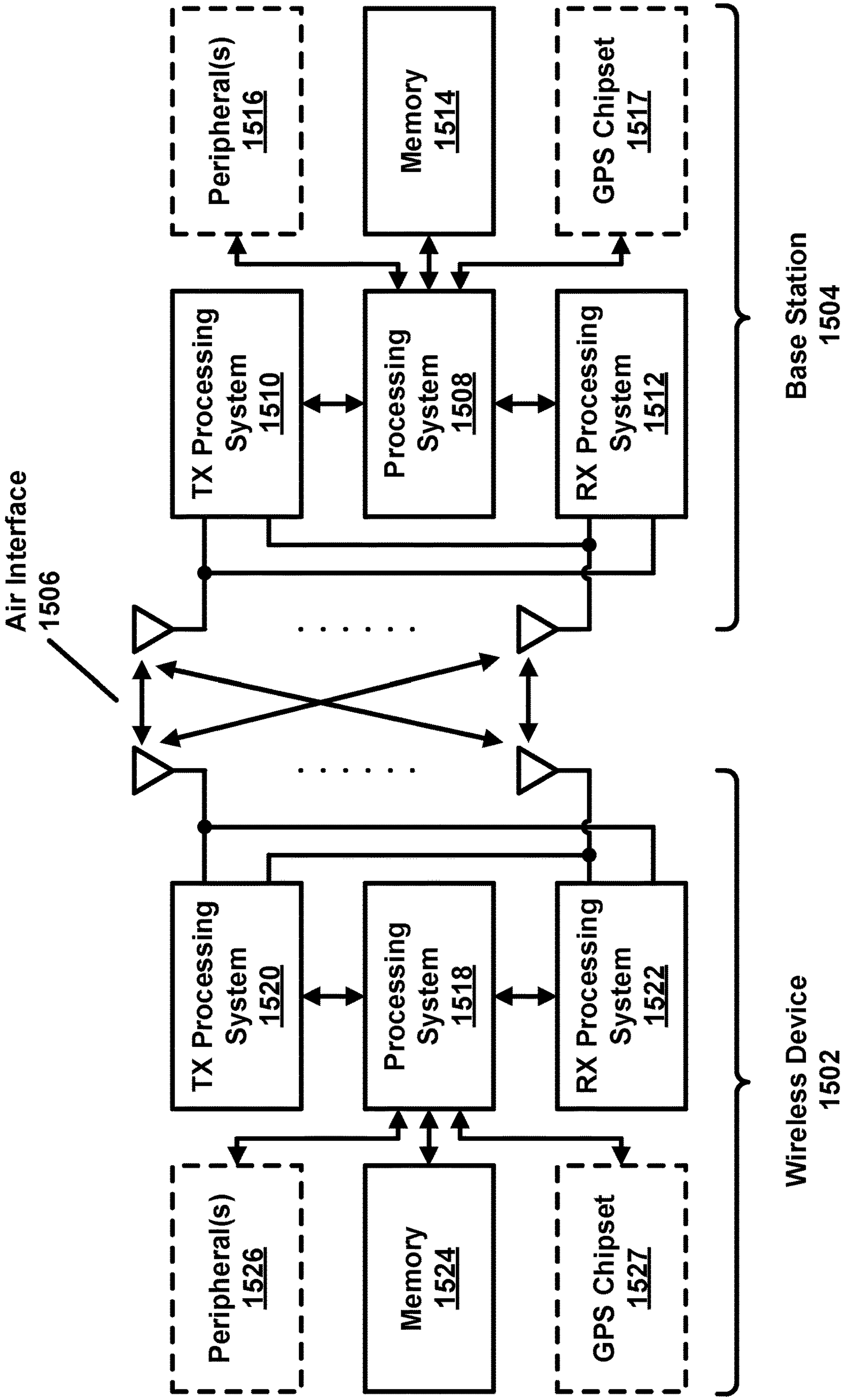
FIG. 15A shows an example of communications between a wireless device and a base station.

FIG. 15A shows an example of communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
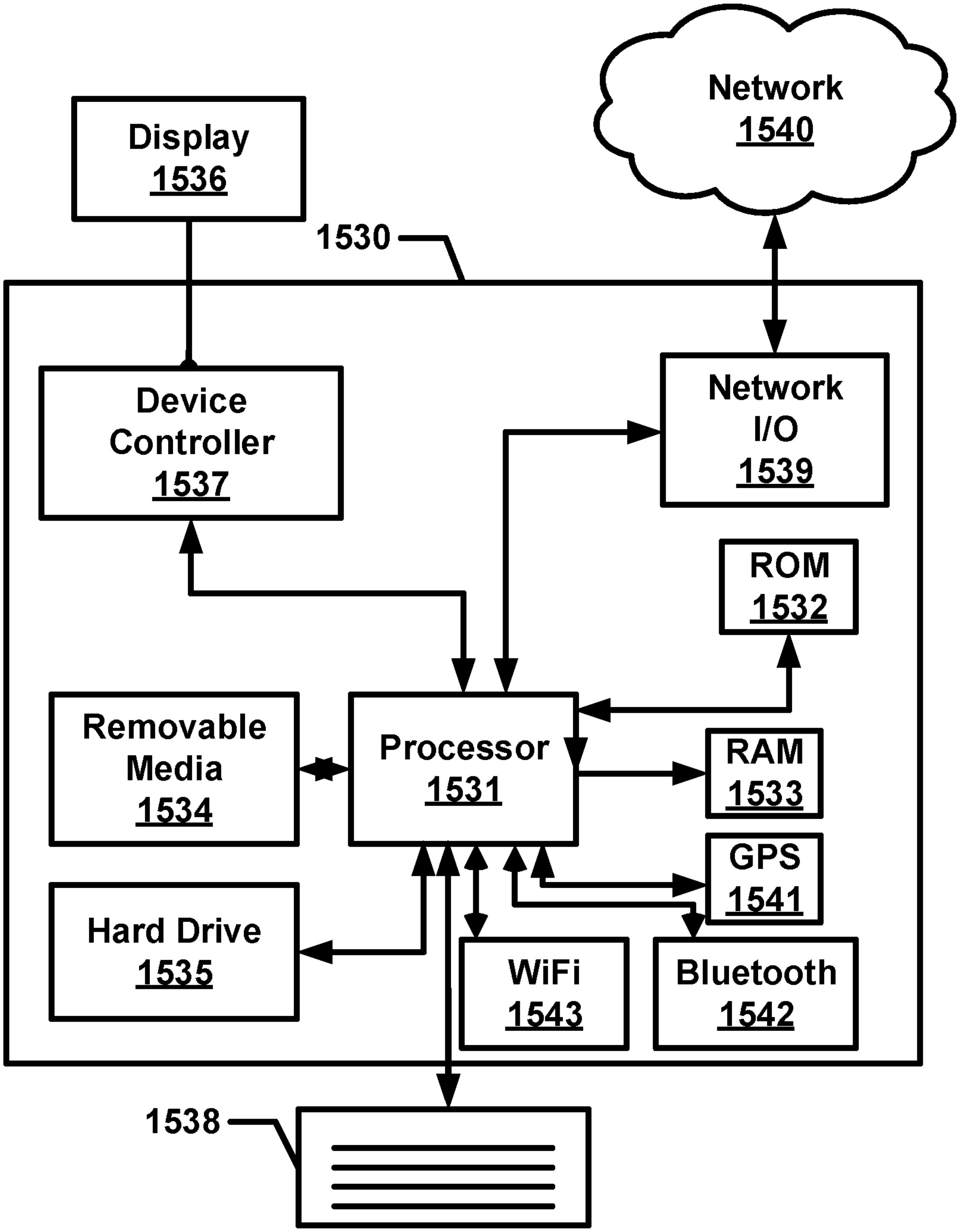
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a USB drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a GPS microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figure 16A:
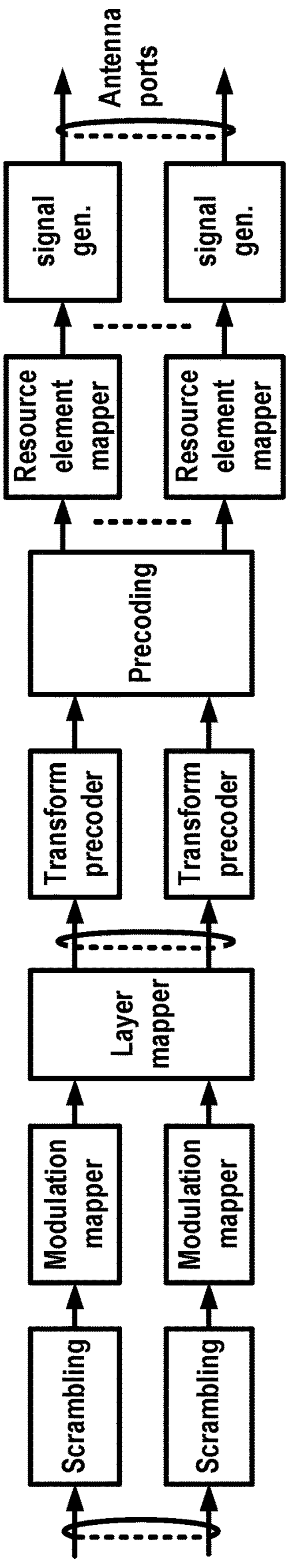
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

Figure 16B:
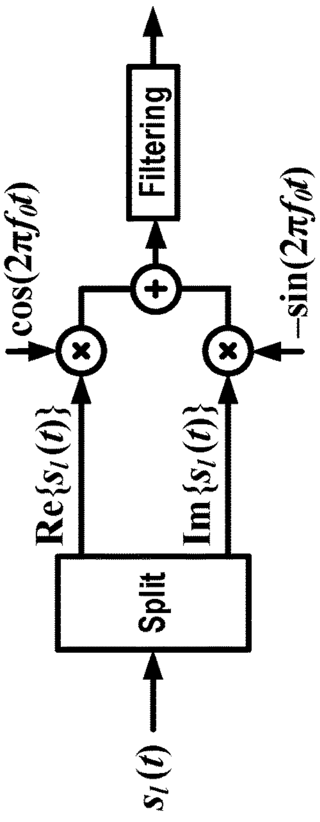

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

Figure 16D:
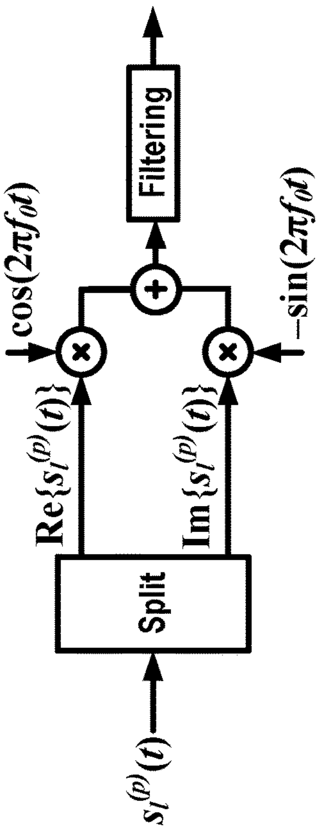
Figure 16C:
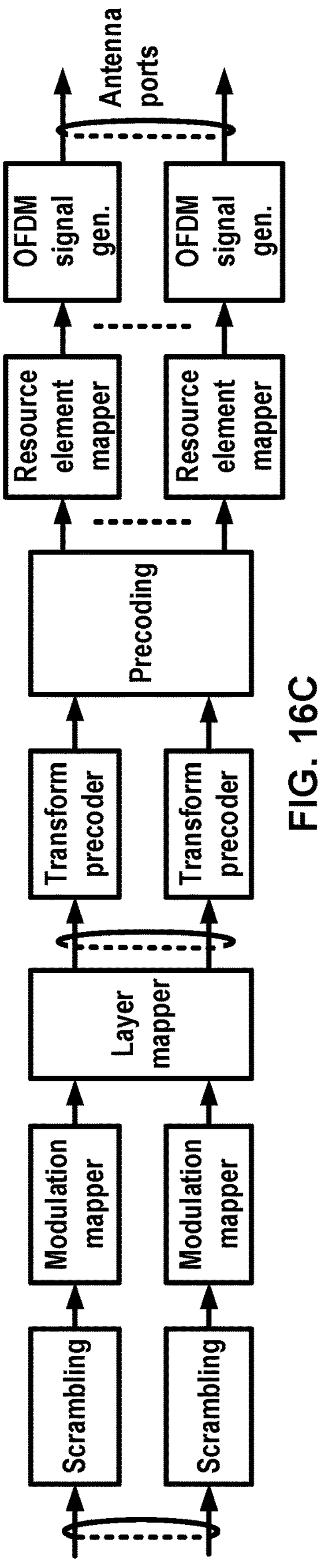

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running. A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A base station may communicate with a wireless device via a wireless network (e.g., a communication network). The communications may use/employ one or more radio technologies (e.g., new radio technologies, legacy radio technologies, and/or a combination thereof). The one or more radio technologies may comprise at least one of: one or multiple technologies related to a physical layer; one or multiple technologies related to a medium access control layer; and/or one or multiple technologies related to a radio resource control layer. One or more enhanced radio technologies described herein may improve performance of a wireless network. System throughput, transmission efficiencies of a wireless network, and/or data rate of transmission may be improved, for example, based on one or more configurations described herein. Battery consumption of a wireless device may be reduced, for example, based on one or more configurations described herein. Latency of data transmission between a base station and a wireless device may be improved, for example, based on one or more configurations described herein. A network coverage of a wireless network may increase, for example, based on one or more configurations described herein.

A base station may send/transmit one or more MAC PDUs to a wireless device. A MAC PDU may be a bit string that is byte aligned (e.g., aligned to a multiple of eight bits) in length. Bit strings may be represented by one or more tables in which the most significant bit may be the leftmost bit of the first line of a table, and the least significant bit may be the rightmost bit on the last line of the table. The bit string may be read from left to right and then in the reading order of the lines (e.g., from the topmost line of the table to the bottommost line of the table). The bit order of a parameter field within a MAC PDU may be represented with the first and most significant bit in the leftmost bit and the last and least significant bit in the rightmost bit.

A MAC SDU may be a bit string that is byte aligned (e.g., aligned to a multiple of eight bits) in length. A MAC SDU may be comprised in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. A MAC subheader may be placed immediately in front of a corresponding MAC SDU, MAC CE, or padding. A wireless device (e.g., the MAC entity of the wireless device) may ignore a value of reserved bits in a downlink (DL) MAC PDU.

A MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, and/or a combination thereof. The MAC SDU may be of variable size. A MAC subheader may correspond to a MAC SDU, a MAC CE, or padding.

A MAC subheader may comprise: an R field with a one-bit length; an F field with a one-bit length; an LCID field with a multi-bit length; an L field with a multi-bit length; and/or a combination thereof, for example, if the MAC subheader corresponds to a MAC SDU, a variable-sized MAC CE, or padding.

Figure 17A:
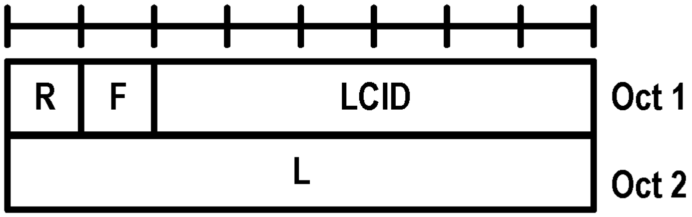
FIG. 17A, FIG. 17B, and FIG. 17C show example MAC subheaders.
Figure 17B:
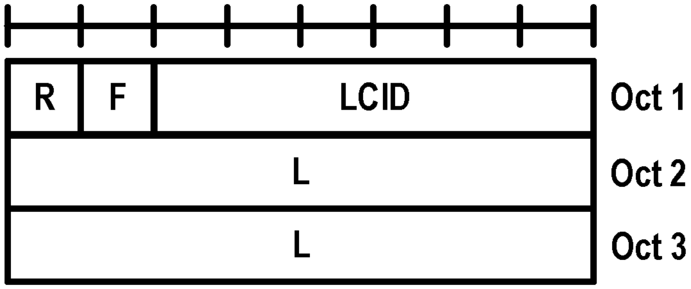
Figure 17C:
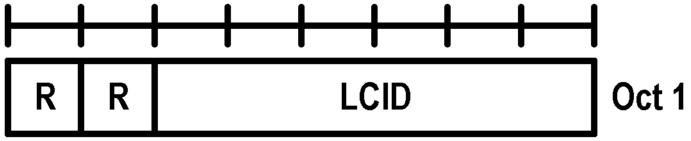

FIG. 17A shows an example of a MAC subheader. The MAC subheader may comprise an R field, an F field, an LCID field, and/or an L field. The LCID field may be six bits in length (or any other quantity of bits). The L field may be eight bits in length (or any other quantity of bits). Each of the R field and the F field may be one bit in length (or any other quantity of bits). FIG. 17B shows an example of a MAC subheader. The MAC subheader may comprise an R field, an F field, an LCID field, and/or an L field. Similar to the MAC subheader shown in FIG. 17A, the LCID field may be six bits in length (or any other quantity of bits), the R field may be one bit in length (or any other quantity of bits), and the F field may be one bit in length (or any other quantity of bits). The L field may be sixteen bits in length (or any other quantity of bits, such as greater than sixteen bits in length). A MAC subheader may comprise: an R field with a two-bit length (or any other quantity of bits) and/or an LCID field with a multi-bit length (or single bit length), for example, if the MAC subheader corresponds to a fixed sized MAC CE or padding. FIG. 17C shows an example of a MAC subheader. In the example MAC subheader shown in FIG. 17C, the LCID field may be six bits in length (or any other quantity of bits), and the R field may be two bits in length (or any other quantity of bits).

Figure 18A:
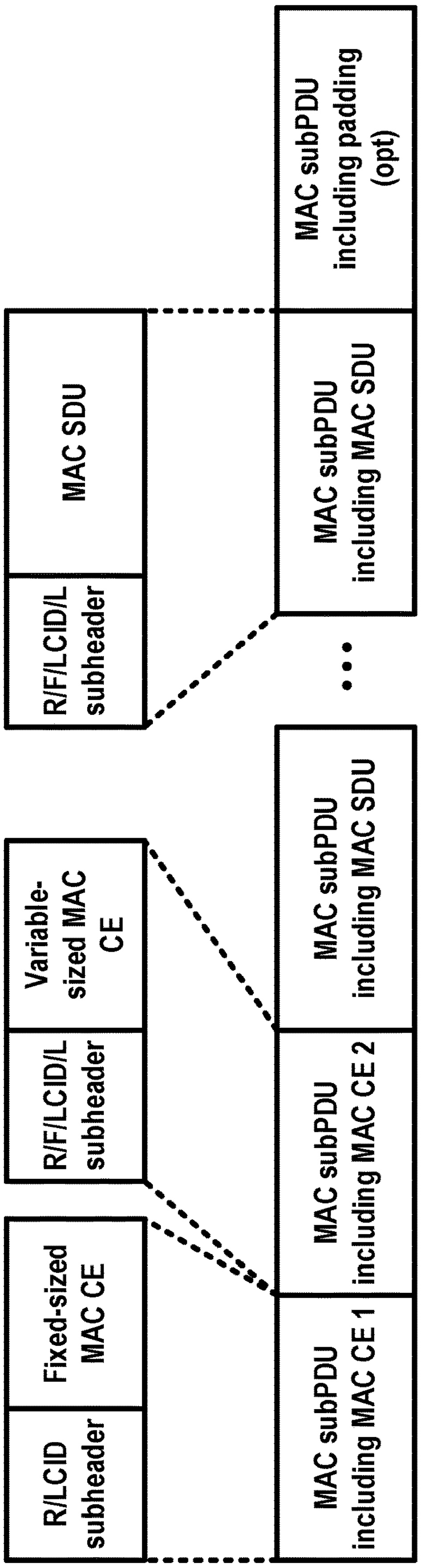
FIG. 18A and FIG. 18B show example MAC PDUs.

FIG. 18A shows an example of a MAC PDU (e.g., a DL MAC PDU). Multiple MAC CEs, such as MAC CE 1 and 2 shown in FIG. 18A, may be placed together (e.g., located within the same MAC PDU). A MAC subPDU comprising a MAC CE may be placed (e.g., located within a MAC PDU) before any MAC subPDU comprising a MAC SDU or a MAC subPDU comprising padding. MAC CE 1 may be a fixed-sized MAC CE that follows a first-type MAC subheader. The first-type MAC subheader may comprise an R field and an LCID field (e.g., similar to the MAC CE shown in FIG. 17C). MAC CE 2 may be a variable-sized MAC CE that follows a second-type MAC subheader. The second-type MAC subheader may comprise an R field, an F field, an LCID field and an L field (e.g., similar to the MAC CEs shown in FIG. 17A or FIG. 17B). The size of a MAC SDU that follows the second-type MAC subheader may vary.

Figure 18B:
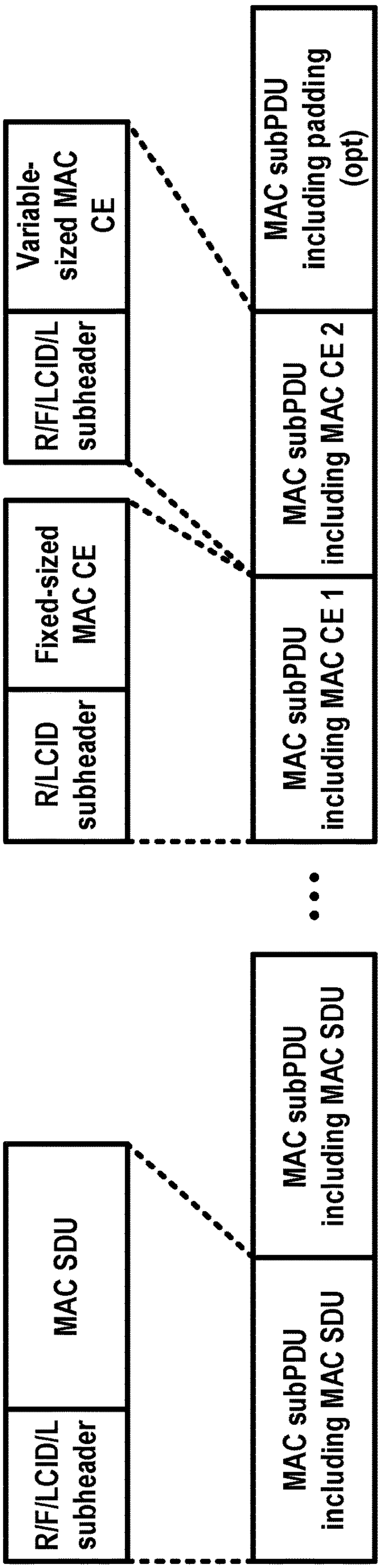

FIG. 18B shows an example of a MAC PDU (e.g., a UL MAC PDU). Multiple MAC CEs, such as MAC CE 1 and 2 shown in FIG. 18B, may be placed together (e.g., located within the same MAC PDU). A MAC subPDU comprising a MAC CE may be placed (e.g., located within a MAC PDU) after all MAC subPDUs comprising a MAC SDU. The MAC subPDU and/or the MAC subPDU comprising a MAC CE may be placed (e.g., located within a MAC PDU) before a MAC subPDU comprising padding. Similar to the MAC CEs shown in FIG. 18A, MAC CE 1 shown in FIG. 18B may be a fixed-sized MAC CE that follows a first-type MAC subheader. The first-type MAC subheader may comprise an R field and an LCID field (e.g., similar to the MAC CE shown in FIG. 17C). Similar to the MAC CEs shown in FIG. 18A, MAC CE 2 shown in FIG. 18B may be a variable-sized MAC CE that follows a second-type MAC subheader. The second-type MAC subheader may comprise an R field, an F field, an LCID field and an L field (e.g., similar to the MAC CEs shown in FIG. 17A or FIG. 17B). The size of a MAC SDU that follows the second-type MAC subheader may vary.

A base station (e.g., the MAC entity of a base station) may send/transmit one or more MAC CEs to a wireless device (e.g., a MAC entity of a wireless device). FIG. 19 shows example LCID values. The LCID values may be associated with one or more MAC CEs. The LCID values may be associated with a downlink channel, such as a DL-SCH. The one or more MAC CEs may comprise at least one of: an semi-persistent zero power CSI-RS (SP ZP CSI-RS) Resource Set Activation/Deactivation MAC CE, a PUCCH spatial relation Activation/Deactivation MAC CE, an SP SRS Activation/Deactivation MAC CE, an SP CSI reporting on PUCCH Activation/Deactivation MAC CE, a TCI State Indication for wireless device-specific (e.g., UE-specific) PDCCH MAC CE, a TCI State Indication for wireless device-specific (e.g., UE-specific) PDSCH MAC CE, an Aperiodic CSI Trigger State Subselection MAC CE, an SP CSI-RS/CSI interference measurement (CSI-IM) Resource Set Activation/Deactivation MAC CE, a wireless device (e.g., UE) contention resolution identity MAC CE, a timing advance command MAC CE, a DRX command MAC CE, a Long DRX command MAC CE, an SCell activation/deactivation MAC CE (e.g., 1 Octet), an SCell activation/deactivation MAC CE (e.g., 4 Octet), and/or a duplication activation/deactivation MAC CE. A MAC CE, such as a MAC CE sent/transmitted by a base station (e.g., a MAC entity of a base station) to a wireless device (e.g., a MAC entity of a wireless device), may be associated with (e.g., correspond to) an LCID in the MAC subheader corresponding to the MAC CE. Different MAC CEs may correspond to a different LCID in the MAC subheader corresponding to the MAC CE. An LCID having an index value "111011" in a MAC subheader may indicate that a MAC CE associated with the MAC subheader is a long DRX command MAC CE, for example, for a MAC CE associated with the downlink.

A wireless device (e.g., a MAC entity of a wireless device) may send/transmit to a base station (e.g., a MAC entity of a base station) one or more MAC CEs. FIG. 20 shows an example LCID values that may be associated with the one or more MAC CEs. The LCID values may be associated with an uplink channel, such as a UL-SCH. The one or more MAC CEs may comprise at least one of: a short buffer status report (BSR) MAC CE, a long BSR MAC CE, a C-RNTI MAC CE, a configured grant confirmation MAC CE, a single entry power headroom report (PHR) MAC CE, a multiple entry PHR MAC CE, a short truncated BSR, and/or a long truncated BSR. A MAC CE may be associated with (e.g., correspond to) an LCID in the MAC subheader corresponding to the MAC CE. Different MAC CEs may correspond to a different LCID in the MAC subheader corresponding to the MAC CE. An LCID having an index value "111011" in a MAC subheader may indicate that a MAC CE associated with the MAC subheader is a short-truncated command MAC CE, for example, for a MAC CE associated with the uplink.

Two or more CCs may be aggregated, such as in carrier aggregation (CA). A wireless device may simultaneously receive and/or transmit data via one or more CCs, for example, depending on capabilities of the wireless device (e.g., using the technique of CA). A wireless device may support CA for contiguous CCs and/or for non-contiguous CCs. CCs may be organized into cells. CCs may be organized into one PCell and one or more SCells.

A wireless device may have an RRC connection (e.g., one RRC connection) with a network, for example, if the wireless device is configured with CA. During an RRC connection establishment/re-establishment/handover, a cell providing/sending/configuring NAS mobility information may be a serving cell. During an RRC connection re-establishment/handover procedure, a cell providing/sending/configuring a security input may be a serving cell. The serving cell may be a PCell. A base station may send/transmit, to a wireless device, one or more messages comprising configuration parameters of a plurality of SCells, for example, depending on capabilities of the wireless device.

A base station and/or a wireless device may use/employ an activation/deactivation mechanism of an SCell, for example, if configured with CA. The base station and/or the wireless device may use/employ an activation/deactivation mechanism of an SCell, for example, to improve battery use and/or power consumption of the wireless device. A base station may activate or deactivate at least one of one or more SCells, for example, if a wireless device is configured with the one or more SCells. An SCell may be deactivated unless an SCell state associated with the SCell is set to an activated state (e.g., "activated") or a dormant state (e.g., "dormant"), for example, after configuring the SCell.

A wireless device may activate/deactivate an SCell. A wireless device may activate/deactivate a cell, for example, based on (e.g., after or in response to) receiving an SCell Activation/Deactivation MAC CE. The SCell Activation/Deactivation MAC CE may comprise one or more fields associated with one or more SCells, respectively, to indicate activation or deactivation of the one or more SCells. The SCell Activation/Deactivation MAC CE may correspond to one octet comprising seven fields associated with up to seven SCells, respectively, for example, if the aggregated cell has less than eight SCells. The SCell Activation/Deactivation MAC CE may comprise an R field. The SCell Activation/Deactivation MAC CE may comprise a plurality of octets comprising more than seven fields associated with more than seven SCells, for example, if the aggregated cell has more than seven SCells.

Figure 21A:
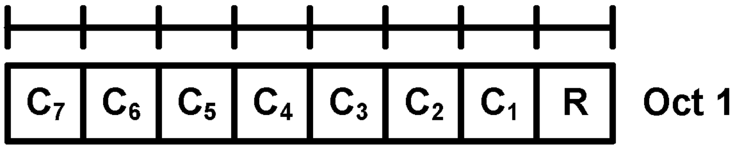
FIG. 21A and FIG. 21B show example secondary cell (SCell) Activation/Deactivation MAC control elements (CEs).

FIG. 21A shows an example SCell Activation/Deactivation MAC CE of one octet. A first MAC PDU subheader comprising a first LCID (e.g., '111010' as shown in FIG. 19) may indicate/identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first quantity/number of C-fields (e.g., seven or any other quantity/number) and a second quantity/number of R-fields (e.g., one or any other quantity/number).

Figure 21B:
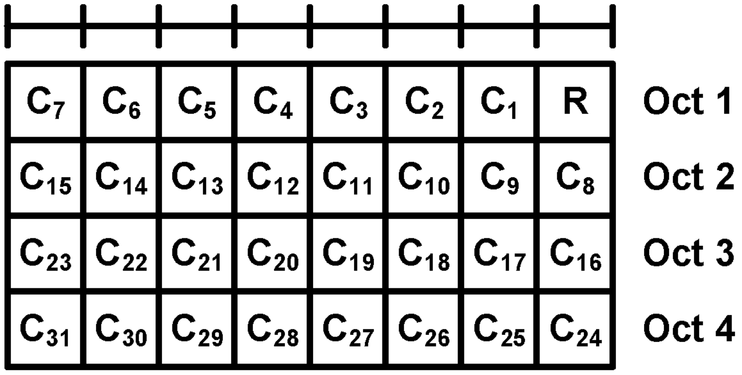

FIG. 21B shows an example SCell Activation/Deactivation MAC CE of four octets. A second MAC PDU subheader comprising a second LCID (e.g., '111001' as shown in FIG. 19) may indicate/identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third quantity/number of C-fields (e.g., 31 or any other quantity/number) and a fourth quantity/number of R-fields (e.g., 1 or any other quantity/number).

As shown in FIG. 21A and/or FIG. 21B, a Ci field may indicate an activation/deactivation status of an SCell with/corresponding to an SCell index i, for example, if an SCell with/corresponding to SCell index i is configured. An SCell with an SCell index i may be activated, for example, if the Ci field is set to one. An SCell with an SCell index i may be deactivated, for example, if the Ci field is set to zero. The wireless device may ignore the Ci field, for example, if there is no SCell configured with SCell index i. An R field may indicate a reserved bit. The R field may be set to zero or any other value (e.g., for other purposes).

A base station may configure a wireless device with uplink (UL) BWPs and downlink (DL) BWPs to enable bandwidth adaptation (BA) on a PCell. The base station may further configure the wireless device with at least DL BWP(s) (i.e., there may be no UL BWPs in the UL) to enable BA on an SCell, for example, if carrier aggregation is configured. An initial active BWP may be a first BWP used for initial access, for example, for a PCell. A first active BWP may be a second BWP configured for the wireless device to operate on a SCell upon the SCell being activated. A base station and/or a wireless device may independently switch a DL BWP and an UL BWP, for example, in paired spectrum (e.g., FDD). A base station and/or a wireless device may simultaneously switch a DL BWP and an UL BWP, for example, in unpaired spectrum (e.g., TDD).

A base station and/or a wireless device may switch a BWP between configured BWPs using a DCI message or a BWP inactivity timer. The base station and/or the wireless device may switch an active BWP to a default BWP based on (e.g., after or in response to) an expiry of the BWP inactivity timer associated with the serving cell, for example, if the BWP inactivity timer is configured for a serving cell. The default BWP may be configured by the network. One UL BWP for an uplink carrier (e.g., each uplink carrier) and one DL BWP may be active at a time in an active serving cell, for example, if FDD systems are configured with BA. One DL/UL BWP pair may be active at a time in an active serving cell, for example, for TDD systems. Operating on the one UL BWP and the one DL BWP (or the one DL/UL pair) may improve wireless device battery consumption. BWPs other than the one active UL BWP and the one active DL BWP that the wireless device may work on may be deactivated. The wireless device may not monitor PDCCH transmission, for example, on deactivated BWPs. The wireless device may not send (e.g., transmit) on PUCCH, PRACH, and UL-SCH, for example, on deactivated BWPs.

A serving cell may be configured with at most a first number/quantity (e.g., four) of BWPs. There may be one active BWP at any point in time, for example, for an activated serving cell. A BWP switching for a serving cell may be used to activate an inactive BWP and deactivate an active BWP at a time. The BWP switching may be controlled by a PDCCH transmission indicating a downlink assignment or an uplink grant. The BWP switching may be controlled by a BWP inactivity timer (e.g., bwp-InactivityTimer). The BWP switching may be controlled by a wireless device (e.g., a MAC entity of the wireless device) based on (e.g., after or in response to) initiating a Random Access procedure. One BWP may be initially active without receiving a PDCCH transmission indicating a downlink assignment or an uplink grant, for example, upon addition of an SpCell or activation of an SCell. The active BWP for a serving cell may be indicated by configuration parameter(s) (e.g., parameters of RRC message) and/or PDCCH transmission. A DL BWP may be paired with a UL BWP for unpaired spectrum, and BWP switching may be common for both UL and DL.

Figure 22:
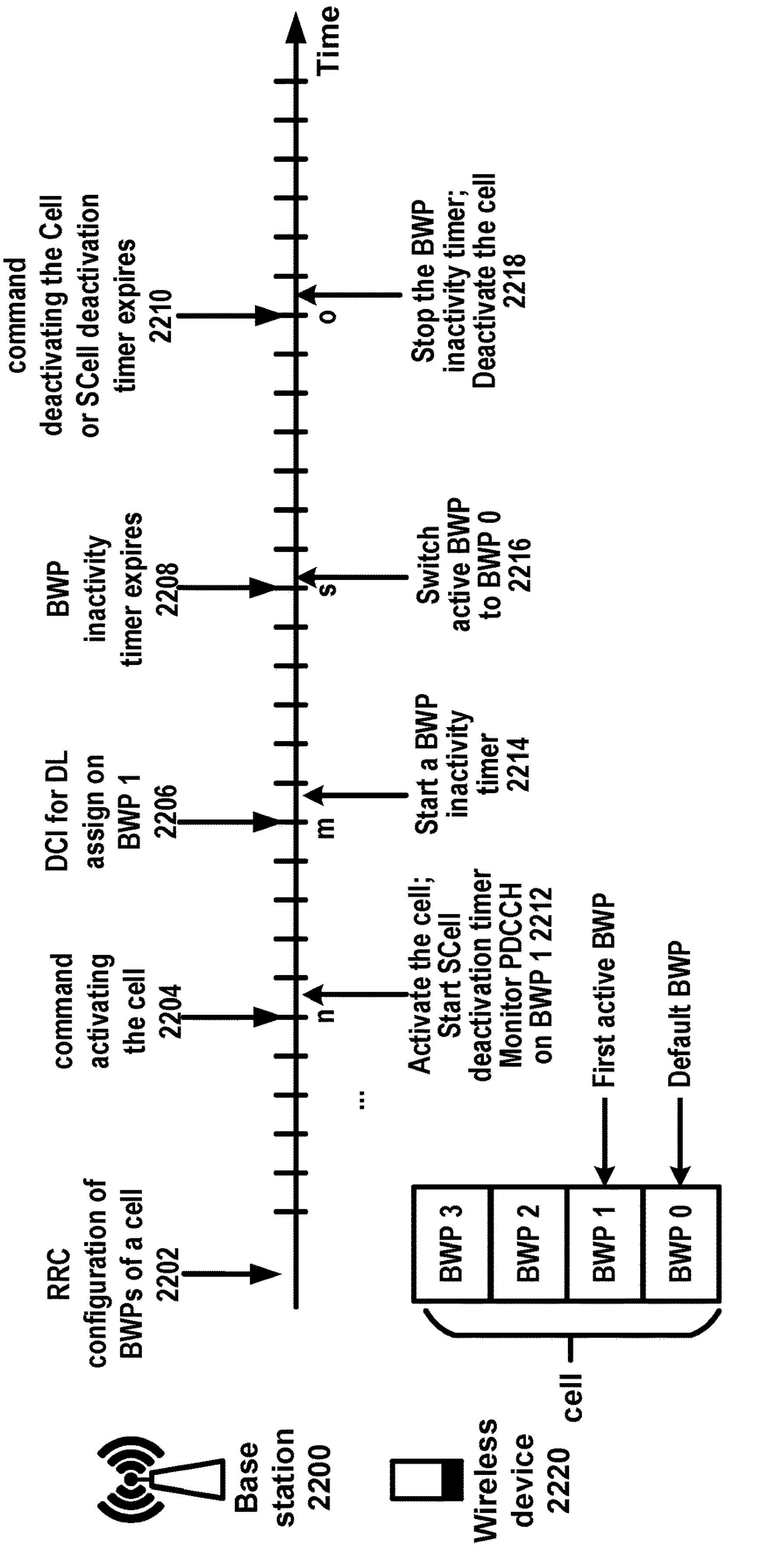
FIG. 22 shows an example of BWP activation/deactivation.

FIG. 22 shows an example of BWP activation/deactivation. The BWP activation/deactivation may be on a cell (e.g., PCell or SCell). The BWP activation/deactivation may be associated with BWP switching (e.g., BWP switching may comprise the BWP activation/deactivation). A wireless device 2220 may receive (e.g., detect) at step 2202, (e.g., from a base station 2200), at least one message (e.g., RRC message) comprising parameters of a cell and one or more BWPs associated with the cell. The RRC message may comprise at least one of: RRC connection reconfiguration message (e.g., RRCReconfiguration), RRC connection reestablishment message (e.g., RRCRestablishment), and/or RRC connection setup message (e.g., RRCSetup). Among the one or more BWPs, at least one BWP may be configured as the first active BWP (e.g., BWP 1), one BWP as the default BWP (e.g., BWP 0). The wireless device 2220 may receive (e.g., detect) a command at step 2204 (e.g., RRC message, MAC CE or DCI message) to activate the cell at an nth slot. The wireless device 2220 may not receive (e.g., detect) a command activating a cell, for example, a PCell. The wireless device 2220 may activate the PCell at step 2212, for example, after the wireless device 2220 receives/detects RRC message comprising configuration parameters of the PCell. The wireless device 2220 may start monitoring a PDCCH transmission on BWP 1 based on (e.g., after or in response to) activating the PCell at step 2212.

The wireless device 2220 may start (or restart) at step 2214, a BWP inactivity timer (e.g., bwp-InactivityTimer) at an mth slot based on (e.g., after or in response to) receiving a DCI message 2206 indicating DL assignment on BWP 1. The wireless device 2220 may switch back at step 2216 to the default BWP (e.g., BWP 0) as an active BWP, for example, if the BWP inactivity timer expires at step 2208, at sth slot. At step 2210, the wireless device 2220 may deactivate the cell and/or stop the BWP inactivity timer, for example, if a secondary cell deactivation timer (e.g., sCellDeactivationTimer) expires at step 2210 (e.g., if the cell is a SCell). The wireless device 2220 may not deactivate the cell and may not apply or use a secondary cell deactivation timer (e.g., sCellDeactivationTimer) on the PCell, for example, based on the cell being a PCell.

A wireless device (e.g., a MAC entity of the wireless device) may apply or use various operations on an active BWP for an activated serving cell configured with a BWP. The various operations may comprise at least one of: sending (e.g., transmitting) on UL-SCH, sending (e.g., transmitting) on RACH, monitoring a PDCCH transmission, sending (e.g., transmitting) PUCCH, receiving DL-SCH, and/or (re-) initializing any suspended configured uplink grants of configured grant Type 1 according to a stored configuration, if any.

A wireless device (e.g., a MAC entity of the wireless device) may not perform certain operations, for example, on an inactive BWP for an activated serving cell (e.g., each activated serving cell) configured with a BWP. The certain operations may include at least one of sending (e.g., transmit) on UL-SCH, sending (e.g., transmit) on RACH, monitoring a PDCCH transmission, sending (e.g., transmit) PUCCH, sending (e.g., transmit) SRS, or receiving DL-SCH. The wireless device (e.g., the MAC entity of the wireless device) may clear any configured downlink assignment and configured uplink grant of configured grant Type 2, and/or suspend any configured uplink grant of configured Type 1, for example, on the inactive BWP for the activated serving cell (e.g., each activated serving cell) configured with the BWP.

A wireless device may perform a BWP switching of a serving cell to a BWP indicated by a PDCCH transmission, for example, if a wireless device (e.g., a MAC entity of the wireless device) receives/detects the PDCCH transmission for the BWP switching and a random access procedure associated with the serving cell is not ongoing. A bandwidth part indicator field value may indicate the active DL BWP, from the configured DL BWP set, for DL receptions, for example, if the bandwidth part indicator field is configured in DCI format 1_1. A bandwidth part indicator field value may indicate the active UL BWP, from the configured UL BWP set, for UL transmissions, for example, if the bandwidth part indicator field is configured in DCI format 0_1.

A wireless device may be provided by a higher layer parameter such as a default DL BWP (e.g., Default-DL-BWP) among the configured DL BWPs, for example, for a primary cell. A default DL BWP may be the initial active DL BWP, for example, if a wireless device is not provided with the default DL BWP by the higher layer parameter (e.g., Default-DL-BWP). A wireless device may be provided with a higher layer parameter such as a value of a timer for the primary cell (e.g., bwp-InactivityTimer). The wireless device may increment the timer, if running, every interval of 1 millisecond for frequency range 1 or every 0.5 milliseconds for frequency range 2, for example, if the wireless device may not detect a DCI format 1_1 for paired spectrum operation or if the wireless device may not detect a DCI format 1_1 or DCI format 0_1 for unpaired spectrum operation during the interval.

Procedures of a wireless device on the secondary cell may be substantially the same as on the primary cell using a timer value for a secondary cell and the default DL BWP for the secondary cell, for example, if the wireless device is configured for the secondary cell with a higher layer parameter (e.g., Default-DL-BWP) indicating a default DL BWP among the configured DL BWPs and the wireless device is configured with a higher layer parameter (e.g., bwp-InactivityTimer) indicating the timer value. A wireless device may use an indicated DL BWP and an indicated UL BWP on a secondary cell respectively as a first active DL BWP and a first active UL BWP on the secondary cell or carrier, for example, if the wireless device is configured by a higher layer parameter (e.g., Active-BWP-DL-SCell) associated with the first active DL BWP and by a higher layer parameter (e.g., Active-BWP-UL-SCell) associated with the first active UL BWP on the secondary cell or carrier.

A set of PDCCH candidates for a wireless device to monitor may be referred to as PDCCH search space sets. A search space set may comprise a CSS set or a USS set. A wireless device may monitor PDCCH transmission candidates in one or more of the following search spaces sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-ConfigCommon for a DCI format with CRC scrambled by a SI-RNTI on the primary cell of the MCG, a Type1-PDCCH CSS set configured by ra-SearchSpace in PDCCH-ConfigCommon for a DCI format with CRC scrambled by a RA-RNTI, a MsgB-RNTI, or a TC-RNTI on the primary cell, a Type2-PDCCH CSS set configured by pagingSearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, CI-RNTI, or PS-RNTI and, for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

A wireless device may determine a PDCCH transmission monitoring occasion on an active DL BWP based on one or more PDCCH transmission configuration parameters (e.g., as described with respect to FIG. 27) comprising at least one of: a PDCCH transmission monitoring periodicity, a PDCCH transmission monitoring offset, or a PDCCH transmission monitoring pattern within a slot. For a search space set (SS s), the wireless device may determine that a PDCCH transmission monitoring occasion(s) exists in a slot with number/quantity $$n_{s,f}^{\mu}$$

in a frame with number/quantity $$n_f \text{ if } \left(n_f \cdot N_{slot}^{frame,\mu} + n_{s,f}^{\mu} - o_s\right) \bmod k_s = 0.\ N_{slot}^{frame,\mu}$$

may be a number/quantity of slots in a frame if numerology μ is configured. $o_s$ may be a slot offset indicated in the PDCCH transmission configuration parameters. $k_s$ may be a PDCCH transmission monitoring periodicity indicated in the PDCCH transmission configuration parameters. The wireless device may monitor PDCCH transmission candidates for the search space set for $T_s$ consecutive slots, starting from slot $$n_{s,f}^{\mu},$$

and may not monitor PDCCH transmission candidates for search space set s for the next $k_s - T_s$ consecutive slots. A USS at CCE aggregation level $L \in \{1, 2, 4, 8, 16\}$ may be defined by a set of PDCCH transmission candidates for CCE aggregation level L.

A wireless device may decide, for a search space set s associated with CORESET p, CCE indexes for aggregation level L corresponding to PDCCH transmission candidate $m_{s,n_{CI}}$ of the search space set in slot $$n_{s,f}^{\mu}$$

for an active DL BWP of a serving cell corresponding to carrier indicator field value $n_{CI}$ as $$L \cdot \left\{\left(Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI}\right) \bmod \lfloor N_{CCE,p} / L \rfloor\right\} + i,$$

where, $$Y_{p,n_{s,f}^{\mu}} = 0$$

for any CSS;

$$Y_{p,n_{s,f}^{\mu}} = \left(A_p \cdot Y_{p,n_{s,f}^{\mu}-1}\right) \bmod D$$

for a USS, $Y_{p,-1} = N_{RNTI} \neq 0$, $A_p = 39827$ for p mod 3=0, $A_p = 39829$ for p mod 3=1, $A_p = 39839$ for p mod 3=2, and D=65537; i=0, . . . , L−1; $N_{CCE,p}$ is the number/quantity of CCEs, numbered/quantified from 0 to $N_{CCE,p}-1$, in CORESET p; $n_{CI}$ is the carrier indicator field value if the wireless device is configured with a carrier indicator field by CrossCarrierSchedulingConfig for the serving cell on which PDCCH transmission is monitored; otherwise, including for any CSS, $$n_{CI} = 0;\ m_{s,n_{CI}} = 0, \ldots, M_{s,n_{CI}}^{(L)} - 1,$$

where $$M_{s,n_{CI}}^{(L)}$$

is the number/quantity of PDCCH transmission candidates the wireless device is configured to monitor for aggregation level L of a search space set s for a serving cell corresponding to $n_{CI}$; for any CSS, $$M_{s,max}^{(L)} = M_{s,0}^{(L)};$$

for a USS, $$M_{s,max}^{(L)}$$

is the maximum of $$M_{s,n_{CI}}^{(L)}$$

over configured $n_{CI}$ values for a CCE aggregation level L of search space set s; and the RNTI value used for $n_{RNTI}$ is the C-RNTI.

A wireless device may monitor a set of PDCCH transmission candidates according to configuration parameters of a search space set comprising a plurality of search spaces. The wireless device may monitor a set of PDCCH transmission candidates in one or more CORESETs for detecting one or more DCI messages. A CORESET may be configured, for example, as described with respect to FIG. 26. Monitoring may comprise decoding one or more PDCCH transmission candidates of the set of the PDCCH transmission candidates according to the monitored DCI formats. Monitoring may comprise decoding a DCI content of one or more PDCCH transmission candidates with possible (or configured) PDCCH transmission locations, possible (or configured) PDCCH transmission formats (e.g., number/quantity of CCEs, number/quantity of PDCCH transmission candidates in common search spaces, and/or number/quantity of PDCCH transmission candidates in the wireless device-specific search spaces (e.g., the UE-specific search spaces)) and possible (or configured) DCI formats. The decoding may be referred to as blind decoding. The possible DCI formats may be based on examples of FIG. 23.

FIG. 23 shows examples of various DCI formats. The various DCI formats may be used, for example, by a base station to send (e.g., transmit) control information (e.g., to a wireless device and/or to be used by the wireless device) for PDCCH transmission monitoring. Different DCI formats may comprise different DCI fields and/or have different DCI payload sizes. Different DCI formats may have different signaling purposes. DCI format 0_0 may be used to schedule PUSCH transmission in one cell. DCI format 0_1 may be used to schedule one or multiple PUSCH transmissions in one cell or indicate CG-DFI (configured grant-Downlink Feedback Information) for configured grant PUSCH transmission, etc. The DCI format(s), that the wireless device may monitor for reception via a search space, may be configured.

FIG. 24A shows an example MIB message. FIG. 24A shows example configuration parameters of a MIB of a cell. The cell may be a PCell (or any other cell). A wireless device may receive a MIB via a PBCH. The wireless device may receive the MIB, for example, based on receiving a PSS and/or an SSS. The configuration parameters of a MIB may comprise/indicate a SFN (e.g., indicated via a higher layer parameter systemFrameNumber), subcarrier spacing indication (e.g., indicated via a higher layer parameter subCarrierSpacingCommon), a frequency domain offset (e.g., indicated via a higher layer parameter ssb-SubcarrierOffset) between SSB and overall resource block grid in number of subcarriers, a parameter indicating whether the cell is barred (e.g., indicated via a higher layer parameter cellBarred), a DMRS position indication (e.g., indicated via a higher layer parameter dmrs-TypeA-Position) indicating position of DMRS, parameters of a CORESET and a search space of a PDCCH (e.g., indicated via a higher layer parameter pdcch-ConfigSIB1) comprising a common CORESET, a common search space and necessary PDCCH parameters, etc. Each of the higher layer parameters may be indicated via one or bits. For example, the SFN may be indicated using 6 bits (or any other quantity of bits).

A configuration parameter (e.g., pdcch-ConfigSIB1) may comprise a first parameter (e.g., controlResourceSetZero) indicating a common CORESET of an initial BWP of the cell. The common CORESET may be associated with an indicator/index (e.g., 0, or any other indicator). For example, the common CORESET may be CORESET 0. The first parameter may be an integer between 0 and 15 (or any other integer). Each integer (e.g., between 0 and 15, or any other integer) may indicate/identify a configuration of CORESET 0.

FIG. 24B shows an example configuration of a CORESET. The CORESET may be CORESET 0 (or any other CORESET). A wireless device may determine an SSB and CORESET 0 multiplexing pattern, a quantity/number of RBs for CORESET 0, a quantity/number of symbols for CORESET 0, an RB offset for CORESET 0, for example, based on a value of the first parameter (e.g., controlResourceSetZero).

A higher layer parameter (e.g., pdcch-ConfigSIB1) may comprise a second parameter (e.g., searchSpaceZero). The second parameter may indicate a common search space of the initial BWP of the cell. The common search space may be associated with an indicator/index (e.g., 0, or any other indicator). For example, the common search space may be search space 0. The second parameter may be an integer between 0 and 15 (or any other integer). Each integer (e.g., between 0 and 15, or any other integer) may identify a configuration of search space 0.

FIG. 24C shows an example configuration of a search space. The search space may be search space 0 (or any other search space). A wireless device may determine one or more parameters (e.g., O, M) for slot determination for PDCCH monitoring, a first symbol indicator/index for PDCCH monitoring, and/or a quantity/number of search spaces per slot, for example, based on a value of the second parameter (e.g., searchSpaceZero). For example, for operation without shared spectrum channel access and for the SS/PBCH block and CORESET multiplexing pattern 1, the wireless device may monitor PDCCH (e.g., in the Type0-PDCCH CSS set) over two slots. For SS/PBCH block with index i, the wireless device may determine an index of slot $n_0$ as $$n_0 = (O \cdot 2^{\mu} + \lfloor i \cdot M \rfloor) \bmod N_{slot}^{frame,\mu}$$

Slot $n_0$ is may be in a frame with a SFN $SFN_C$ that satisfies the condition $SFN_c$ mod 2=0 (e.g., if $$\lfloor (O \cdot 2^{\mu} + \lfloor i \cdot M \rfloor) / N_{slot}^{frame,\mu} \rfloor) \bmod 2 = 0),$$

or in a frame with a SFN that $SFN_C$ satisfies the condition $SFN_c$ mod 2=1 (e.g., if $$\lfloor (O \cdot 2^{\mu} + \lfloor i \cdot M \rfloor) / N_{slot}^{frame,\mu} \rfloor \bmod 2 = 1),$$

where $\mu \in \{0,1,2,3,5,6\}$ based on the SCS for PDCCH receptions in the CORESET.

A wireless device may monitor a PDCCH for receiving DCI. The wireless device may monitor a search space 0 of a CORESET 0 for receiving the DCI. The DCI may schedule a SIB1. For example, a SIB1 message may be similar to as described with respect to FIG. 25. The wireless device may receive the DCI with CRC scrambled with a SI-RNTI dedicated for receiving the SIB1.

FIG. 25 shows an example SIB. The SIB may comprise one or more configuration parameters (e.g., RRC configuration parameters). A SIB (e.g., SIB1) may be sent/transmitted to one or more wireless devices. For example, the SIB may be broadcasted to multiple wireless devices. The SIB may contain information for evaluating/determining whether a wireless device is allowed to access a cell, information of paging configuration, and/or scheduling configuration of other system information. A SIB may comprise radio resource configuration information that may be common for multiple wireless devices and barring information used/applied to a unified access control. A base station may send/transmit, to a wireless device (or a plurality of wireless devices), one or more SIB information messages. As shown in FIG. 25, parameters of the one or more SIB information messages may comprise: one or more parameters for cell selection related to a serving cell (e.g., cellSelectionInfo), one or more configuration parameters of a serving cell (e.g., in ServingCellConfigCommonSIB information element (IE)), and/or one or more other parameters. The ServingCellConfigCommonSIB IE may comprise at least one of: common downlink parameters (e.g., in DownlinkConfig- CommonSIB IE) of the serving cell, common uplink parameters (e.g., in UplinkConfigCommonSIB IE) of the serving cell, and/or other parameters.

A DownlinkConfigCommonSIB IE may comprise parameters of an initial downlink BWP (e.g., indicated via initialDownlinkBWP IE) of the serving cell (e.g., SpCell). The parameters of the initial downlink BWP may be comprised in a BWP-DownlinkCommon IE (e.g., as shown in FIG. 26). The BWP-DownlinkCommon IE may be used to configure common parameters of a downlink BWP of the serving cell. The base station may configure a parameter (e.g., locationAndBandwidth) such that the initial downlink BWP may comprise an entire CORESET (e.g., CORESET 0) of the serving cell in the frequency domain. The wireless device may use/apply the parameter locationAndBandwidth based on reception of the parameter. The wireless device may use/apply the parameter locationAndBandwidth to determine the frequency position of signals in relation to the frequency as indicated via locationAndBandwidth. The wireless device may keep CORESET 0, for example, until after reception of an RRC setup message (e.g., RRCSetup), RRC resume message (e.g., RRCResume) and/or an RRC re-establishment message (e.g., RRCReestablishment).

The DownlinkConfigCommonSIB IE may comprise parameters of a paging channel configuration. The parameters may comprise a paging cycle value (T, e.g., indicated by defaultPagingCycle IE), a parameter indicating total quantity/number (N) of paging frames (PFs) (e.g., indicated by nAndPagingFrameOffset IE) and paging frame offset in a paging DRX cycle (e.g., indicated by parameter PF_offset), a quantity/number (Ns) for total paging occasions (POs) per PF, a first PDCCH monitoring occasion indication parameter (e.g., firstPDCCH-MonitoringOccasionofPO IE) indicating a first PDCCH monitoring occasion for paging of each PO of a PF. The wireless device may monitor a PDCCH for receiving a paging message, for example, based on parameters of a PCCH configuration.

A parameter (e.g., first-PDCCH-MonitoringOccasionOfPO) may be signaled in SIB1 for paging in initial DL BWP. The parameter first-PDCCH-MonitoringOccasionOfPO may be signaled in the corresponding BWP configuration, for example, for paging in a DL BWP other than the initial DL BWP.

FIG. 26 shows example RRC configuration parameters. The configuration parameters may be RRC configuration parameters for a downlink BWP of a serving cell. The configuration parameters may be indicated via a higher layer parameter BWP-DownlinkCommon IE. A base station may send/transmit to a wireless device (or a plurality of wireless devices) one or more configuration parameters of a downlink BWP (e.g., initial downlink BWP) of a serving cell. The one or more configuration parameters of the downlink BWP may comprise: one or more generic BWP parameters of the downlink BWP, one or more cell-specific parameters for PDCCH of the downlink BWP (e.g., in pdcch-ConfigCommon IE), one or more cell specific parameters for the PDSCH of the BWP (e.g., in pdsch-ConfigCommon IE), and/or one or more other parameters. A pdcch-ConfigCommon IE may comprise parameters of CORESET 0 (e.g., indicated via parameter controlResourceSetZero) which may be used in any common or wireless device-specific search spaces. A value of the controlResourceSetZero may be interpreted in the same manner as the corresponding bits in MIB parameter pdcch-ConfigSIB1. A pdcch-ConfigCommon IE may comprise parameters (e.g., in commonControlResourceSet) of an additional common control resource set which may be configured and used for any common or wireless device-specific search space. The network may use a parameter ControlResourceSetId other than 0 for this ControlResourceSet, for example, if the network configures commonControlResourceSet. The network may configure the commonControlResourceSet in SIB1 such that the SIB1 is contained within the bandwidth of CORESET 0. A pdcch-ConfigCommon IE may comprise parameters (e.g., in commonSearchSpaceList) of a list of additional common search spaces. Parameters of a search space may be implemented based on example of FIG. 27. A pdcch-ConfigCommon IE may indicate, from a list of search spaces, a search space for paging (e.g., via parameter pagingSearchSpace), a search space for random access procedure (e.g., via parameter ra-SearchSpace), a search space for SIB1 message (e.g., via parameter searchSpaceSIB1), a common search space 0 (e.g., via parameter searchSpaceZero), and/or one or more other search spaces.

A CORESET may be associated with a CORESET indicator/index (e.g., indicated via parameter ControlResourceSetId). A CORESET may be implemented based on examples described with respect to FIG. 14A and/or FIG. 14B. The CORESET index 0 may identify a common CORESET configured in MIB and in ServingCellConfigCommon (e.g., indicated via controlResourceSetZero). The CORESET index 0 may not be used in the ControlResourceSet IE. The CORESET index with other values may identify CORESETs configured by dedicated signaling or in SIB1. The controlResourceSetId may be unique among the BWPs of a serving cell. A CORESET may be associated with coresetPoolIndex indicating an index of a CORESET pool for the CORESET. A CORESET may be associated with a time duration parameter (e.g., duration) indicating contiguous time duration of the CORESET (e.g., in terms of a quantity/number of symbols). Configuration parameters of a CORESET may comprise at least one of: frequency resource indication (e.g., frequencyDomainResources), a CCE-REG mapping type indicator (e.g., cce-REG-MappingType), a plurality of TCI states, and/or an indicator indicating whether a TCI is present in a DCI, etc. The frequency resource indication (e.g., comprising a quantity/number of bits, such as 45 bits, or any other quantity of bits) may indicate frequency domain resources. Each bit of the frequency resource indication may correspond to a group of RBs (e.g., 6 RBs, or any other quantity of RBs), with the grouping starting from the first RB group in a BWP of a cell (e.g., SpCell, SCell). For example, the first (e.g., left-most, most significant) bit may correspond to the first RB group in the BWP, with the other bits sequentially corresponding to other RB groups. A bit that is set to 1 may indicate that an RB group, corresponding to the bit, is contained in the frequency domain resource of the CORESET. Bits corresponding to a group of RBs not fully contained in the BWP within which the CORESET is configured may be set to zero.

FIG. 27 shows an example configuration of a search space. The configuration of the search space may be within a SearchSpace IE. One or more search space configuration parameters of a search space may comprise at least one of: a search space ID (e.g., searchSpaceId), a CORESET indicator (ID) (e.g., controlResourceSetId), a monitoring slot periodicity and offset parameter (e.g., monitoringSlotPeriodicityAndOffset), a search space time duration value (e.g., duration), a monitoring symbol indication (e.g., monitoringSymbolsWithinSlot), a quantity/number of candidates for an aggregation level (e.g., nrofCandidates), and/or a search space type indicating a common search space type or a wireless device-specific search space type (e.g., searchSpaceType). The monitoring slot periodicity and offset parameter may indicate slots (e.g., in a radio frame) and slot offset (e.g., related to a starting of a radio frame) for PDCCH monitoring. The monitoring symbol indication may indicate symbol(s), of a slot, in which a wireless device may monitor a PDCCH on the search space. The control resource set ID may indicate/identify a CORESET on which a search space may be located.

A wireless device, in an RRC idle state (e.g., RRC_IDLE) or in an RRC inactive state (e.g., RRC_INACTIVE), may periodically monitor POs for receiving paging message(s) for the wireless device. The wireless device, in an RRC idle state or an RRC inactive state and before monitoring the POs, may wake up at a time before each PO for preparation and/or to activate (e.g., turn on) all components in preparation of data reception (e.g., warm up stage). The gap between the waking up and the PO may be set to be sufficient to accommodate all the processing requirements. The wireless device may perform, after the warming up, timing acquisition from SSB and coarse synchronization, frequency and time tracking, time and frequency offset compensation, and/or calibration of local oscillator. The wireless device, after warm up, may monitor a PDCCH for a paging DCI via one or more PDCCH monitoring occasions. The wireless device may monitor the PDCCH, for example, based on configuration parameters of the PCCH configuration (e.g., as configured in SIB1). The configuration parameters of the PCCH configuration may be as described with respect to FIG. 25.

Figure 28:
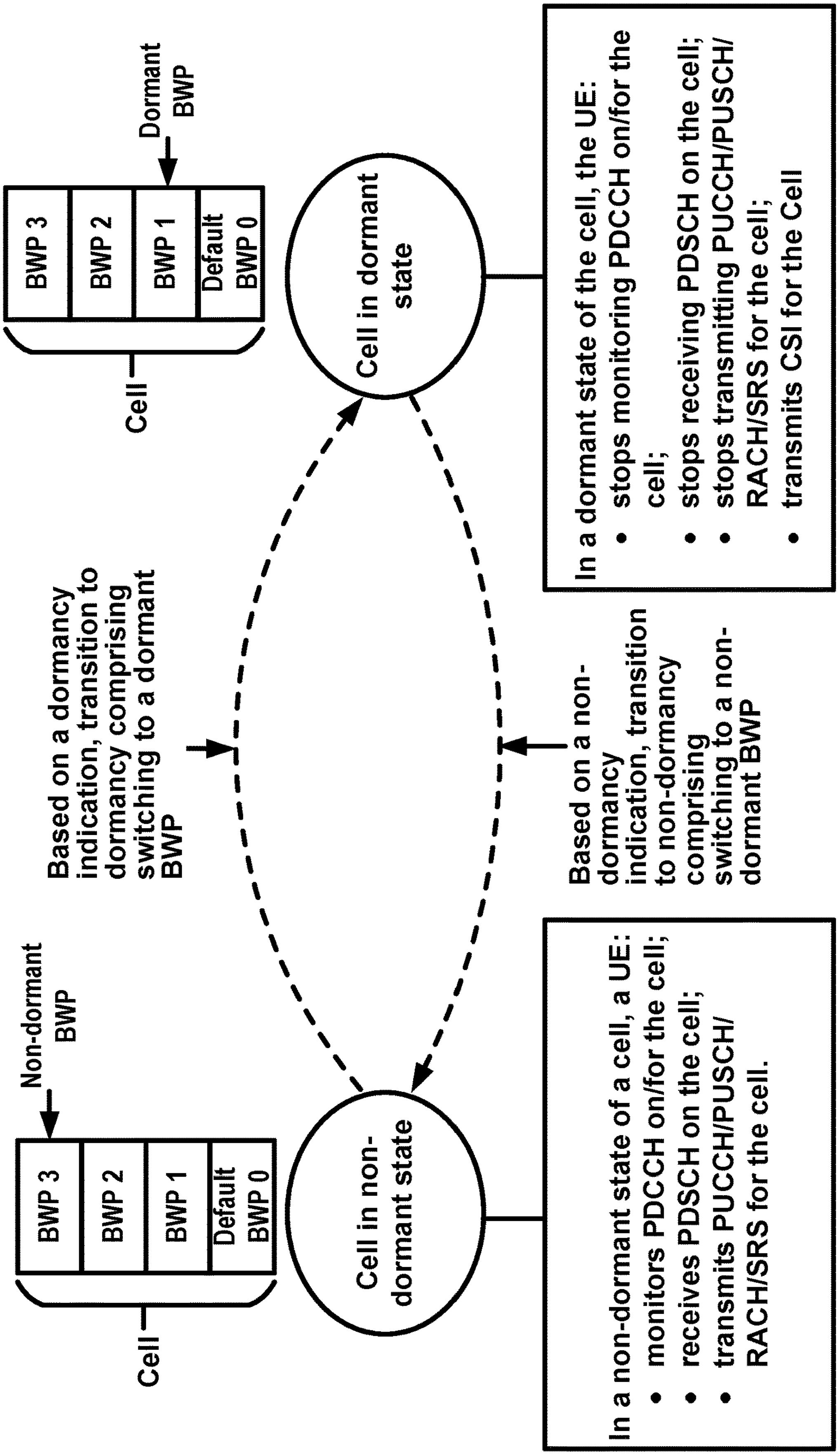
FIG. 28 shows example dormancy management.

FIG. 28 shows example cell dormancy management. Cell dormancy management may comprise transitioning between a dormant state and a non-dormant state. The example transitioning may be for operations on an SCell. A base station may send/transmit, to a wireless device, one or more RRC messages. The one or more RRC messages may comprise configuration parameters of the SCell. The SCell may comprise a plurality of BWPs. Among the plurality of BWPs, a first BWP (e.g., BWP 3) may be configured as a non-dormant BWP, and/or a second BWP (e.g., BWP 1) may be configured as a dormant BWP. A default BWP (e.g., BWP 0) may be configured in the plurality of BWPs. The non-dormant BWP may be a BWP which the wireless device may activate, for example, based on/in response to transitioning the SCell from a dormant state to a non-dormant state. The dormant BWP may be a BWP which the wireless device may switch to based on/in response to transitioning the SCell from a non-dormant state to a dormant state. The configuration parameters may indicate one or more search spaces and/or CORESETs configured on the non-dormant BWP. The configuration parameters may indicate no search spaces or no CORESETs for the dormant BWP. The configuration parameter may indicate CSI reporting configuration parameters for the dormant BWP.

An active BWP for the SCell may be a dormant BWP, a non-dormant BWP, or a default BWP. A default BWP may be different from a dormant BWP. The configuration parameters may indicate one or more search spaces and/or one or more CORESETs configured on the default BWP. A wireless device may switch to the default BWP as an active BWP, for example, if a BWP inactivity timer expires or based on receiving a DCI indicating switching to the default BWP. The wireless device may perform (e.g., if the default BWP is an active BWP), at least one of: monitoring PDCCH on the default BWP of the SCell, receiving a PDSCH transmission via the default BWP of the SCell, sending a PUSCH transmission via the default BWP of the SCell, sending an SRS via the default BWP of the SCell, and/or sending a CSI report (e.g., in a periodic, aperiodic, and/or semi-persistent manner) for the default BWP of the SCell. The wireless device may switch to the dormant BWP as an active BWP of the SCell, for example, if receiving a dormancy/non-dormancy indication indicating a dormant state for a SCell. The wireless device may (e.g., based on/in response to switching to the dormant BWP) perform at least one of: refraining from monitoring a PDCCH on the dormant BWP of the SCell (or for the SCell if the SCell is cross-carrier scheduled by another cell), refraining from receiving a PDSCH transmission via the dormant BWP of the SCell, refraining from sending a PUSCH transmission via the dormant BWP of the SCell, refraining from sending SRS via the dormant BWP of the SCell, and/or sending a CSI report (e.g., periodic, aperiodic, and/or semi-persistent CSI report) for the dormant BWP of the SCell.

A base station may send/transmit, to a wireless device, DCI via a PDCCH resource. The DCI may comprise a dormancy/non-dormancy indication indicating a dormant state or a non-dormant state for the SCell. The wireless device may (e.g., based on the dormancy/non-dormancy indication indicating a dormant state for the SCell): transition the SCell to the dormant state (e.g., if the SCell is in a non-dormant state before receiving the DCI), or maintain the SCell in the dormant state (e.g., if the SCell is in the dormant state before receiving the DCI). Transitioning the SCell to the dormant state may comprise switching to the dormant BWP (e.g., configured by the base station) of the SCell. The wireless device may (e.g., based on the dormancy/non-dormancy indication indicating a non-dormant state for the SCell): transition the SCell to the non-dormant state (e.g., if the SCell is in a dormant state before receiving the DCI), or maintain the SCell in the non-dormant state (e.g., if the SCell is in the non-dormant state before receiving the DCI). Transitioning the SCell to the non-dormant state may comprise switching to a non-dormant BWP (e.g., configured by the base station) of the SCell.

The wireless device may switch to the non-dormant BWP (e.g., BWP 3), configured by the base station, as an active BWP of the SCell, for example, based on transitioning the SCell from a dormant state to a non-dormant state. The wireless device may perform (e.g., based on the switching to the non-dormant BWP as the active BWP of the SCell) at least one of: monitoring PDCCH on the active BWP of the SCell (or monitoring PDCCH for the SCell if the SCell is configured to be cross-carrier scheduled by another cell), receiving a PDSCH transmission via the active BWP of the SCell, and/or sending a PUCCH transmission, a PUSCH transmission, a RACH transmission and/or an SRS transmission via the active BWP (e.g., if the active BWP is an uplink BWP).

The wireless device may switch to the dormant BWP (e.g., BWP 1 of the SCell), configured by the base station, for example, based on transitioning the SCell from a non-dormant state to a dormant state. The wireless device may perform (e.g., based on the switching to the dormant BWP of the SCell) at least one of: refraining from monitoring PDCCH on the dormant BWP of the SCell (or refraining from monitoring PDCCH for the SCell if a the SCell is configured to be cross-carrier scheduled by another cell), refraining from receiving a PDSCH transmission via the dormant BWP of the SCell, refraining from sending a PUCCH transmission, a PUSCH transmission, a RACH transmission, and/or an SRS transmission via the dormant BWP (e.g., if the dormant BWP is an uplink BWP), and/or sending a CSI report for the dormant BWP of the SCell (e.g., based on the CSI reporting configuration parameters configured on the dormant BWP of the SCell).

DRX operation may be used by a wireless device to improve the wireless device battery lifetime. With DRX configured, the wireless device may discontinuously monitor downlink control channel, for example, PDCCH or EPDCCH. A base station may configure DRX operation with a set of DRX parameters, for example, using RRC configuration. The set of DRX parameters may be selected based on the application type such that the wireless device may reduce power and resource consumption. The wireless device may receive data packets with an extended delay, since the wireless device may be in DRX Sleep/Off state at the time of data arrival at the wireless device and the base station may wait until the wireless device transitions to the DRX ON state, for example, based on (e.g., after or in response to) DRX being configured/activated.

For a DRX mode, the wireless device may power down most of its circuitry, for example, if there are no packets to be received. The wireless device may monitor PDCCH discontinuously in the DRX mode. The wireless device may monitor the PDCCH continuously, for example, if a DRX operation is not configured. For this time the wireless device listens to the downlink (DL) (or monitors PDCCHs) which is called DRX Active state. In a DRX mode, a time for which the wireless device doesn't listen/monitor PDCCH is called DRX Sleep state.

Figure 29:
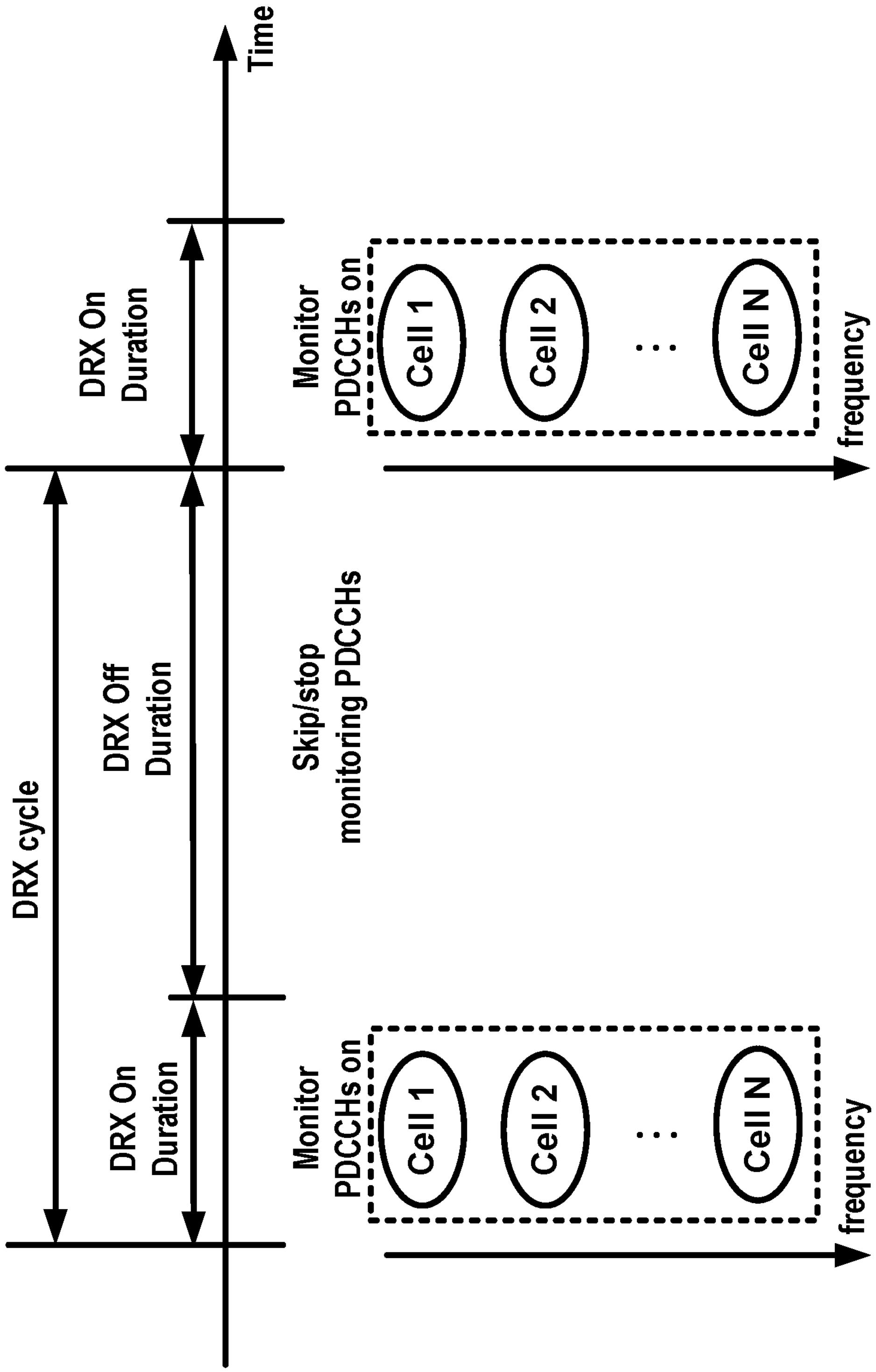
FIG. 29 shows an example of DRX configuration for a wireless device.

FIG. 29 shows an example of DRX configuration for a wireless device. A base station may send (e.g., transmit) an RRC message comprising one or more DRX parameters of a DRX cycle. The one or more parameters may comprise a first parameter and/or a second parameter. The first parameter may indicate a first time/window value of the DRX Active state (e.g., DRX on duration) of the DRX cycle. The second parameter may indicate a second time of the DRX Sleep state (e.g., DRX Off duration) of the DRX cycle. The one or more parameters may further comprise a time duration of the DRX cycle. For the DRX Active state, the wireless device may monitor PDCCHs for detecting one or more DCIs on a serving cell. For the DRX Sleep state, the wireless device may stop monitoring PDCCHs on the serving cell. The wireless device may monitor all PDCCHs on (or for) the multiple cells for the DRX Active state, for example, if multiple cells are in active state. For the DRX off duration, the wireless device may stop monitoring all PDCCH on (or for) the multiple cells. The wireless device may repeat the DRX operations according to the one or more DRX parameters.

DRX may be beneficial to the base station. The wireless device may be sending (e.g., transmitting) periodic CSI and/or SRS frequently (e.g., based on the configuration), for example, if DRX is not configured. With DRX, for DRX OFF periods, the wireless device may not send (e.g., transmit) periodic CSI and/or SRS. The base station may assign these resources to the other wireless devices to improve resource utilization efficiency.

The MAC entity may be configured by RRC with a DRX functionality that controls the wireless device's downlink control channel (e.g., PDCCH) monitoring activity for a plurality of RNTIs for the MAC entity. The plurality of RNTIs may comprise at least one of: C-RNTI; CS-RNTI; INT-RNTI; SP-CSI-RNTI; SFI-RNTI; TPC-PUCCH-RNTI; TPC-PUSCH-RNTI; Semi-Persistent Scheduling C-RNTI; eIMTA-RNTI; SL-RNTI; SL-V-RNTI; CC-RNTI; or SRS-TPC-RNTI. The MAC entity may monitor the PDCCH discontinuously using the DRX operation (e.g., if DRX is configured), for example, based on being RRC_CONNECTED; otherwise the MAC entity may monitor the PDCCH continuously.

RRC may control DRX operation by configuring a plurality of timers. The plurality of timers may comprise: a DRX On duration timer (e.g., drx-onDurationTimer); a DRX inactivity timer (e.g., drx-InactivityTimer); a downlink DRX HARQ round trip time (RTT) timer (e.g., drx-HARQ-RTT-TimerDL); an uplink DRX HARQ RTT Timer (e.g., drx-HARQ-RTT-TimerUL); a downlink retransmission timer (e.g., drx-RetransmissionTimerDL); an uplink retransmission timer (e.g., drx-RetransmissionTimerUL); one or more parameters of a short DRX configuration (e.g., drx-ShortCycle and/or drx-ShortCycleTimer)) and one or more parameters of a long DRX configuration (e.g., drx-LongCycle). Time granularity for DRX timers may be in terms of PDCCH subframes (e.g., indicated as psf in the DRX configurations), and/or in terms of milliseconds.

Based on a DRX cycle being configured, the Active Time of the DRX operation may include the time for which at least one timer is running. The at least one timer may comprise drx-onDurationTimer, drx-InactivityTimer, drx-RetransmissionTimerDL, drx-RetransmissionTimerUL, and/or mac-ContentionResolutionTimer. For the Active time of the DRX operation, the wireless device may monitor PDCCH with RNTI(s) impacted by the DRX operation. The RNTIs may comprise C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and/or AI-RNTI.

A timer (e.g., a drx-Inactivity-Timer) may specify a time duration for which the wireless device may be active, for example, after successfully decoding a PDCCH indicating a new transmission (UL or DL or SL). This timer may be restarted upon receiving PDCCH for a new transmission (UL or DL or SL). The wireless device may transition to a DRX mode (e.g., using a short DRX cycle or a long DRX cycle), for example, based on the expiry of this timer. a cycle (e.g., a drx-ShortCycle) may be a first type of DRX cycle (e.g., if configured) that needs to be followed, for example, if the wireless device enters DRX mode. An IE (e.g., a DRX-Config IE) may indicate the length of the short cycle. A timer (e.g., a drx-ShortCycleTimer) may be expressed as multiples of a cycle (e.g., a shortDRX-Cycle). The timer may indicate the number of initial DRX cycles to follow the short DRX cycle, for example, before entering the long DRX cycle. A timer (e.g., a drx-onDurationTimer) may specify the time duration at the beginning of a DRX Cycle (e.g., DRX ON). A timer (e.g., a drx-onDurationTimer) may indicate the time duration, for example, before entering the sleep mode (DRX OFF). A timer (e.g., a drx-HARQ-RTT-TimerDL) may specify a minimum duration from the time new transmission is received and, for example, before the wireless device may expect a retransmission of a same packet. This timer may be fixed and may not be configured by RRC. A timer (e.g., a drx-RetransmissionTimerDL) may indicate a maximum duration for which the wireless device may be monitoring PDCCH, for example, if a retransmission from the eNodeB is expected by the wireless device.

The Active Time may comprise the time for which a Scheduling Request is sent on PUCCH and is pending, for example, based on (e.g., after or in response to) a DRX cycle being configured. Based on (e.g., after or in response to) a DRX cycle being configured, the Active Time may comprise the time for which an uplink grant for a pending HARQ retransmission can occur and there is data in the corresponding HARQ buffer for synchronous HARQ process. The Active Time may comprise the time for which a PDCCH may indicate a new transmission addressed to the C-RNTI of the MAC entity has not been received, for example, after successful reception of a Random Access Response for the preamble not selected by the MAC entity, for example, based on a DRX cycle being configured.

A timer, such as a DL HARQ RTT Timer (e.g., drx-HARQ-RTT-TimerDL), may expire in a subframe and the data of the corresponding HARQ process may not be successfully decoded. The MAC entity may start the timer (e.g., the drx-RetransmissionTimerDL) for the corresponding HARQ process. A UL HARQ RTT Timer (e.g., drx-HARQ-RTT-TimerUL) may expire in a subframe. The MAC entity may start the timer (e.g., the drx-RetransmissionTimerUL) for the corresponding HARQ process.

A wireless device may receive a DRX Command MAC CE and/or a Long DRX Command MAC CE (e.g., based on examples described herein with respect to FIG. 19). The MAC entity of the wireless device may stop a timer (e.g., a drx-onDurationTimer) and/or stop another timer (e.g., drx-InactivityTimer), for example, based on receiving the DRX Command MAC CE and/or the long DRX Command MAC CE. The MAC entity may start or restart a timer (e.g., a drx-ShortCycleTimer) and/or may use a cycle (e.g., Short DRX Cycle), for example, if an inactivity timer (e.g., drx-InactivityTimer) expires and/or if the cycle is being configured. For example, the MAC entity may use a cycle (e.g., the Long DRX cycle).

A timer (e.g., a drx-ShortCycleTimer) may expire in a subframe. The MAC entity may use a cycle (e.g., the Long DRX cycle). A Long DRX Command MAC control element may be received. The MAC entity may stop a timer (e.g., a drx-ShortCycleTimer) and may use the Long DRX cycle.

The wireless device may start a timer (e.g., a drx-onDurationTimer), for example, after a value (e.g., drx-SlotOffset) from the beginning of the subframe, wherein drx-SlotOffset may be a value (configured in the DRX configuration parameters) indicating a delay, for example, before starting the drx-onDurationTimer, for example, if the Short DRX Cycle is used and [(SFN*10)+subframe number] modulo (drx-ShortCycle)=(drxStartOffset) modulo (drx-ShortCycle). The wireless device may start a timer (e.g., drx-onDurationTimer), for example, after a value (e.g., drx-SlotOffset) from the beginning of the subframe, wherein drx-SlotOffset may be a value (configured in the DRX configuration parameters) indicating a delay, for example, before starting the drx-onDurationTimer, for example, if the Long DRX Cycle is used and [(SFN*10)+subframe number] modulo (drx-longCycle)=drxStartOffset.

Figure 30:
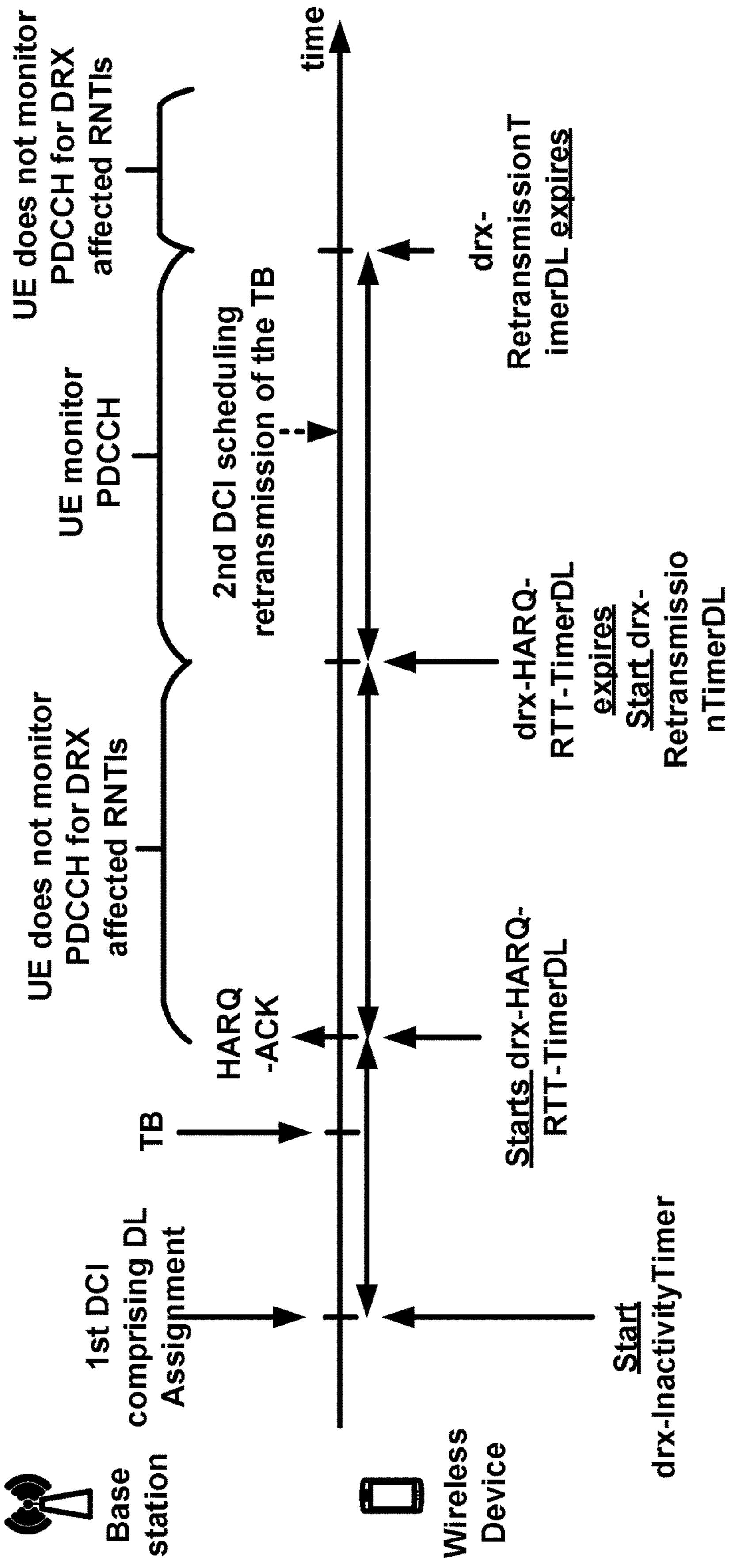
FIG. 30 shows an example of DRX configuration for a wireless device.

FIG. 30 shows an example of DRX configuration for a wireless device. A base station may send (e.g., transmit) an RRC message comprising configuration parameters of DRX operation. The configuration parameters may comprise a first timer value for a DRX inactivity timer (e.g., drx-InactivityTimer), a second timer value for a HARQ RTT timer (e.g., drx-HARQ-RTT-TimerDL, drx-HARQ-RTT-TimerUL), a third timer value for a HARQ retransmission timer (e.g., drx-RetransmissionTimerDL and/or drx-RetransmissionTimerUL).

A base station may send (e.g., transmit), via a PDCCH, DCI (e.g., 1st DCI) comprising downlink assignment for a TB, to a wireless device (such as shown in FIG. 30). The wireless device may start the drx-InactivityTimer, for example, based on (e.g., after or in response to) receiving the DCI. The wireless device may monitor the PDCCH, for example, for a timer (e.g., the drx-InactivityTimer) running. The wireless device may receive a TB based on receiving the DCI. The wireless device may send (e.g., transmit) a NACK to the base station upon unsuccessful decoding the TB. The wireless device may start a HARQ RTT Timer (e.g., drx-HARQ-RTT-TimerDL) in the first symbol, for example, after the end of sending (e.g., transmitting) the NACK. The wireless device may stop a retransmission timer (e.g., the drx-RetransmissionTimerDL) for a HARQ process corresponding to the TB. The wireless device may stop monitoring the PDCCH for one or more RNTI(s) impacted by the DRX operation, for example, for the HARQ RTT Timer running. The one or more RNTI(s) may comprise C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and/or AI-RNTI.

The wireless device may monitor the PDCCH and start a HARQ retransmission timer (e.g., drx-RetransmissionTimerDL), for example, if the HARQ RTT Timer expires (such as shown in FIG. 30). The wireless device, for monitoring the PDCCH, may receive second DCI (e.g., 2nd DCI in FIG. 30) scheduling retransmission of the TB, for example, if the HARQ retransmission timer is running. The wireless device may stop monitoring the PDCCH, for example, if not receiving the second DCI (e.g., before the HARQ retransmission timer expires).

Figure 31A:
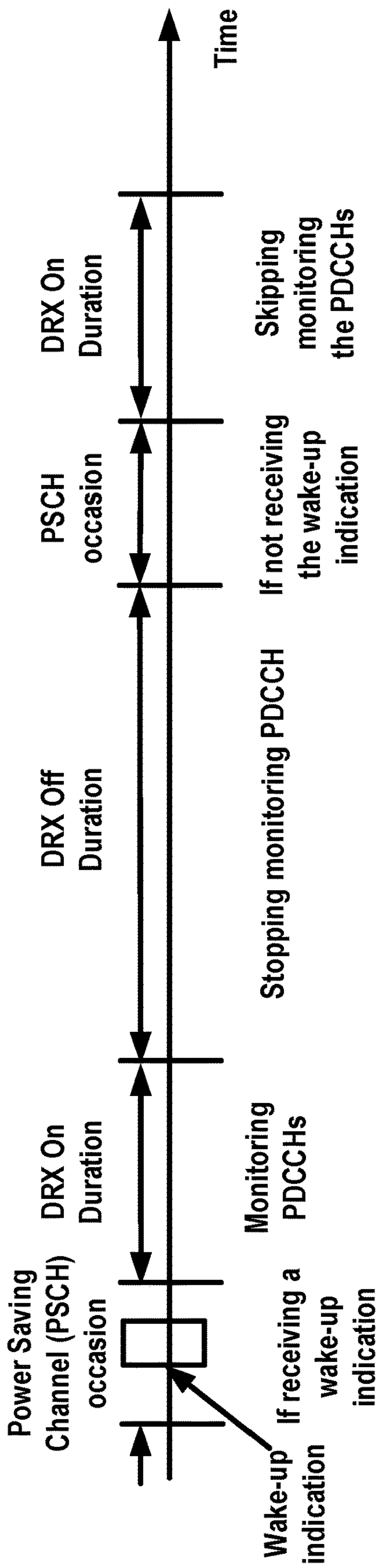
FIG. 31A and FIG. 31B show examples of power saving operations of a wireless device.

FIG. 31A shows an example power saving operation for a wireless device. The example power saving operation of FIG. 31A may be based on a wake-up indication. A base station may send/transmit one or more messages comprising parameters of a wake-up duration (e.g., a power saving duration, or a power saving channel (PSCH) occasion), to a wireless device. The wake-up duration may be located at (e.g., start from) a time that is a quantity/number of slots (or symbols) before a DRX ON duration of a DRX cycle. The quantity/number of slots (or symbols) may be a gap between a wake-up duration and a DRX ON duration. A DRX cycle may be implemented based on examples, such as described with respect to FIG. 29. The quantity of slots may be configured in the one or more RRC messages or may be predefined as a fixed value. The gap may be used for at least one of: synchronization with the base station, measuring reference signals, and/or retuning RF parameters. The gap may be determined based on a capability of the wireless device and/or the base station. The parameters of the wake-up duration may be pre-defined without RRC configuration. The wake-up mechanism may be based on a wake-up indication (e.g., via a PSCH). The parameters of the wake-up duration may comprise at least one of: a PSCH channel format (e.g., numerology, DCI format, PDCCH format), a periodicity of the PSCH, a control resource set, and/or a search space of the PSCH. The wireless device may monitor the PSCH for receiving the wake-up signal during the wake-up duration, for example, if configured with the parameters of the wake-up duration. The wireless device may monitor the PSCH for detecting a wake-up indication during the PSCH occasion/wake-up duration, for example, if configured with the parameters of the PSCH occasion. The wireless device may wake up to monitor PDCCHs in a DRX active time (e.g., comprising DRX ON duration) of a next DRX cycle according to the DRX configuration, for example, based on/in response to receiving the wake-up signal/channel (or a wake-up indication via the PSCH). The wireless device may monitor PDCCHs in the DRX active time (e.g., when drx-onDurationTimer is running), for example, based on/in response to receiving the wake-up indication via the PSCH. The wireless device may go back to sleep if the wireless device does not receive PDCCH transmissions in the DRX active time. The wireless device may stay in a sleep state during the DRX OFF duration of the DRX cycle. The wireless device may skip monitoring PDCCHs in the DRX active time, for example, if the wireless device doesn't receive the wake-up signal/channel (or a wake-up indication via the PSCH) during the wake-up duration (or the PSCH occasion). The wireless device may skip monitoring PDCCHs in the DRX active time, for example, if the wireless device receives, during the wake-up duration (or the PSCH occasion), an indication indicating skipping PDCCH monitoring.

Figure 31B:
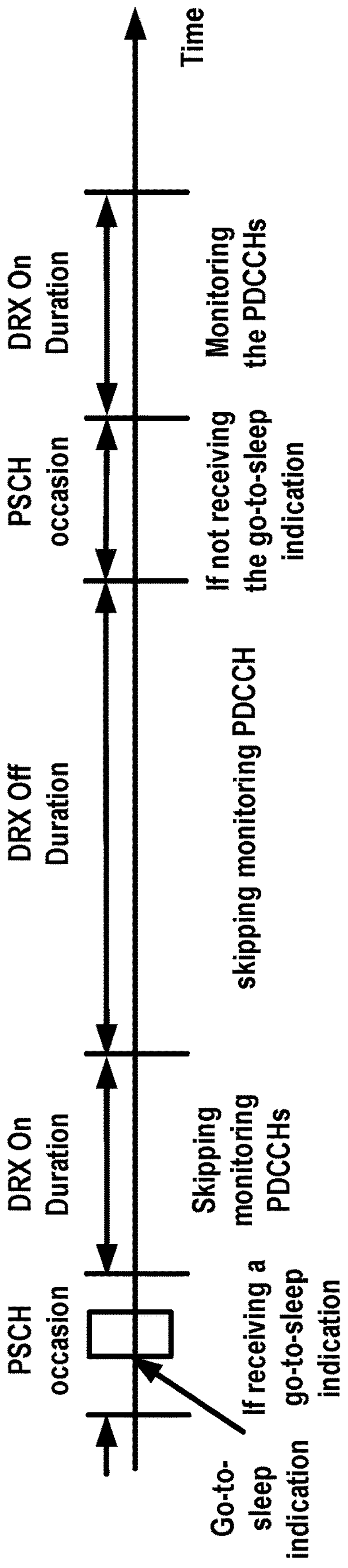

FIG. 31B shows an example power saving operation for a wireless device. The power saving operation of FIG. 31B may be based on go-to-sleep indication. The wireless device may go back to sleep and skip monitoring PDCCHs during the DRX active time (e.g., during a next DRX ON duration of a DRX cycle), for example, based on/in response to receiving a go-to-sleep indication via the PSCH. The wireless device may monitor PDCCH during the DRX active time, according to the configuration parameters of the DRX operation, for example, if the wireless device doesn't receive the go-to-sleep indication via the PSCH during the wake-up duration. The power saving mechanisms of FIGS. 31A and 31B may reduce power consumption for PDCCH monitoring during the DRX active time.

A power saving operation may be based on combining the operations described with respect to FIG. 31A and FIG. 31B. A base station may send/transmit a power saving indication, in DCI via a PSCH, indicating whether the wireless device may wake up for a next DRX ON duration or skip the next DRX ON duration. The wireless device may receive the DCI via the PSCH. The wireless device may wake up for next DRX ON duration, for example, based on/in response to the power saving indication indicating that the wireless device may wake up for next DRX ON duration. The wireless device may monitor PDCCH in the next DRX ON duration in response to the waking up. The wireless device may go to sleep during or skip the next DRX ON duration, for example, based on/in response to the power saving indication indicating the wireless device may skip (or go to sleep) for next DRX ON duration. The wireless device may skip monitoring PDCCH in the next DRX ON duration, for example, based on/in response to the power saving indication indicating the wireless device shall go to sleep for next DRX ON duration. Various examples described with respect to FIG. 30, FIG. 31A, and/or FIG. 31B may be extended and/or combined to further improve power consumption of a wireless device and/or signaling overhead of a base station.

Figure 32A:
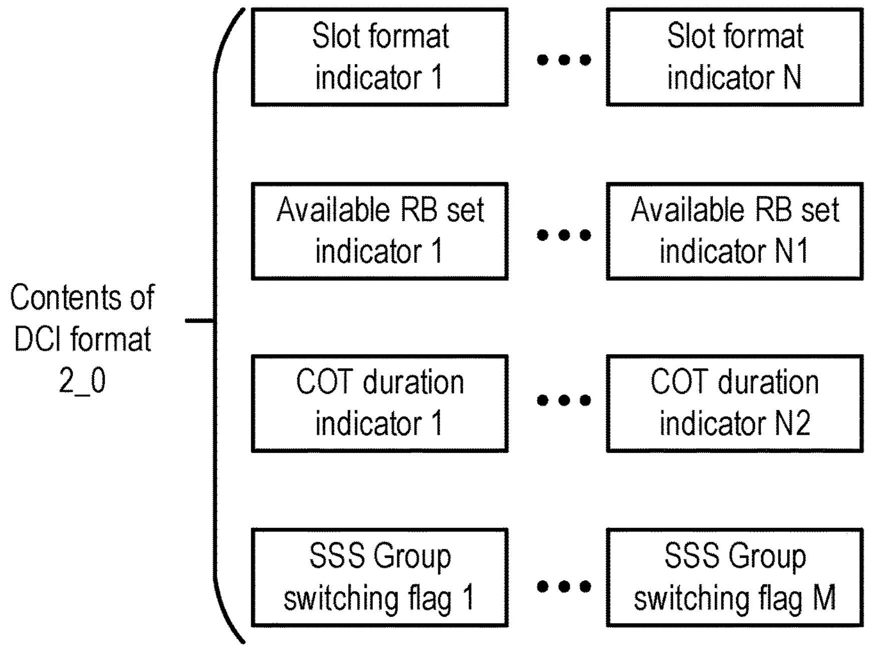
FIG. 32A and FIG. 32B show examples of search space set group (SSSG) switching for power saving of a wireless device.

FIG. 32A shows an example of SSSG switching for power saving of a wireless device. The example of FIG. 32A may comprise an example DCI format. The DCI format may correspond to DCI format 2_0 and may comprise one or more search space set groups (or SSSGs) switching indications (or SSSG switching flags). The DCI format 2_0 may comprise one or more slot format indicators (e.g., slot format indicator 1, slot format indicator 2, . . . slot format indicator N), one or more available RB set indicators, one or more channel occupancy time (COT) duration indications, and/or one or more SSSG switching flags. Each of the one or more SSSG switching flags may correspond to a respective cell group of a plurality of cell groups. Each cell group of the plurality of cell groups may comprise one or more cells. An SSSG switching flag, of the one or more SSSG switching flags, corresponding to a cell group, may indicate switching from a first SSSG to a second SSSG for each cell of the cell group, for example, if the SSSG switching flag is set to a first value. The SSSG switching flag may indicate switching from the second SSSG to the first SSSG for each cell of the cell group, for example, if the SSSG switching flag is set to a second value.

Figure 32B:
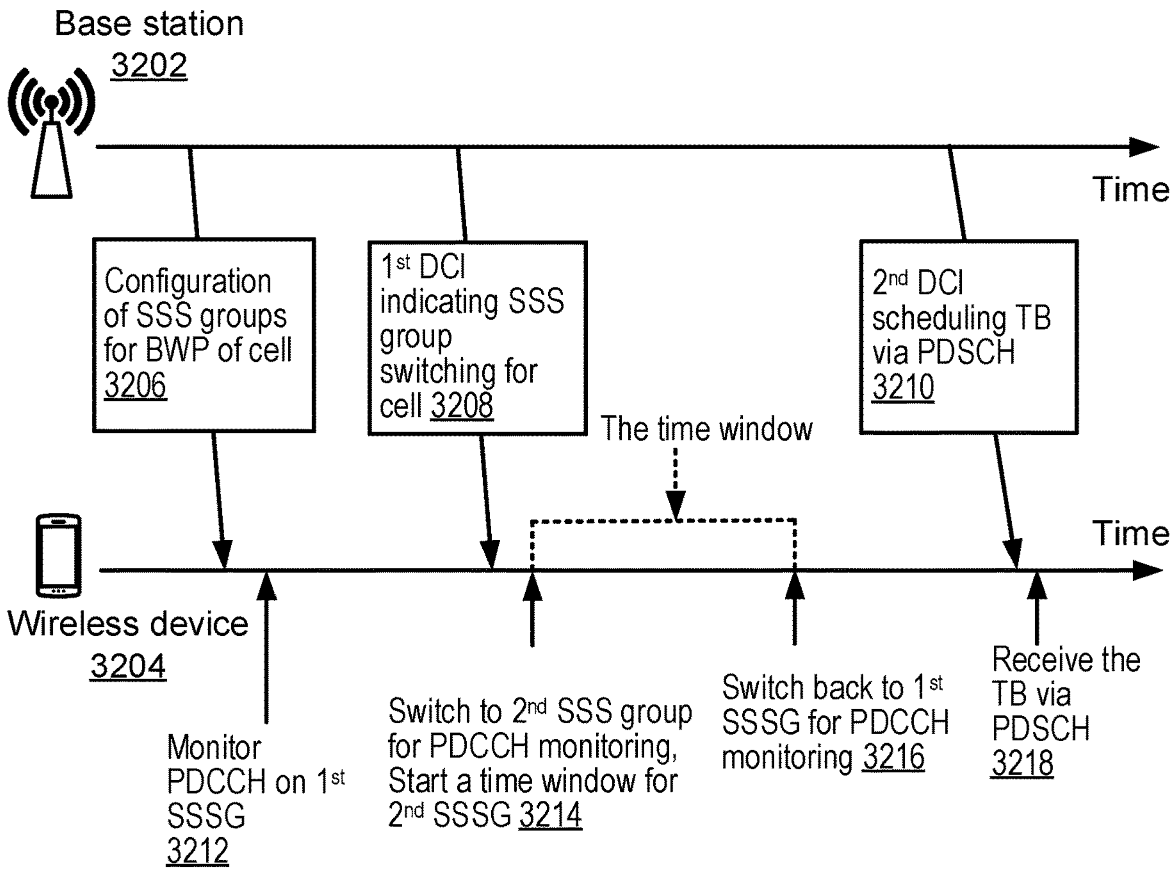

FIG. 32B shows an example of SSSG switching for power saving of a wireless device. The SSSG switching may be based on DCI (e.g., corresponding to DCI format 2_0, or other DCI formats as described with respect to FIG. 23). A wireless device 3004 may receive configuration 3006 of SSSG for a BWP of a cell. The configuration 3006 may comprise a plurality of parameters. The configuration 3006 may be via RRC messaging and/or SIB1 messaging.

The wireless device 3004 may be provided/indicated with a group indicator/index for a search space set (e.g., a Type3-PDCCH CSS set, a USS set, or any other type of search space set) by a parameter (e.g., searchSpaceGroupIdList, as described with respect to FIG. 27) for PDCCH monitoring on a serving cell.

The wireless device 3004 may or may not be provided/indicated with the parameter searchSpaceGroupIdList for a search space set. The SSSG switching as described with respect to FIG. 32B may not be applicable for PDCCH monitoring on the search space, for example, if the search space set is not configured with searchSpaceGroupIdList. The wireless device 3004 may monitor the search space set on a BWP, without switching away from the search space set, for PDCCH monitoring, for example, if the search space set is not configured with searchSpaceGroupIdList.

SSSG switching as shown in FIG. 32B may use/apply to all serving cells within each group, for example, if the wireless device 3004 is provided/indicated with parameter cellGroupsForSwitchList (e.g., as described with respect to FIG. 26), indicating one or more groups of serving cells. The SSSG switching as described with respect to FIG. 32B may use/apply only to a serving cell for which the wireless device 3004 is provided/indicated with parameter searchSpaceGroupIdList, for example, if the wireless device 3004 is not provided/indicated with the parameter cellGroupsForSwitchList. The wireless device 3004 may reset PDCCH monitoring according to search space sets with a specific group index (e.g., group index 0), for example, if a wireless device 3004 is provided/indicated with parameter searchSpaceGroupIdList.

The wireless device 3004 may be provided/indicated with parameter searchSpaceSwitchDelay (e.g., as shown in FIG. 26) with a quantity/number of symbols switch based on wireless device processing capability (e.g., wireless device processing capability 1, wireless device processing capability 2, etc.) and sub-carrier spacing (SCS) configuration u. Wireless device processing capability 1 for SCS configuration u may use/apply unless the wireless device 3004 indicates support for wireless device processing capability 2. For example, $P_{switch}$ may be 25 for wireless device capability 1 and $\mu$=0, $P_{switch}$ may be 25 for wireless device capability 1 and $\mu$=1, $P_{switch}$ may be 25 for wireless device capability 1 and $\mu$=2, $P_{switch}$ may be 10 for wireless device capability 2 and $\mu$=0, $P_{switch}$ may be 12 for wireless device capability 2 and $\mu$=1, and $P_{switch}$ may be 22 for wireless device capability 2 and $\mu$=2, etc.

The wireless device 3004 may be provided/indicated with parameter searchSpaceSwitchTimer (in units of slots, e.g., as shown in FIG. 26). The parameter searchSpaceSwitchTimer may be with a timer value for a serving cell for which the wireless device 3004 is provided with the parameter searchSpaceGroupIdList or may be for a set of serving cells indicated by parameter cellGroupsForSwitchList (e.g., if provided). The wireless device 3004 may decrement the timer value by one after each slot based on a reference SCS configuration that is a smallest SCS configuration u among all configured downlink BWPs in the serving cell, or in the set of serving cells. The wireless device 3004 may maintain the reference SCS configuration during the timer decrement procedure.

Parameter searchSpaceSwitchTimer may be defined as a value in unit of slots. The parameter searchSpaceSwitchTimer may indicate a time duration for monitoring PDCCH in the active downlink BWP of the serving cell before moving to a default search space group (e.g., search space group 0). The timer value may be based on SCS. A valid timer value may be one of {1, . . . , 20}, for example, if SCS is 15 kHz. A valid timer value may be one of {1, . . . , 40}, for example, if SCS is 30 kHz. A valid timer value may be one of {1, . . . , 80}, for example, if SCS is 60 kHz. The base station may configure a same timer value for all serving cells in a same cell group as indicated by parameter CellGroupForSwitch.

The wireless device 3004 may monitor (e.g., step 3012) PDCCH on a first SSSG (e.g., search space sets with group index 0) based on configuration of SSSG of a BWP of a cell (e.g., via configuration 3006). The wireless device 3004 may be provided/indicated with SearchSpaceSwitchTrigger indicating a location of a SSSG switching flag field for a serving cell as present in DCI (e.g., DCI corresponding to a DCI format 2_0). The parameter SearchSpaceSwitchTrigger may be configured as shown in FIG. 27.

The wireless device 3004 may receive DCI 3008 (e.g., with DCI format 2_0). The DCI 3008 may indicate a SSSG switching for the cell, for example, if a value of the SSSG switching flag field in the DCI 3008 is 1 (or any other predefined value). The wireless device 3004 may switch (e.g., step 3014) to a second SSSG for PDCCH monitoring. The wireless device 3004 may start monitoring PDCCH on the second SSSG (e.g., search space sets with group index 1) and stop monitoring PDCCH on the first SSSG (or the search space sets with group index 0) for the serving cell. The wireless device 3004 may start monitoring PDCCH on the second SSSG (e.g., search space sets with group index 1) and stop monitoring PDCCH on the first SSSG at a first slot that is at least $P_{switch}$ symbols after a last symbol of the PDCCH comprising the DCI. The wireless device 3004 may start window (e.g., start a search space switching timer), for example, based on switching to the second SSSG. The wireless device 3004 may set the timer value of the search space switching timer to the value provided/indicated by parameter searchSpaceSwitchTimer, for example, based on receiving the DCI.

The wireless device 3004 may monitor PDCCH on the second SSSG (e.g., search space sets with group index 1) based on configuration of SSSGs of a BWP of a cell. The wireless device 3004 may be indicated, via parameter SearchSpaceSwitchTrigger, a location of a SSSG switching flag field for a serving cell in DCI (e.g., corresponding to DCI format 2_0). The wireless device 3004 may receive DCI. The DCI may indicate SSSG switching for the cell, for example, if a value of the SSSG switching flag field in the DCI is 0. The wireless device 3004 may start monitoring PDCCH on search space sets with group index 0 and stop monitoring PDCCH on search space sets with group index 1 for the serving cell, for example, if a value of the SSSG switching flag field in the DCI is 0. The wireless device 3004 may start monitoring the PDCCH on search space sets with group index 0 and stop monitoring PDCCH on search space sets with group index 1 at a first slot that is at least $P_{switch}$ symbols after the last symbol of the PDCCH comprising the DCI.

The wireless device 3004 may start monitoring PDCCH for the serving cell on the second SSSG (e.g., search space sets with group index 1), and stop monitoring PDCCH on the first SSSG (e.g., search space sets with group index 0), for example, if the wireless device 3004 initially monitors PDCCH for the serving cell on the first SSSG. The wireless device 3004 may start monitoring PDCCH for the serving cell on the second SSSG and stop monitoring PDCCH on the first SSSG at the beginning of the first slot that is at least $P_{switch}$ symbols after a slot where the timer expires or after a last symbol of a remaining channel occupancy duration for the serving cell (e.g., as indicated by the DCI 3008).

The wireless device 3004 may or may not be provided/indicated with parameter SearchSpaceSwitchTrigger for a serving cell. For example, the parameter SearchSpaceSwitchTrigger may be absent in configuration parameters corresponding to SlotFormatIndicator (e.g., wherein SlotFormatIndicator is configured for monitoring a Group-Common-PDCCH for Slot-Format-Indicators (SFI)). The DCI 3008 (e.g., corresponding to DCI format 2_0) may not comprise a SSSG switching flag field, for example, based on the parameter SearchSpaceSwitchTrigger not being provided. The wireless device 3004 may start monitoring PDCCH on the second SSSG (e.g., a search space sets with group index 1) and stop monitoring PDCCH according on the first SSSG (e.g., a search space sets with group index 0) for the serving cell, for example, if the parameter SearchSpaceSwitchTrigger is not provided and if the wireless device 3004 detects DCI based on monitoring PDCCH on the first SSSG. The wireless device 3004 may start monitoring PDCCH on the second SSSG and stop monitoring PDCCH on the first SSSG at a first slot that is at least $P_{switch}$ symbols after the last symbol of the PDCCH comprising the DCI. The wireless device 3004 may set (or restart) the timer value to the value provided by parameter searchSpaceSwitchTimer, for example, if the wireless device 3004 detects DCI based on monitoring PDCCH in any search space set.

The wireless device 3004 may or may not be provided/indicated with parameter SearchSpaceSwitchTrigger for a serving cell. The wireless device 3004 may start monitoring PDCCH for the serving cell according to the second SSSG (e.g., search space sets with group index 1), and stop monitoring PDCCH according to the first SSSG (e.g., a search space sets with group index 0), for the serving cell, for example, if the parameter SearchSpaceSwitchTrigger is not provided and if the wireless device 3004 initially monitors PDCCH for a serving cell according to the first SSSG. The wireless device 3004 may start monitoring PDCCH for the serving cell according to the second SSSG and stop monitoring PDCCH according to the first SSSG at the beginning of the first slot that is at least $P_{switch}$ symbols after a slot where the timer expires. The wireless device 3004 may start monitoring PDCCH for the serving cell according to the second SSSG and stop monitoring PDCCH according to the first SSSG after a last symbol of a remaining channel occupancy duration for the serving cell that is indicated by DCI format 2_0, for example, if the wireless device 3004 is provided with a search space set to monitor PDCCH for detecting a DCI format 2_0.

The wireless device 3004 may switch back to the first SSSG for PDCCH monitoring (e.g., step 3016), for example, based on/after an expiration of the timer. The wireless device 3004 may start monitoring PDCCH on the first SSSG and stop monitoring PDCCH on the second SSSG, for example, based on expiration of the timer. The wireless device 3004 may receive second DCI 3010 based on the PDCCH monitoring. The second DCI 3010 may schedule a TB via a PDSCH. The wireless device 3004 may receive (e.g., step 3018) the TB via the PDSCH and based on the scheduling indicated via the second DCI 3010.

The wireless device 3004 may determine a slot and a symbol in a slot to start or stop PDCCH monitoring on search space sets for a serving cell for which the wireless device 3004 is provided/indicated with parameter searchSpaceGroupIdList. The wireless device 3004 may start or stop PDCCH monitoring on search space sets for a serving cell if parameter cellGroupsForSwitchList is provided/indicated for a set of serving cells, based on the smallest SCS configuration u among all configured downlink BWPs. The downlink BWPs may be in the serving cell or in the set of serving cells and, if any, in the serving cell where the wireless device 3004 receives a PDCCH transmission and detects a corresponding DCI format 2_0 (e.g., triggering the start or stop of PDCCH monitoring on search space sets).

Figure 33:
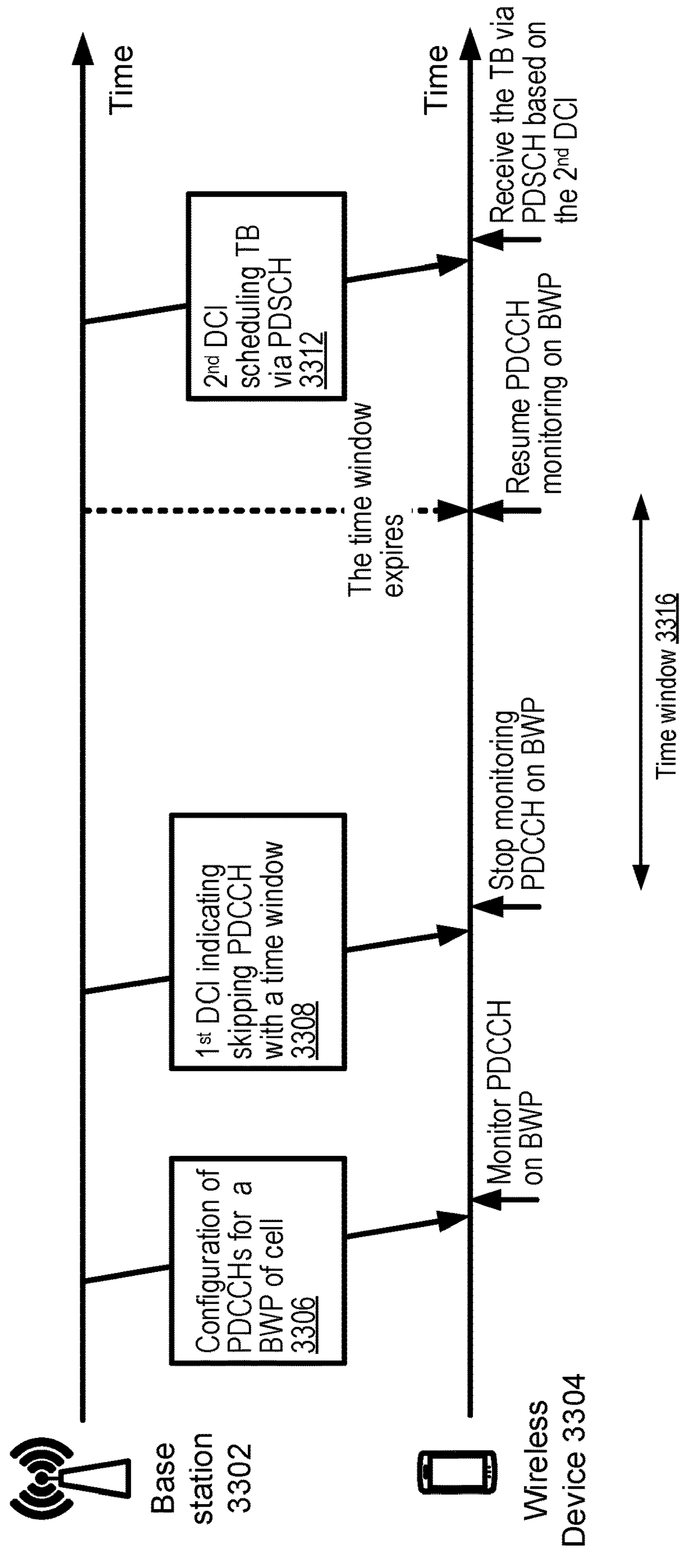
FIG. 33 shows an example of physical downlink control channel (PDCCH) skipping for power saving of a wireless device.

FIG. 33 shows an example PDCCH skipping for power saving of a wireless device. A base station 3302 may send/transmit, to a wireless device 3304, one or more RRC messages comprising configuration parameters 3306. The configuration parameters 3306 may be for a PDCCH for a BWP of a cell (e.g., as described with respect to FIG. 26 and/or FIG. 27). The wireless device 3304 may monitor PDCCH on the BWP, for example, based on the configuration parameters 3306 of the PDCCH. The BWP may a downlink BWP which may be in an active state. The wireless device 3304 may activate the BWP as described with respect to FIG. 22.

The wireless device 3304 may receive first DCI 3308 indicating skipping the PDCCH (e.g., monitoring/receiving via the PDCCH) within a time window 3316. A time value (e.g., duration) for the time window 3316 may be indicated by the first DCI 3308 or configured by the one or more RRC messages. The wireless device 3304 may stop monitoring the PDCCH on the BWP, for example, based on/in response to receiving the first DCI 3308. Stopping monitoring PDCCH on the BWP may comprise stopping monitoring the PDCCH on one or more SSSGs configured on the BWP. The wireless device 3304 may maintain an active state of the BWP. The first DCI 3308 may not indicate an active BWP switching. The base station 3302 may not send/transmit a PDCCH transmission to the wireless device 3304, for example, within/during the time window 3316 (or when a timer associated with the time window 3316 is running).

The wireless device 3304 may resume PDCCH monitoring on the BWP, for example, based on/after the expiration of the time window 3316. The wireless device 3304 may receive second DCI 3312 scheduling TB via a PDSCH, for example, based on resuming PDCCH monitoring. The wireless device 3304 may receive the TB via the PDSCH scheduled by the second DCI 3312. The base station 3302 may send/transmit the second DCI 3312 to the wireless device 3304, for example, based on/in response to expiration of the time window 3316.

A base station may send/transmit one or more SSBs (e.g., periodically) to a wireless device or a plurality of wireless devices. The wireless device (in RRC idle state, RRC inactive state, or RRC connected state) may use the one or more SSBs for time and frequency synchronization with a cell of the base station. An SSB, comprising a PSS, a SSS, a PBCH, and/or a PBCH DM-RS, may be sent/transmitted (e.g., as described with respect to FIG. 11A). An SSB may occupy a quantity/number (e.g., 4, or any other quantity) of OFDM symbols. The base station may send/transmit one or more SSBs in an SSB burst (e.g., to enable beam-sweeping for PSS/SSS and PBCH). An SSB burst may comprise a set of SSBs, with each SSB potentially being transmitted via a corresponding different beam. SSBs, in the SSB burst, may be transmitted using time-division multiplexing. An SSB burst may be within a time window (e.g., a 5 ms window, or a window of any other duration) and may be either located in first-half or in the second-half of a radio frame (e.g., with a duration of 10 ms, or any other duration). An SSB burst may be equivalently referred to as a transmission window (e.g., 5 ms, or any other time duration) in which the set of SSBs are transmitted.

The base station may indicate a transmission periodicity of SSB via an RRC message (e.g., a SIB1 message). For example, the transmission periodicity may be indicated using parameter ssb-PeriodicityServingCell as present in ServingCellConfigCommonSIB of a SIB1 message (e.g., as shown in FIG. 25). A candidate value of the transmission periodicity may be in a range of {5 ms, 10 ms, 20 ms, 40 ms, 80 ms, 160 ms}. The transmission periodicity may have any other value. A maximum quantity/number of candidate SSBs ($L_{max}$) within an SSB burst may depend on a carrier frequency/band of the cell. For example, $L_{max}$=4 if $f_c$<=3 GHZ. $L_{max}$=8 if 3 GHz<$f_c$<=6 GHz. $L_{max}$=64 if $f_c$>=6 GHZ, etc., wherein $f_c$ may be the carrier frequency of the cell. A starting OFDM symbol indicator/index, of a candidate SSB (e.g., occupying 4 OFDM symbols) within an SSB burst (e.g., comprised in a 5 ms time window), may depend on an SCS and a carrier frequency band of the cell.

FIG. 34 shows an example of SSB configurations. FIG. 34 shows an example table for determination of a starting OFDM symbol index of candidate SSBs. OFDM starting symbols may be determined as a function of a SCS and carrier frequency. For example, starting OFDM symbol indexes of SSBs in an SSB burst, for a cell configured with 15 kHz SCS and carrier frequency $f_c$<3 GHZ (e.g., $L_{max}$=4), may be 2, 8, 16, and 22. OFDM symbols in a half-frame may be indexed with the first symbol of the first slot being indexed as 0. Starting OFDM symbol indexes of SSBs in an SSB burst, for a cell configured with 15 kHz and carrier frequency 3 GHz<$f_c$<6 GHz ($L_{max}$=8) may be 2, 8, 16, 22, 30, 36, 44 and 50. Starting OFDM symbol indexes for other SCSs and carrier frequencies may be similarly determined in accordance with the table shown in FIG. 34. The base station may send/transmit only one SSB by using the first SSB starting position, for example, if the base station is not transmitting the SSBs with beam forming.

Figure 35:
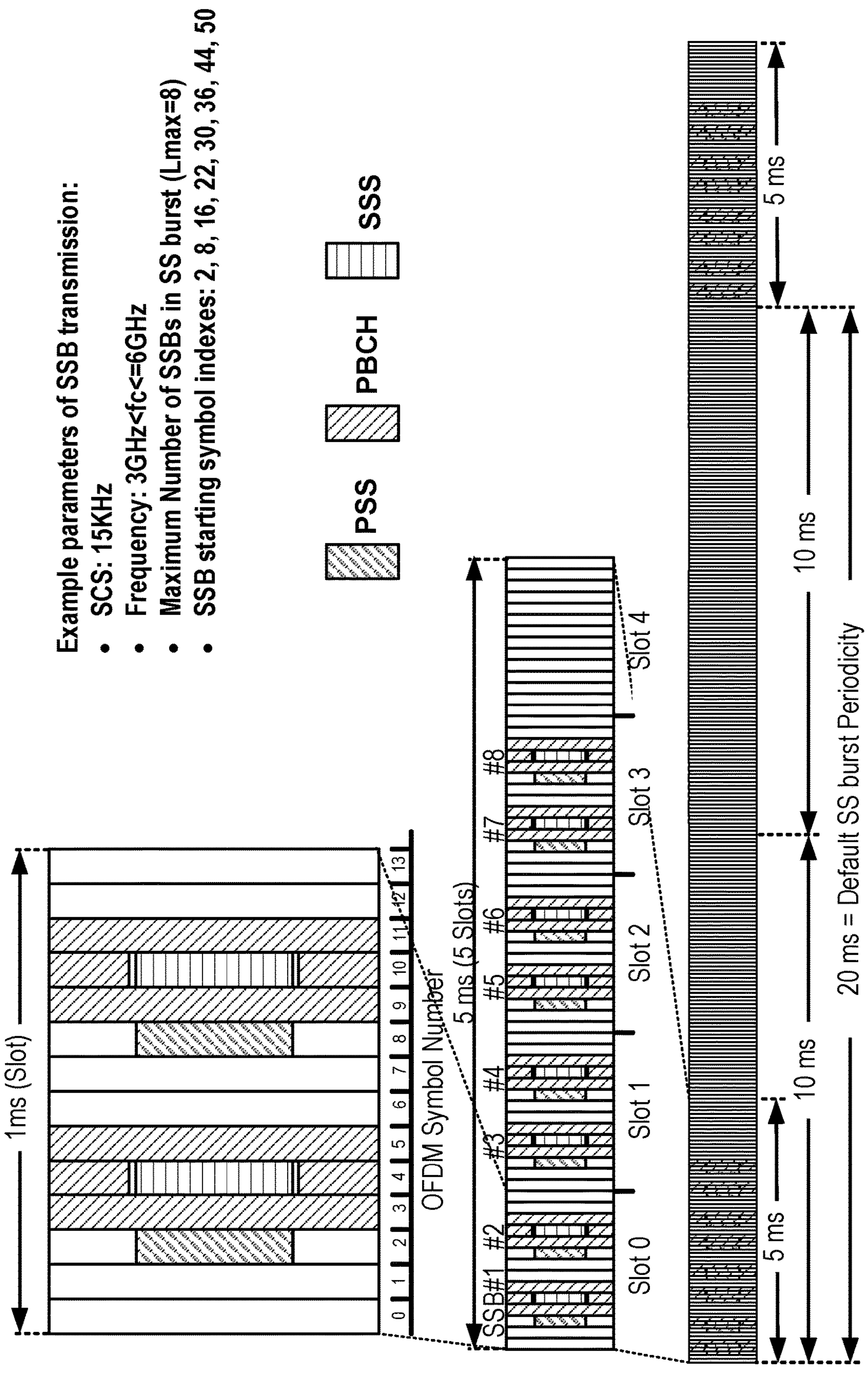
FIG. 35 shows an example of SSB transmissions of a base station.

FIG. 35 shows an example of SSB transmissions of a base station. An SCS of the cell may be 15 kHz, and the cell may be configured with carrier frequency $f_c$, such that 3 GHz<fc<=6 GHz. A maximum quantity of candidate SSBs in an SSB burst may be 8 ($L_{max}$=8), for example, based on the value of $f_c$. Starting symbols for SSB transmission may be determined in accordance with the table shown in FIG. 34. SSB #1 may start at symbol 2 (of 70 symbols included in 5 ms half-frame), SSB #2 may start at symbol #8, SSB #3 may start at symbol #16, SSB #4 may start at symbol #22, SSB #5 may start at symbol #30, SSB #6 may start at symbol #36, SSB #7 may start at symbol #44, and SSB #8 may start at symbol 50. The SSB burst may be transmitted in the first half (and not the second half) of a radio frame (with 10 ms duration).

The SSB burst (and each SSB of the SSB burst) may be sent/transmitted with a periodicity. A default periodicity of an SSB burst may be 20 ms (e.g., as shown in FIG. 35, or any other duration of time). The default transmission periodicity may be a periodicity, for example, before a wireless device may receive a SIB1 message for initial access of the cell. For example, the base station, with 20 ms transmission periodicity of SSB (or SSB burst), may send/transmit the SSB burst in the first 5 ms of each 20 ms period. The base station may not send/transmit the SSB burst in the rest 15 ms of the each 20 ms period.

A base station may send/transmit RRC messages (e.g., SIB1 messages) indicating cell specific configuration parameters of SSB transmission. The cell specific configuration parameters may comprise a value for a transmission periodicity (e.g., parameter ssb-PeriodicityServingCell) of an SSB burst and locations (e.g., presence) of SSBs (e.g., active SSBs), of a plurality of candidate SSBs, in the SSB burst. The plurality of candidate SSBs (e.g., starting symbols of candidate SSBs) may be determined as described with respect to FIG. 34. The cell specific configuration parameters may comprise a position indication of an SSB in an SSB burst (e.g., parameter ssb-PositionsInBurst). The position indication may comprise a first bitmap (e.g., groupPresence) and a second bitmap (e.g., inOneGroup) indicating locations/presence of SSBs in an SSB burst.

Carrier frequency $f_c$ and SCS may determine a maximum quantity of candidate SSBs in an SSB burst (e.g., as described with respect to FIG. 34). The position indication (e.g., parameter ssb-PositionsInBurst) may indicate SSBs (e.g., active SSBs, positions of the active SSBs), of a plurality of candidate SSBs, that are sent/transmitted in the SSB burst (e.g., as further described with respect to FIG. 36). A base station may indicate the transmitted active SSBs and/or a quantity of the active SSBs, in an SSB burst, using the position indication (e.g., parameter ssb-PositionsInBurst). The position indication may be transmitted by the base station, for example, via an RRC message and/or DCI.

Figure 36:
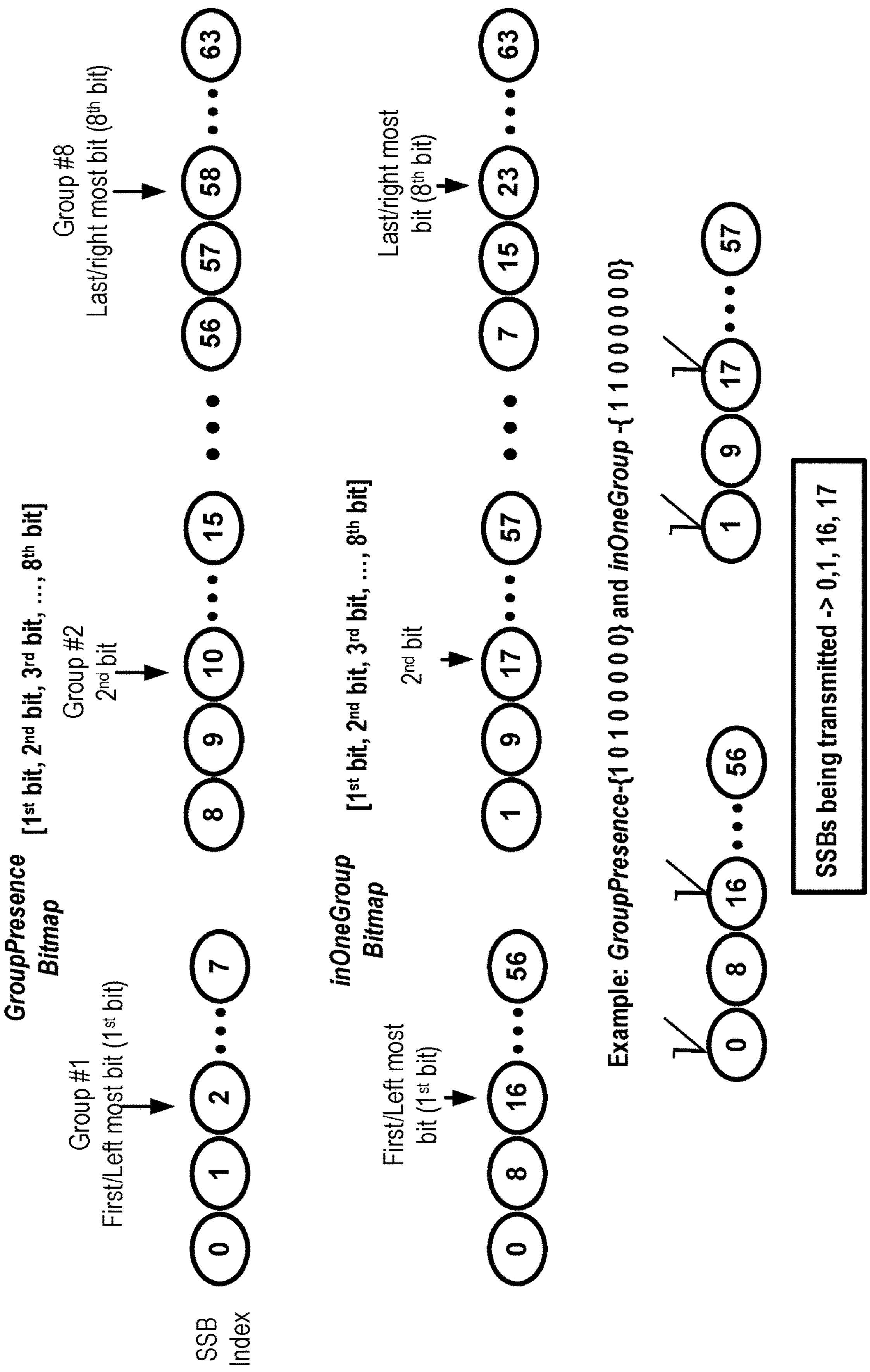
FIG. 36 shows an example of SSB transmissions of a base station.

FIG. 36 shows an example of SSB transmissions of a base station. Indication of SSB location may be in form of an indication of a presence of an SSB group among a plurality of SSB groups. Each group may comprise a subset of a plurality of candidate SSBs (e.g., maximum possible quantity of candidate SSBs) in an SSB burst. For example, a maximum possible quantity of candidate SSBs in an SSB burst may be equal to 64 (e.g., for SCS=120 kHz or 240 kHz, and $f_c$>6 GHz). The candidate SSBs in the SSB burst may comprise SSBs with indexes from 0 to 63. The candidate SSBs in an SSB burst may be divided into SSB groups.

A first bitmap (e.g., parameter groupPresence) may comprise a quantity of bits (e.g., 8, or any other quantity). The first bitmap may be configured/indicated by the SIB1 message. Each bit of the first bitmap may correspond to a respective group of SSB groups. As shown in FIG. 36, a first bit (e.g., left most bit of the first bitmap) may correspond to a first SSB group comprising $1^{st}$ SSB (with SSB index 0), $2^{nd}$ SSB (with SSB index 1), . . . and $8^{th}$ SSB (with SSB index 7). A second bit (e.g., the second bit of the first bitmap) may correspond to a second SSB group comprising $9^{th}$ SSB (with SSB index 8), $10^{th}$ SSB (with SSB index 9), . . . and 16th SSB (with SSB index 15). A last bit (e.g., right most bit of the first bitmap) may correspond to an $8^{th}$ SSB group comprising $57^{th}$ SSB (with SSB index 56), $58^{th}$ SSB (with SSB index 57), . . . and $64^{th}$ SSB (with SSB index 63), etc. An SSB may belong/correspond to at most one SSB group of the first SSB groups. A bit, of the first bitmap, may indicate whether the base station may send/transmit an SSB group, corresponding to the bit, in an SSB burst. The bit being set to a first value (e.g., 1) may indicate that the corresponding SSB group may be sent/transmitted in the SSB burst by the base station. The bit being set to a second value (e.g., 0) may indicate that the corresponding SSB group is not sent/transmitted in the SSB burst by the base station, or vice versa.

A second bitmap (e.g., parameter inOneGroup) may comprise a quantity of bits (e.g., 8, or any other quantity). Each bit of the second bitmap may correspond to a respective group of SSB groups. A first bit (e.g., left most bit of the second bitmap) may correspond to a first SSB group comprising $1^{st}$ SSB (with SSB index 0), $2^{nd}$ SSB (with SSB index 8), . . . and $8^{th}$ SSB (with SSB index 56). A second bit (e.g., the second bit of the second bitmap) may correspond to a second SSB group comprising $1^{st}$ SSB (with SSB index 1), $2^{nd}$ SSB (with SSB index 9), . . . and $8^{th}$ SSB (with SSB index 57). A last bit (e.g., right most bit of the second bitmap) may correspond to an $8^{th}$ SSB group comprising $1^{st}$ SSB (with SSB index 7), $2^{nd}$ SSB (with SSB index 15), . . . and $8^{th}$ SSB (with SSB index 63), etc. An SSB may belong/correspond to at most one SSB group of the second SSB groups. A bit, of the second bitmap, may indicate whether the base station may send/transmit an SSB group, corresponding to the bit, in an SSB burst. The bit being set to a first value (e.g., 1) may indicate that the corresponding SSB group is sent/transmitted in the SSB burst by the base station. The bit being set to a second value (e.g., 0) may indicate that the corresponding SSB group is not sent/transmitted in the SSB burst by the base station, or vice versa.

The plurality of SSBs (e.g., with SSB index from 0 to 63) may be grouped, for the first bitmap, into first SSB groups. Each of the first SSB groups may comprise SSBs with continuous SSB indexes. A first SSB group of the first SSB groups may comprise SSBs with SSB indexes from 0 to 7, a second SSB group may comprise SSB indexes from 8 to 15, etc. The plurality of SSBs may be also grouped, for the second bitmap, into second SSB groups. Each of the second SSB groups may comprise SSBs with discontinuous SSB indexes. A first SSB group of the second SSB groups may comprise SSBs with SSB indexes {0, 8, 16, . . . 56}. A second SSB group of the second SSB groups comprises SSBs with SSB indexes {1, 9, 17, . . . 57}, etc. SSB index gap between two neighboring SSB indexes in a second SSB group may be equal to 8 (or any other value).

Not all bits of the first and the second bitmap may be considered for determining an SSB group is sent/transmitted or not. A maximum quantity of SSBs within an SSB burst may be equal to four if fc≤3 GHz (e.g., in accordance with FIG. 34). A wireless device may determine that the four leftmost bits of a bitmap (e.g., the first bitmap and/or the second bitmap) are valid. The wireless device may ignore the four rightmost bits of the first bitmap and/or the second bitmap.

As shown in FIG. 36, the first bitmap may be indicated, by the base station, as {1 0 1 0 0 0 0 0} and the second bitmap may be indicated as {1 1 0 0 0 0 0 0}. The base station may send/transmit SSBs with indexes {0 1 16 17} in an SSB burst, for example, based on the grouping configuration of the first SSB groups and the second SSB groups and further based on the first bitmap and the second bitmap.

A base station may send/transmit a MIB via PBCH. The MIB may indicate configuration parameters (e.g., for CORESET 0), for a wireless device monitoring a PDCCH, for scheduling a SIB1 message. The base station may send/transmit a MIB message with a transmission periodicity of 80 ms (or with any other first periodicity). The same MIB message may be repeated (according to SSB periodicity) within the 80 ms. Contents of the MIB message may be the same over the 80 ms period. The same MIB may be sent/transmitted over all SSBs within an SSB burst. The PBCH transmission (e.g., MIB) may indicate that there is no associated SIB1. A wireless device may be pointed to/indicated another frequency from where to search for an SSB that is associated with a SIB1 as well as a frequency range where the wireless device may assume no SSB associated with SIB1 is present, for example, if the PBCH transmission indicates that there is no associated SIB1. The indicated frequency range may be confined within a contiguous spectrum allocation of the same operator in which SSB is detected.

A base station may send/transmit a SIB1 message with a periodicity of 160 ms (or with any other second periodicity). The base station may transmit the same SIB1 message with variable transmission repetition periodicity within 160 ms. A default transmission repetition periodicity of SIB1 may be 20 ms (or any other third periodicity). The base station may determine an actual transmission repetition periodicity based on network implementation. SIB1 repetition transmission period may be 20 ms, for example, for SSB and CORESET multiplexing pattern 1. SIB1 transmission repetition period may be the same as the SSB period, for example, for SSB and CORESET multiplexing patterns 2 or 3. SIB1 may comprise information regarding availability and scheduling (e.g., mapping of SIBs to system information (SI) message, periodicity, SI window size) of other SIBs and/or an indication whether one or more SIBs are only provided on demand. Configuration parameters needed by a wireless device to perform an SI request may be indicated in the SIB1 if the one or more SIBs are only provided on demand.

A base station may enable a power saving operation for a wireless device due to limited battery capacity of the wireless device. A base station may enable a power saving operation for a wireless device, for example, based on active BWP management (such as shown in FIG. 22), SCell dormancy mechanism (such as shown in FIG. 28), wake-up/go-to-sleep indication (such as shown in FIG. 31A and/or FIG. 31B), SSSG switching on an active BWP (such as shown in FIG. 32A and/FIG. 32B), and/or PDCCH skipping (such as shown in FIG. 33). A base station may not be able to save energy from the viewpoint of the base station, (e.g., if the base station is required to send/transmit some always-on downlink signals periodically (e.g., SSB, MIB, SIB1, SIB2, periodic CSI-RS, etc.) in some time period even for which there is no active wireless device sending/transmitting to and/or receiving from the base station), for example, if indicating a power saving operation for a wireless device (e.g., based on examples described herein with respect to FIG. 22, FIG. 28, FIG. 31A, FIG. 31B, FIG. 32A, FIG. 32B, and/or FIG. 33). The base station may be required to send/transmit some always-on downlink signals periodically (e.g., SSB, MIB, SIB1, SIB2, periodic CSI-RS, etc.), for example, if the base station transitions a cell into a dormant state by switching an active BWP to a dormant BWP of the cell (e.g., such as described with respect to FIG. 28).

A base station may send/transmit an RRC message (e.g., SIB1) indicating a longer periodicity for the always-on downlink signal transmission, for example, if the base station needs to reduce periodicity of the always-on downlink signal transmission. A base station may send/transmit RRC reconfiguration messages to a wireless device in a source cell (e.g., each wireless device in a source cell) to indicate a handover to a neighbor cell, for example, before determining to power off (e.g., both RF modules and base band units (BBUs)) for energy saving. A wireless device in the source cell (e.g., each wireless device in the source cell) may perform a 4-step or 2-step RACH procedure to perform the handover to the neighbor cell and then break/tear the RRC connection with the source cell. The base station may turn off (RF parts and BBUs, etc.) for energy saving, for example, after the wireless devices complete the handover procedure to neighbor cells. Sending/transmitting the RRC message indicating a change of periodicity of always-on downlink signals and/or sending (e.g., transmitting) the RRC message requesting handover (to neighbor cells) may not be efficient, for example, considering a dynamic and fast-changing traffic pattern of different wireless devices in 5G system and/or future system.

In at least some wireless communications, network energy saving operation may comprise shutting down some cells and/or reducing periodicity of SSB/SIB1/SIB2 with or without beam sweeping, which may be different from the power saving operations, for a wireless device, such as described herein with respect to FIG. 22, FIG. 28, FIG. 31A, FIG. 31B, FIG. 32A, FIG. 32B and/or FIG. 33. Shutting down cells (entirely or partially) may lead to negative impact on data transmission latency and/or power consumption for the access process. Existing SSB may be modified towards a lighter version by carrying no or minimal information, for example, such as PSS, which may be called as "light SSB". This "light SSB" may be combined with other techniques such as less frequent SSB transmission (e.g., with a periodicity>20 msec), and/or with "on-demand SSB"; where "on-demand SSB" is the SSB transmission that is triggered by a wireless device via a UL trigger signal. A base station may send/transmit this "light SSB" and, the wireless devices may react by sending/transmitting an uplink trigger signal, for example, if there are wireless devices monitoring this "light SSB" and trying to access the network. The base station may start sending/transmitting the full-blown SSB, for example, based on reception of the uplink trigger signal. The network can adjust the SSB transmission configuration to respond to the wireless device's indication, for example, after receiving the uplink trigger signal.

Network energy saving operation may comprise a BS DTX configuration/mode/state/operation, (e.g., similar to wireless device DRX configuration, such as a wireless device DRX configuration described herein with respect to FIG. 29, FIG. 30, FIG. 31A and/or FIG. 31B). For a BS DTX operation, the base station may (periodically) power-on a cell (or a plurality of cells) for a first time duration and then power-off the cell for a second time duration. In the first time duration for which the cell is powered on (or in a first power state/mode), the base station may send/transmit periodic downlink signals (e.g., SIBs/SSBs/CSI-RSs/TRSs), downlink control channels (PDCCH), downlink shared channels (PDSCH), etc. In the second time duration for which the cell is powered off (or in a second power state/mode), the base station may reduce transmission power/bandwidth/beam of the periodic downlink signals, stop transmission of the periodic downlink signals, and/or stop transmission of PDCCH/PDSCH. The base station may perform the DTX operation periodically, for example, by configuring a periodicity of a DTX cycle comprising the first time duration for the power-on state and the second time duration for the power-off state. The base station may perform a one-shot DTX operation, for example, by indicating a time duration for the one-shot DTX operation, wherein the time duration comprises a first time duration for the power-on state and a second time duration for the power-off state.

In at least some wireless communications, a base station may operate in BS DTX mode/operation/configuration for a given cell and with a given pattern (e.g., a DTX on duration and a DTX off duration in a DTX cycle). A wireless device may determine to use the BS DTX pattern in the cell as its DRX pattern. A network might not need to configure DRX per wireless device in the cell separately. Requiring all wireless devices in the cell to use the same DRX pattern may increase power consumption of the wireless devices. Wireless devices in the cell (e.g., all wireless devices in the cell) may be required to monitor PDCCHs in the long period, even though there is wireless device(s), in the cell, having less volume of data to be sent/transmitted and/or received within the long period, for example, if a DTX on duration (for which the cell is in a power-on state) is configured with a long period (10 ms, 100 ms, or even longer). At least some wireless communications may increase power consumption of a wireless device, for example, if the base station is in DTX operation.

A wireless device may be configured with both a cell level (and/or BS level) DTX configuration and a wireless device specific DRX configuration to further improve the power consumption of a wireless device, for example, if the base station is in DTX operation. The wireless device specific DRX configuration may be configured/associated with a first pattern (e.g., on/off period) different from a second pattern (e.g., on/off period) of the cell level DTX configuration. The wireless device may not align with the base station regarding a state of the cell, PDCCH monitoring, CSI reporting, DRX related timers, etc., for example, if performing both the cell level DTX operation and the wireless device specific DRX operation on cell(s). Misalignment between the wireless device and the base station, for example, if performing the cell level DTX operation and the wireless device specific DRX operation, may increase power consumption of the wireless device and/or the base station, increase uplink interference and/or increase data transmission latency. Improvements described herein may provide for coordinating the cell DTX operation and the wireless device specific DRX operation-specifically, coordinating management of the state of the cell, PDCCH monitoring, CSI reporting, and/or management of DRX related timers, etc., to reduce power consumption of the wireless device and/or the base station, to reduce uplink interference, and/or to reduce data transmission latency.

A wireless device may determine that the cell is in a first power state (e.g., a power-on state or a first power mode) after/based on receiving a first message indicating configuration parameters of a cell DTX configuration/operation and, for example, before receiving a second message indicating to enable the cell DTX configuration/operation. For example, the cell may remain in the first power state after the base station sends/transmits the first message and, for example, before sending/transmitting the second message. The wireless device may perform the DRX operation according to the wireless device specific DRX configuration, for example, based on the cell being in the first power state. The wireless device may align with the base station regarding whether the cell is in a power-on state (or a first power state/mode) or a power-off state (or a second power state/mode), for example, if a cell level DTX operation is configured and has not been enabled. The alignment of the (power) state/mode of the cell between the wireless device and the base station may provide advantages such as improved power consumption of the wireless device and/or improved CSI report quality.

Wireless device specific DRX operation may be enabled within a first time duration for which the cell is in a DTX on duration of a cell DTX configuration and/or disabled (e.g., not performed) within a second time duration for which the cell is in a DTX off duration of the cell DTX configuration. Enabling/performing wireless device specific DRX operation may comprise starting a DRX on duration timer of the wireless device specific DRX operation in a first slot, for example, if the first slot is within the DTX on duration of the cell. Disabling/not performing the wireless device specific DRX operation may comprise stopping/disabling the DRX on duration timer of the wireless device specific DRX operation in a second slot, for example, if the second slot is within the DTX off duration of the cell. Enabling the wireless device-specific DRX operation within a time for which the cell is in a DTX on state (and/or disabling/not performing the wireless device-specific DRX operation within a time for which the cell is in a DTX off state) may provide advantages such as improved power consumption and/or more efficient use of resources.

A wireless device switching from an RRC idle state to an RRC active state may not yet have received an indication of network energy saving for a cell of the base station. Determining whether the cell is in a non-energy saving state, for example, by the wireless device, before receiving MAC CE/DCI indicating enabling of a DTX mode may comprise the cell powering on for a first time and then powering off for a second time periodically. The network energy saving state of the cell between the wireless device and the base station may be misaligned, for example, if the wireless device is in a DRX off state when the base station submits a network energy saving indication in a DCI. Monitoring PDCCH, for example, by a wireless device for the DCI with a RNTI dedicated for network energy saving indications regardless of whether the wireless device is in a DRX active state. Wireless device power consumption may be increased based on a wireless device being in DRX active time, which may occur due to a DRX on duration timer running. The DRX on duration timer may be stopped, for example, by the wireless device, if the wireless device receives a network energy saving indication. The DRX on duration timer may be stopped, for example, by the wireless device, if the cell is in a power off state based on a DTX configuration of the cell. The DRX on duration timer may be started, for example, by the wireless device, if the timer is not running if the cell is in a power on state based on the DTX configuration of the cell. A wireless device may have difficulty determining whether to apply a network energy saving indication, for example, if it is configured with multiple DRX cell groups wherein a cell group (e.g., each cell group) is configured with a cell group specific DRX configuration. One or more of multiple DRX cell groups may be determined, for example, by the wireless device, based on at least one of: a first cell on which the network energy saving indication is received, the contents of the network energy saving indication, and/or other factors. Operating in the manner described herein may provide advantages such as saving energy/bandwidth, indicating a cell DTX state to wireless devices, coordinating DTX and DRX, and/or more efficient use of communication resources.

Figure 37A:
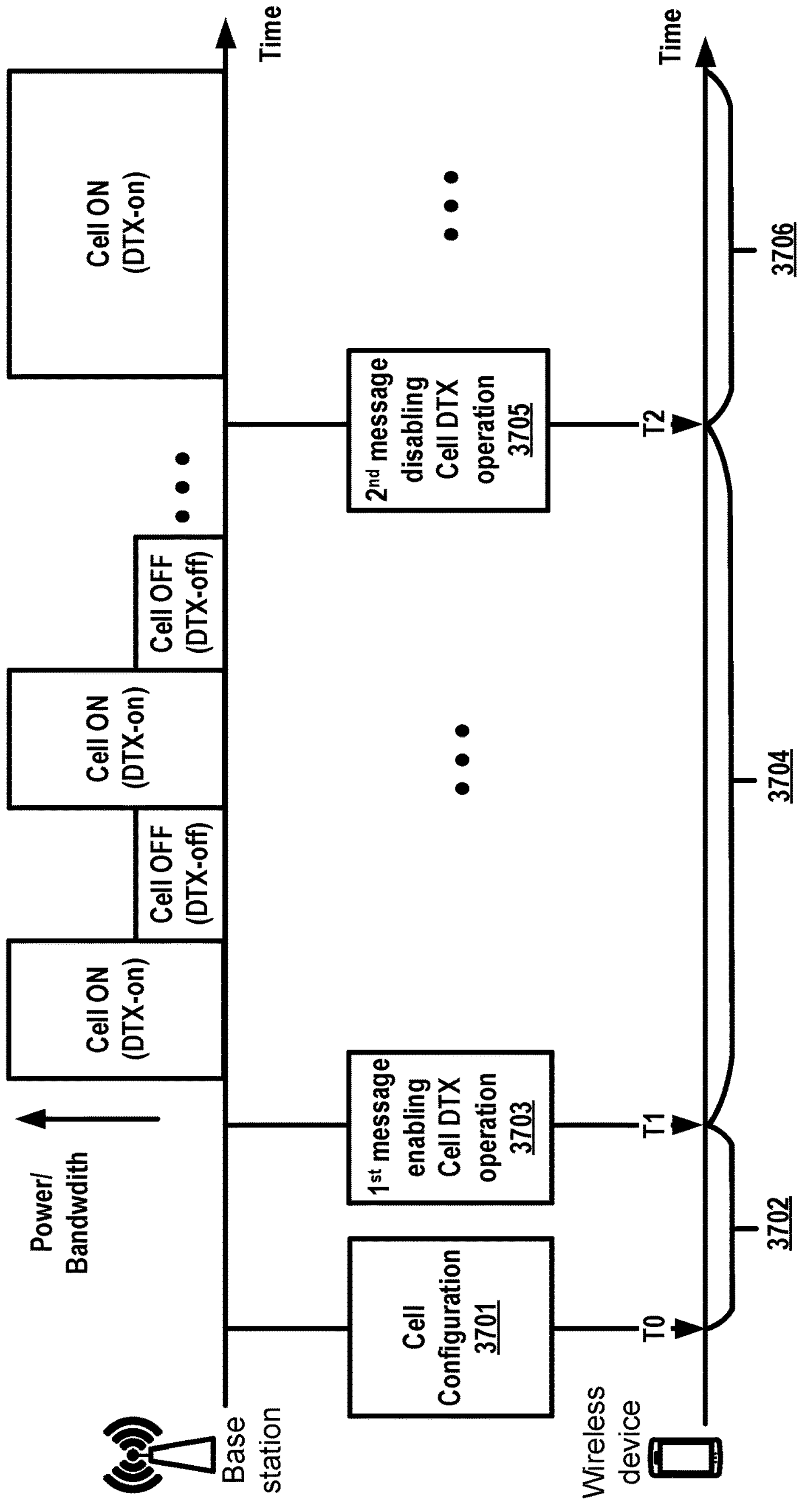
FIG. 37A shows an example of DTX and DRX for energy saving.

FIG. 37A shows an example of DTX and DRX for energy saving. At a first time (e.g., T0), a wireless device (e.g., UE) may receive, and/or a base station (e.g., gNB) may send/transmit, one or more RRC messages 3701 comprising configuration parameters of a cell (or a plurality of cells). A cell may be implemented based on examples such as described with respect to FIG. 10. The cell may be a PCell/PSCell. The cell may be a SCell. At 3702, the wireless device may determine that the cell is in a first power state (e.g., always on) before receiving a first message enabling cell DTX operation.

The one or more RRC messages 3701 may comprise configuration parameters (first parameters) of a DRX configuration. The DRX configuration received in the one or more RRC messages 3701 (which are wireless device specific RRC messages), may be referred to as a wireless device specific DRX configuration. Different wireless devices may receive different wireless device specific RRC messages comprising configuration parameters of DRX configuration. The configuration parameters of the DRX configuration are specifically for a wireless device who receives the wireless device specific RRC message. A DRX configuration may be implemented based on examples such as described with respect to FIG. 29 and/or FIG. 30. The configuration parameters of a DRX configuration for the wireless device may comprise: a value of a DRX cycle (short cycle or long cycle) of the DRX operation, a time offset value (drx_StartOffset) of a starting point of the DRX cycle, relative to a reference subframe (e.g., subframe 0 of a radio frame), a first timer value (drx-onDurationTimer) of a DRX on duration timer, a slot offset value (drx_SlotOffset) for a delay (e.g., a number of slots), for example, before starting the DRX on duration timer at the beginning of a subframe, a second timer value (drx-InactivityTimer) of a DRX inactivity timer, a third timer value (drx-RetransmissionTimerDL or drx-RetransmissionTimerUL) of a DRX retransmission timer and/or a fourth timer value (drx-HARQ-RTT-TimerDL or drx-HARQ-RTT-TimerUL) of a DRX HARQ RTT timer.

The one or more RRC messages may comprise configuration parameters (second parameters) of a DTX configuration. The one or more RRC messages may comprise a cell common RRC message (e.g., MIB, SIB1/SIB2/SIB3/ . . . , etc.). The DTX configuration may be referred to as a cell level DTX configuration (or cell DTX configuration, DTX configuration, cell common DTX configuration, etc.), which may be used for all wireless devices in the cell. The configuration parameters of the cell level DTX configuration may comprise a periodicity value, of a DTX cycle of the DTX configuration, indicating a number of slots (or milliseconds), and a time offset value (e.g., a number of subframe/slots/milliseconds) of a starting point of the DTX cycle, relative to a reference slot (or a subframe). The reference slot/subframe may be a slot/subframe, with a slot/subframe index being equal to zero, of a plurality of slots/subframes in a radio frame (or a frame). A slot/subframe and a radio frame may be implemented based on examples such as described with respect to FIG. 7. The configuration parameters of the cell level DTX configuration may comprise at least one of: a first length indication of a first time period (for which the cell is powered-on, or in a first power state/mode) of the DTX cycle and/or a second length indication of a second time period (for which the cell is powered-off, or in a second power state/mode) of the DTX cycle. The first length indication may comprise a timer value of a DTX on duration timer of the DTX operation. The first time period may be a duration for which the DTX on duration timer is running within the DTX cycle. The second time period may be a duration for which the DTX on duration timer is not running (or expires) within the DTX cycle. The first time period may be configured with zero and the second time period may be configured with a non-zero value, in which case, the base station may transition the cell to the second power state, for example, based on the cell level DTX configuration is enabled/triggered/activated/initiated (e.g., based on the first message received in T1).

The wireless device may receive a SCell activation/deactivation MAC CE indicating an activation of the cell, for example, if the cell is a SCell. The wireless device may activate the SCell, for example, based on receiving the SCell activation/deactivation MAC CE (e.g., such as described with respect to FIG. 21A, FIG. 21B and/or FIG. 22). The wireless device may perform downlink receptions and/or uplink transmissions via the activated SCell, such as described with respect to FIG. 22.

The wireless device may receive, at a second time (e.g., T1), a first message 3703 comprising parameters indicating an enabling (or triggering, activating, initiating, etc.) of the cell level DTX configuration (such as described with respect to FIG. 37A). The wireless device may receive the first message 3703, for example, after the cell is activated (e.g., based on receiving a SCell activation/deactivation MAC CE indicating the activation of the cell).

The first message 3703 may comprise at least one of: an RRC message (which may be different from the one or more RRC messages 3701, received in TO, configuring the wireless device specific DRX configuration and/or the cell level DTX configuration), a MAC CE, a DCI, and/or any combination thereof. The MAC CE enabling the cell level DTX configuration may be different from existing MAC CEs (e.g., such as shown in FIG. 19). The DCI enabling the cell level DTX configuration may be different from existing DCI formats (e.g., such as shown in FIG. 23).

The base station may send/transmit periodic downlink signals (e.g., SIBs/SSBs/CSI-RSs/TRSs), PDCCH/PDSCH, etc., for example, based on (or after) the cell level DTX configuration/operation being enabled, in a first time duration for which the cell is powered on (or in the first power state/mode). The base station may reduce transmission power/bandwidth/beam of the periodic downlink signals, stop transmission of the periodic downlink signals, and/or stop transmission of PDCCH/PDSCH, for example, based on (or after) the cell level DTX operation being enabled, in a second time duration for which the cell is powered off (or in the second power state/mode). The base station may perform the DTX operation periodically, for example, by configuring a periodicity of a DTX cycle comprising the first time duration for the power-on state (or the first power state/mode) and the second time duration for the power-off state (or the second power state/mode).

The base station and/or the wireless device may determine that the cell is (or maintained) in a SCell activated state, for example, if the cell level DTX operation is enabled and the cell is powered off (or in the second power state/mode) in the second time duration according to the cell level DTX configuration, for example, if the cell is a SCell. Maintaining the SCell activated state, for example, if the cell is powered off (or in the second power state/mode), may reduce the signaling (SCell activation/deactivation MAC CE) for reactivating the cell if the cell is deactivated, for example, if the cell is powered off.

Maintaining the SCell activated state in the second time duration for which the cell is powered off (or in the second power state/mode), for example, based on the cell level DTX configuration, may comprise keeping running a SCell deactivation timer, keeping running a BWP inactivity timer, and/or maintaining an active BWP of the cell without change. A SCell deactivation timer and a BWP inactivity timer may be implemented such as described with respect to FIG. 22. The base station and/or the wireless device may deactivate the cell, for example, based on (e.g., after or in response to) the SCell deactivation timer expiring.

Maintaining the SCell activated state in the second time duration for which the cell is powered off (or in the second power state/mode) based on the cell level DTX configuration may comprise maintaining configured downlink assignment and configured uplink grant (Type 1 and/or Type 2) associated with the cell, and/or maintaining PUSCH resource for semi-persistent CSI reporting associated with the cell. Maintaining the configured downlink assignment/uplink grant and/or PUSCH resources for the SP-CSI reporting may allow the base station and/or the wireless device to quickly resume transmissions (and/or SP-CSI reporting) via the configured downlink assignment/uplink grant (and/or PUSCH resources), for example, if the base station and/or the wireless device transitions the cell from the power-off state (for the second time duration) to the power-on state (for the first time duration) according to the configuration parameters of the cell level DTX configuration.

The wireless device may determine that the cell (or the plurality of cells) is (always) in power-on state (or in the first power state/mode), for example, after receiving the one or more RRC messages at TO and/or, for example, before receiving the first message at T1 (such as described with respect to FIG. 37A). The wireless device may determine that the cell level DTX configuration/operation is disabled (or is not enabled) (by default) until receiving the first message (explicitly) indicating an enabling of the cell level DTX configuration. The wireless device may determine that the cell is in the power-on state (or in the first power state/mode) based on the determining that the cell level DTX configuration/operation is disabled. The wireless device may perform the wireless device specific DRX operation according to the wireless device specific DRX operation and/or by ignoring the cell level DTX configuration, for example, based on (e.g., after or in response to) determining that the cell is in the power-on state (or in the first power state/mode) and/or determining that the cell level DTX configuration is disabled. The wireless device may assume/determine that the cell is (or is maintained) in the power-on state (or in the first power state/mode), for example, if the wireless device is monitoring PDCCH in a DRX active time according to the wireless device specific DRX operation. The wireless device may assume/determine that the cell is in the power-on state (or in the first power state/mode), for example, if the wireless device is measuring CSI quantities based on SSBs/CSI-RSs according to the wireless device specific DRX operation.

The wireless device may perform the DRX operation according to the wireless device specific DRX configuration, for example, based on determining that the cell is in the power-on state (or in the first power state/mode), for example, before receiving the first message at T1. The performing the DRX operation may be implemented such as described with respect to FIG. 26, FIG. 29, and/or FIG. 30. At 3704, wireless device DRX operation may be enabled when the cell is in the first power state (e.g., in Cell DTX ON period) and go to sleep by disabling wireless device DRX when the cell is in a second power state (e.g., in Cell DTX OFF period), for example, based on enabling Cell DTX operation.

The wireless device may align with the base station regarding whether the cell is in a power-on state (or a first power state/mode) or a power-off state (or a second power state/mode), for example, if a cell level DTX operation is configured and has not been enabled/activated/triggered/initiated. The alignment of the (power) state/mode of the cell between the wireless device and the base station may comprise advantages such as improving power consumption of the wireless device and improving CSI report quality.

The base station may determine that the cell is in the power-on state (or in the first power state/mode) and/or may perform downlink signal transmissions via the cell, for example, based on the cell being in the power-on state, for example, before sending/transmitting the first message at T1. The base station may perform the cell level DTX operation, which may comprise powering-on the cell in the first time duration (e.g., DTX on duration) and powering-off the cell in the second time duration (e.g., DTX off duration), for example, based on sending/transmitting the first message, at T1, indicating the enabling the cell level DTX operation. The base station may repeat the cell level DTX operation according to the second parameters associated with the cell level DTX operation.

The wireless device may perform the wireless device specific DRX operation according to the first parameters of the wireless device specific DRX operation and the second parameters of the cell level DTX operation, for example, based on receiving the first message indicating an enabling (or triggering, activating, initiating, etc.) of the cell level DTX operation/configuration (by CSI-ReportConfig IE), such as described with respect to FIG. 37A. The wireless device may perform the wireless device specific DRX operation according to the first parameters and the second parameters such as based on examples which will be described in FIG. 38A and/or FIG. 39A.

The base station may determine to disable (or release, deactivate, clear, etc.) the cell level DTX configuration, for example, if there are more and more active wireless devices entering in the cell or moving into the cell, and/or when there are more and more (urgent) downlink/uplink data pending for transmissions (such as described with respect to FIG. 37A). Staying (always) in the cell level DTX configuration (comprising periodic transitioning between power-on state and power-off state) may not ensure data transmission latency for these cases for which there are more and more active wireless devices entering in the cell or moving into the cell, and/or for which there are more and more (urgent) downlink/uplink data pending for transmissions. To improve the transmission latency, the base station may send/transmit, for example, at T2, a second message 3705 indicating a disabling (or releasing, deactivating, clearing, etc.) of the cell level DTX operation/configuration. The base station may send/transmit downlink signals (SSBs/SIBs/CSI-RSs/TRSs/PDCCHs/PDSCHs) according to the configuration parameters of the downlink signals, for example, by ignoring the second parameters of the cell level DTX operation/configuration, for example, based on (e.g., after or in response to) disabling the cell level DTX operation. The base station may resume the periodic transmissions of MIBs/SSBs/SIBs/CSI-RSs/TRSs without interrupt, by retreating from the periodic transitioning between the power-on state (the first power state/mode) and the power-off state (the second power state/mode), for example, based on (e.g., after or in response to) disabling the cell level DTX operation/configuration.

The second message 3705 may comprise at least one of: a RRC message (which may be different from the first message 3703, received in T1, enabling the cell level DTX configuration), a MAC CE, a DCI, and/or any combination thereof. The MAC CE disabling the cell level DTX configuration may be with the same MAC CE format enabling the cell level DTX configuration, wherein the MAC CE format may have one or more field(s) indicating whether the MAC CE enables/disables the cell level DTX configuration. Using the same MAC CE format for indicating enabling and disabling a cell level DTX configuration may reduce signaling overhead and/or power consumption of the wireless device.

The DCI disabling the cell level DTX configuration may be with the same DCI format enabling the cell DTX configuration, wherein the DCI may have one or more field(s) indicating whether the DCI enables/disables the cell level DTX configuration. Using the same DCI format for indicating enabling and disabling a cell level DTX configuration may reduce signaling overhead and/or power consumption of the wireless device for PDCCH monitor and blind decoding.

The wireless device may assume/determine that the cell is (always) in the power-on state (or the first power state/mode), for example, based on receiving the second message 3705 disabling the cell level DTX operation (such as described with respect to FIG. 37A). The wireless device may perform the wireless device specific DRX operation, for example, by ignoring the second parameters of the cell level DTX operation, for example, based on the disabling the cell level DTX operation and the determining that the cell is in the power-on state. The wireless device may perform the wireless device specific DRX operation, such as described with respect to FIG. 29 and/or FIG. 30. At 3706, wireless device DRX operation may be enabled, for example, based on disabling Cell DTX operation.

The base station may send/transmit the first message 3703 (in T1) indicating to transition the cell to the second power state/mode for the second time period, for example, if the first time period (for the first power state) is configured as zero and the second time period (for the second power state) is configured as a non-zero value for the cell level DTX configuration by the RRC message (such as described with respect to FIG. 37A). The wireless device may disable the wireless device specific DRX operation/configuration (e.g., such as based on examples which will be described in FIG. 38A and/or FIG. 39A), for example, based on the cell being in the second power state. The base station may send/transmit the second message 3705 (in T2) indicating to disable the cell level DTX configuration. The disabling the cell level DTX configuration may comprise transitioning the cell from the second power state/mode to the first power state/mode. The wireless device may perform the wireless device specific DRX operation/configuration, for example, if the cell is transitioned to the first power state/mode based on (e.g., after or in response to) receiving the second message indicating to disable the cell level DTX configuration.

FIG. 37A may be modified to further improve power consumption of a wireless device. A wireless device may perform wireless device specific DRX operation between TO and T1 after/based on receiving configuration parameters of wireless device specific DRX configuration and a cell level/specific DTX operation at TO and, for example, before receiving an enabling of the cell level/specific DTX operation at T1, such as described with respect to FIG. 37A.

The wireless device may use the configuration parameters of the cell level DTX operation for the wireless device specific DRX operation (which means that all wireless devices in the cell use the same DRX configuration base on using the cell level DTX operation), for example, based on (e.g., after or in response to) receiving the indication enabling the cell level/specific DTX operation at T1.

The wireless device may perform the cell level DTX operation according to the configuration parameters of the cell level DTX operation (and/or may not perform the wireless device specific DRX operation according to the configuration parameter of the wireless device specific DRX operation) from T1, for example, based on (e.g., after or in response to) receiving the indication enabling the cell level/specific DTX operation at T1. Performing the cell level DTX operation and not performing the wireless device specific DRX operation may comprise monitoring PDCCHs and/or sending/transmitting CSI report in a DTX active time and stopping monitoring PDCCHs and stopping sending/transmitting CSI reports in a DTX inactive time. The DTX active time may be a first time duration configured by the configuration parameters of the cell level DTX operation, for which the cell is in the power-on state (or the first power state/mode). The DTX inactive time may be a second time duration configured by the configuration parameters of the cell level DTX operation, for which the cell is in the power-off state (or the second power state/mode). The wireless device may determine to start the DRX on duration timer at the beginning of the first time duration, wherein the timer value of the DRX on duration timer may be equal to the length of the first time duration. The wireless device may determine to start the DRX on duration timer at the beginning of the first time duration, by ignoring the wireless device specific DRX configuration parameters (e.g., drx-StartOffset, drx-onDurationTimer, drx-SlotOffset, etc.). The wireless device may determine that the cell level DTX operation has higher priority than the wireless device specific DRX operation, based on (e.g., after or in response to) receiving the indication enabling the cell level/specific DTX operation.

The wireless device may perform the wireless device specific DRX operation according to the configuration parameter of the wireless device specific DRX operation from T2, based on (e.g., after or in response to) receiving an indication disabling the cell level/specific DTX operation at T2, such as described with respect to FIG. 37A.

A wireless device may be configured with both wireless device specific DRX parameters and cell level/specific DTX parameters, for example, based on receiving one or more RRC messages. The wireless device may use the wireless device specific DRX parameters (and/or may not use the cell level/specific DTX parameters) to perform DRX operation, for example, based on (e.g., after or in response to) the cell level/specific DTX operation/configuration not being enabled/triggered/activated/initiated. The wireless device may use the cell level/specific DTX parameters (and/or may not use the wireless device specific DRX parameters) to perform DRX operation, for example, based on (e.g., after or in response to) the cell level/specific DTX operation/configuration being enabled/triggered/activated/initiated. The cell level/specific DTX operation/configuration may be enabled or disabled based on receiving a RRC message, a MAC CE and/or DCI, such as described with respect to FIG. 37A.

In at least some wireless communications, a wireless device may monitor PDCCH for the wireless device's MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI and/or SL Semi-Persistent Scheduling V-RNTI in a DRX active time of the wireless device specific DTX configuration. The DRX active time may comprise a time duration for which a DRX on duration timer of the wireless device specific DRX configuration is running, for which a DRX retransmission timer is running, for which a RA contention resolution timer is running, for which a SR is sent on PUCCH and is pending, and/or for which a PDCCH indicating a new transmission addressed to the C-RNTI of the MAC entity has not been received, for example, after successful reception of a RAR for a RA preamble not selected by the MAC entity among the contention-based RA preambles. A wireless device may start a DRX on duration timer for a DRX cycle based on configuration parameters of a DRX configuration, for example, such as described with respect to FIG. 29. The wireless device may start (or restart) a DRX inactivity timer, for example, based on receiving a DCI (e.g., if monitoring PDCCH in a DRX active time) scheduling a new data transmission (e.g., for UL, DL or sidelink), such as described with respect to FIG. 30.

In at least some wireless communications, the wireless device may stop monitoring the PDCCH for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI and/or SL Semi-Persistent Scheduling V-RNTI in a DRX inactive time of the wireless device specific DTX configuration. The DRX inactive time may comprise a time duration outside of the DRX active time.

In at least some wireless communications, for the wireless device's power saving, a wireless device may monitor PDCCH based on a PS-RNTI in a time duration, for example, before a DRX cycle, which is in DRX inactive time. The wireless device may start a DRX on duration timer of the corresponding DRX cycle, for example, if receiving a DCP (e.g., a DCI with CRC scrambled by PS-RNTI) based on the monitoring the PDCCH in the DRX inactive time of a DRX configuration. The wireless device may not monitor the PDCCH based on the PS-RNTI in a DRX active time of the wireless device specific DRX configuration.

The base station may send/transmit DCI indicating whether the cell has transitioned (or is transitioning) into a power-on state (or a first power state/mode) or a power-off state (or a second power state/mode), for example, to dynamically enable a cell on/off operation for network energy saving at a base station, such as described with respect to FIG. 37A. In at least some wireless communications, the wireless device may not monitor a PDCCH (e.g., except the PS-RNTI) in a DRX inactive time. In at least some wireless communications, the wireless device may not monitor PDCCH for the PS-RNTI in a DRX active time.

The base station may send/transmit the DCI indicating the cell on/off operation (or a cell DTX configuration/operation, such as described with respect to FIG. 37A) with a RNTI (different from the PS-RNTI) in a slot which may be within the DRX active time of the wireless device, and/or within the DRX inactive time of the wireless device. The wireless device may miss detecting the DCI (with a RNTI different from the PS-RNTI) indicating the cell on/off operation, for example, if the wireless device is not monitoring PDCCH (except for the PS-RNTI) in the DRX inactive time. Missing detection of the DCI indicating the cell on/off operation for which the wireless device specific DRX operation is configured may lead to a misalignment between the base station and the wireless device regarding a state of the cell. Misalignment regarding the state of the cell may increase power consumption of the wireless device, increase power consumption of the base station, increase transmission latency of data, etc. As described herein, advantages may be achieved by improving power consumption and/or transmission latency, for example, if cell-on/off is dynamically enabled with conjunction of wireless device specific DRX operation.

The wireless device may receive the DCI comprising the cell-on/off indication indicating that the cell has transitioned from a power-on state (or a first power state/mode) to a power-off state (or a second power state/mode), for PDCCH monitoring in a DRX active time that includes a duration for which the DRX on duration timer is running. The wireless device may keep monitoring PDCCH (due to the DRX on duration timer being running), although the base station stops PDCCH transmission in the power-off state of the cell. At least some wireless communications may increase power consumption of the wireless device for which cell-on/off is dynamically enabled with conjunction of wireless device specific DRX operation. As described herein, advantages may be achieved by improving power consumption for which cell-on/off is dynamically enabled with conjunction of wireless device specific DRX operation.

A wireless device may monitor PDCCH for an RNTI dedicatedly configured for receiving DCI comprising cell-on/off (or cell DTX enabling/disabling, cell DTX activation/deactivation, etc.) indication regardless of whether the wireless device is in a DRX inactive time or in a DRX active time. Examples may allow the wireless device to detect the DCI and determine whether the cell is in the power-on state or in the power-off state and to accordingly perform a wireless device specific DRX operation based on whether the cell in the power-on state and the power-off state. In at least some wireless communications, the wireless device monitors PDCCH for DSP with PS-RNTI (for wireless device's power saving) only in a DRX inactive time and where the wireless device monitors PDCCH for DCI with C-RNTI (or CS-RNTI, MCS-RNTI) (for data scheduling) only in a DRX active time.

A wireless device may stop a DRX on duration timer (or one more other DRX timers comprising DRX inactivity timer, DRX DL/UL retransmission timer, DRX HARQ RTT timer (DL/UL), DRX retransmission timer for sidelink, DRX HARQ RTT timer for sidelink, etc.), for example, based on (e.g., after or in response to) receiving DCI comprising a cell-on/off indication indicating that the cell is transitioned to the power-off state and the DRX on duration being running. Improvements described herein may comprise reducing power consumption of the wireless device for which wireless device specific DRX is supported by the wireless device and dynamic cell-on/off transitioning/switching is supported by the base station.

Figure 37B:
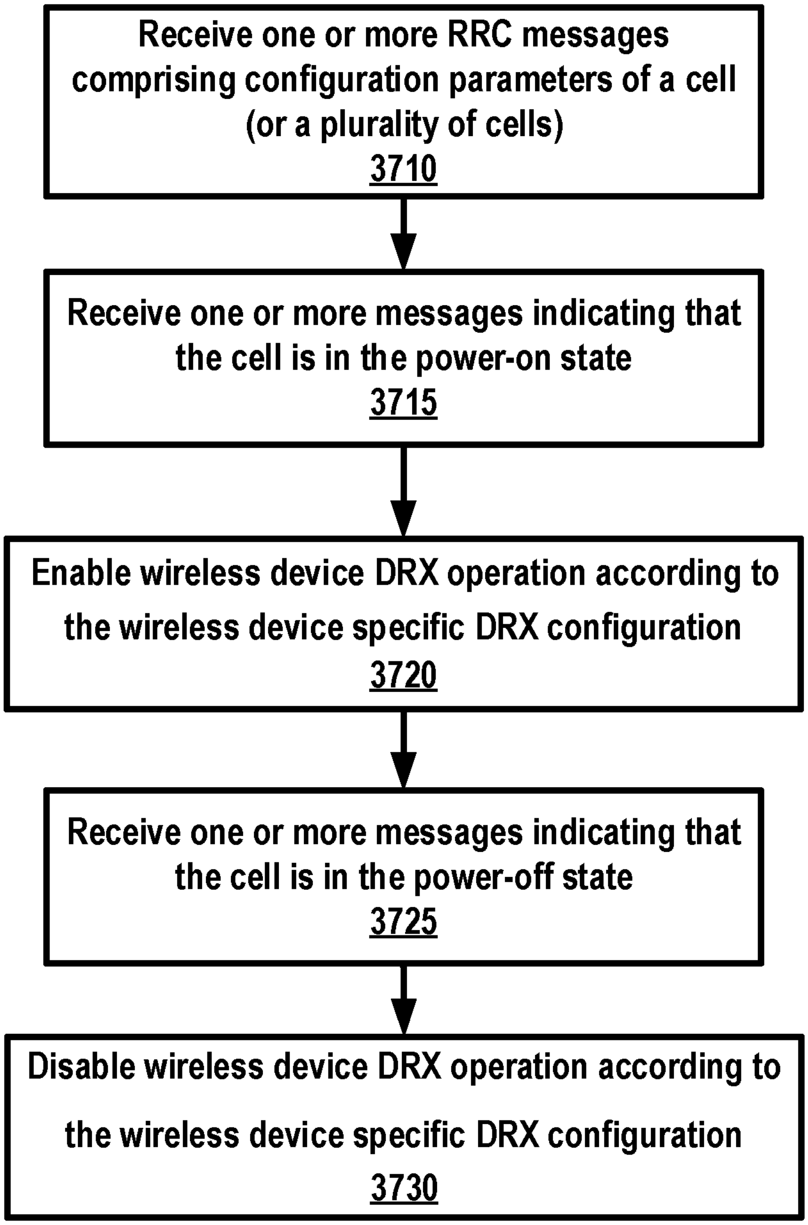
FIG. 37B shows an example method of DRX for energy saving.

FIG. 37B shows an example method of DRX for energy saving. At 3710, one or more messages (e.g., RRC messages) may be received, for example, by a wireless device, comprising configuration parameters of a cell (or a plurality of cells). At 3715, one or more messages may be received, for example, by the wireless device, indicating that the cell is in a power-on state (e.g., cell DTX on duration). At 3720, wireless device DRX operation may be enabled according to wireless device specific DRX configurations, for example, based on determining that the cell is in the power-on state. At 3725, one or more messages may be received, for example, by the wireless device, indicating that the cell is in a power-off state (e.g., cell DTX off duration). At 3730, wireless device DRX operation may be disabled according to wireless device specific DRX configurations, for example, based on determining that the cell is in the power-off state.

Figure 37C:
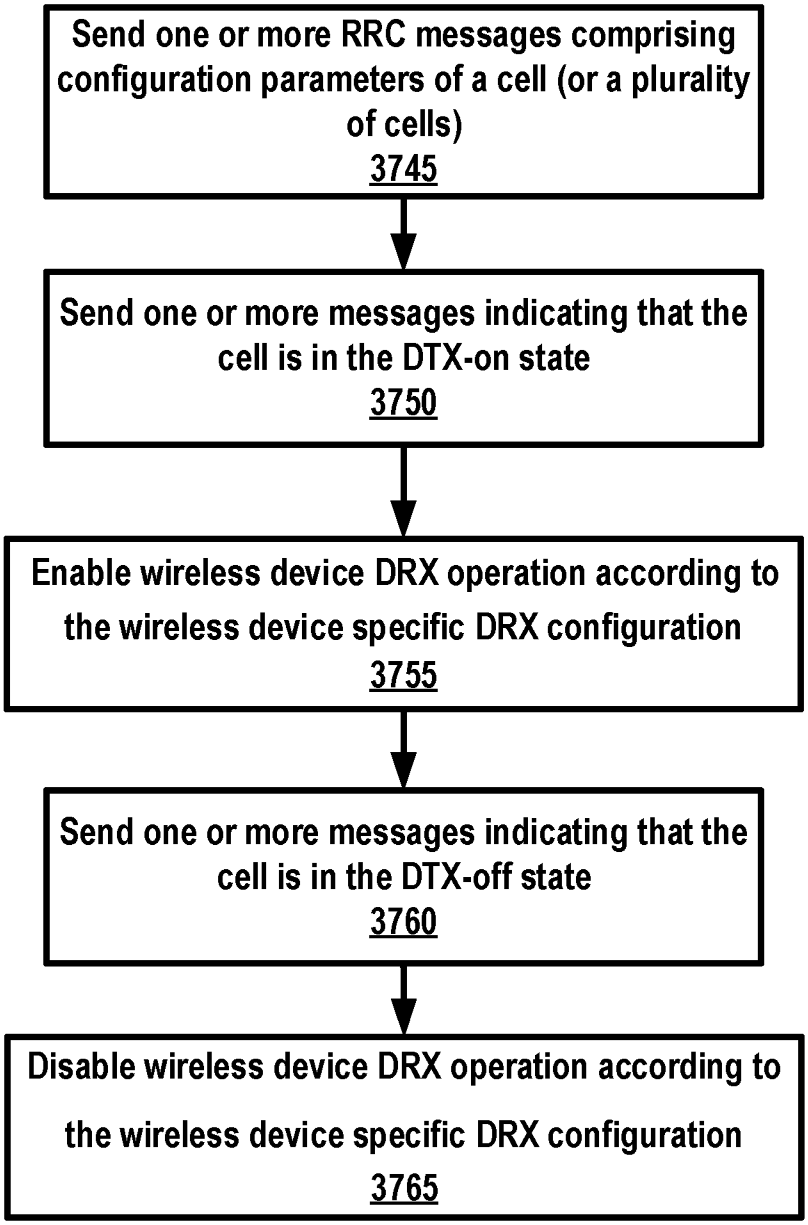
FIG. 37C shows an example method of DTX for energy saving.

FIG. 37C shows an example method of DTX for energy saving. At 3745, one or more messages (e.g., RRC messages) may be sent, for example, by a base station, comprising configuration parameters of a cell (or a plurality of cells). At 3750, one or more messages may be sent, for example, by the base station, indicating that the cell is in a power-on state (e.g., cell DTX on duration). At 3755, wireless device DRX operation may be enabled according to wireless device specific DRX configurations, for example, based on the cell being in the power-on state. At 3760, one or more messages may be sent, for example, by the base station, indicating that the cell is in a power-off state (e.g., cell DTX off duration). At 3765, wireless device DRX operation may be disabled according to wireless device specific DRX configurations, for example, based on the cell being in the power-off state.

Figure 38A:
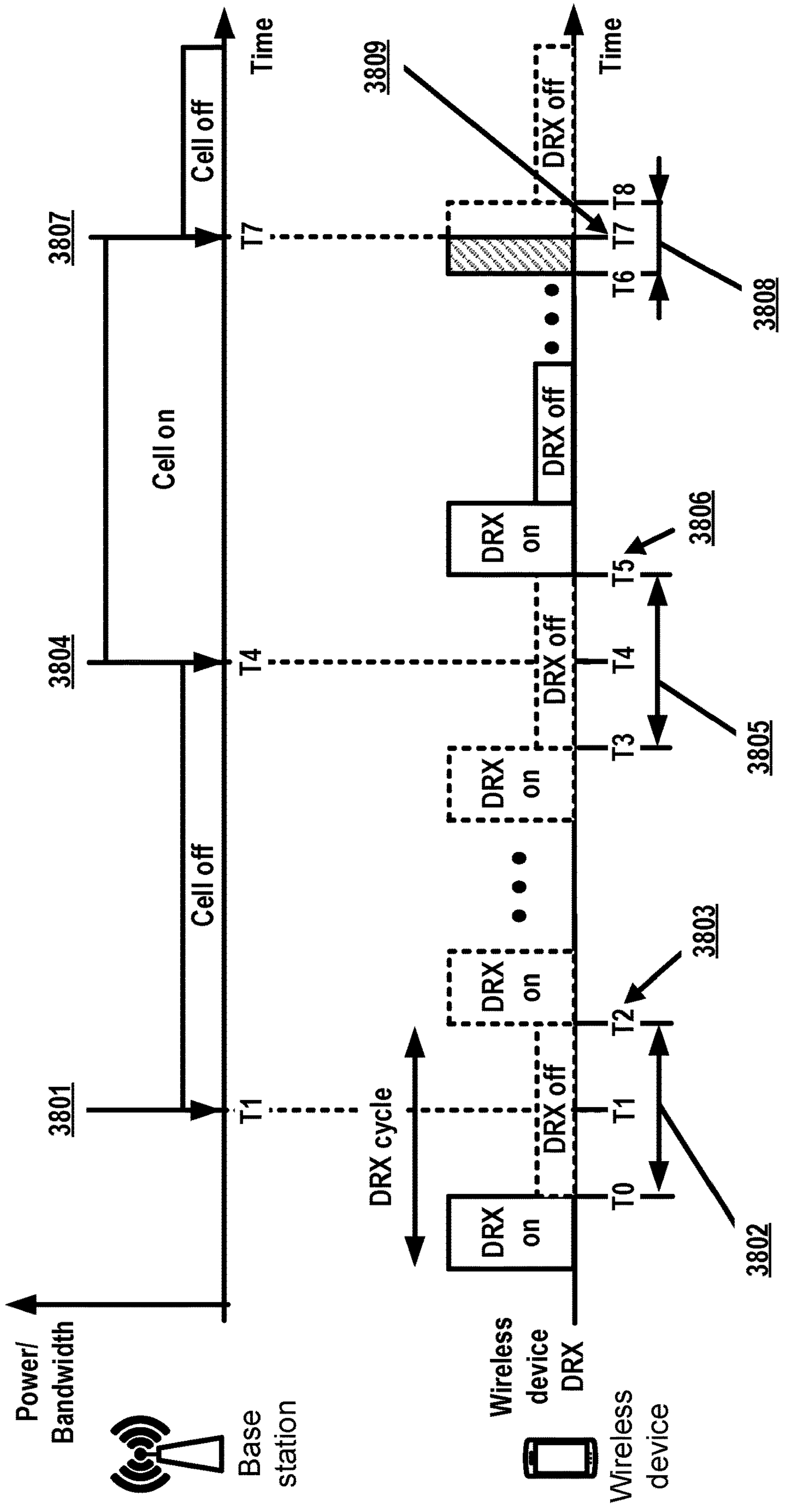
FIG. 38A shows an example of DTX and DRX for energy saving.

FIG. 38A shows an example of DTX and DRX for energy saving. The example of FIG. 38A is based on examples such as described with respect to FIG. 37A. A wireless device (e.g., UE) may receive and/or a base station (e.g., gNB) may send/transmit one or more RRC messages comprising first configuration parameters of a wireless device specific DRX configuration and second configuration parameters of a cell (level/specific) DTX configuration, such as described with respect to FIG. 37A.

The second configuration parameters may comprise PDCCH related parameters for receiving DCI, at 3801, indicating cell-on/off indication (or enabling/disabling the cell DTX configuration such as shown in FIG. 37A). The PDCCH related parameters may indicate a search space, a control resource set and/or a RNTI dedicated for receiving the DCI. A search space and/or a control resource set may be implemented such as described with respect to FIG. 14, FIG. 26 and/or FIG. 27. The RNTI dedicated for receiving the DCI indicating the cell-on/off indication may be different from C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI and/or SL Semi-Persistent Scheduling V-RNTI. The RNTI dedicated for receiving the DCI indicating the cell-on/off indication (for energy saving for the base station) may be different from a PS-RNTI configured for the wireless device to receive a wake-up indication for the wireless device's power saving (e.g., such as described with respect to FIG. 31A and/or FIG. 31B.) in at least some wireless communications.

The wireless device may perform the wireless device specific DRX configuration on a cell (or a plurality of cells) (e.g., such as described with respect to FIG. 29, FIG. 30 and/or FIG. 37A), such as described with respect to FIG. 38A. The wireless device may monitor PDCCH for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI and/or SL Semi-Persistent Scheduling V-RNTI in a DRX active time of the wireless device specific DTX configuration. The DRX active time may comprise a time duration for which a DRX on duration timer of the wireless device specific DRX configuration is running, a DRX retransmission timer is running, a RA contention resolution timer is running, a SR is sent on PUCCH and is pending, and/or a PDCCH indicating a new transmission addressed to the C-RNTI of the MAC entity has not been received, for example, after successful reception of a RAR for a RA preamble not selected by the MAC entity among the contention-based RA preambles.

The wireless device may stop monitoring the PDCCH for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI and/or SL Semi-Persistent Scheduling V-RNTI in a DRX inactive time of the wireless device specific DTX configuration. The DRX inaction time comprises a time duration outside of the DRX active time. The wireless device may monitor the PDCCH for the dedicated RNTI for receiving a DCI comprising the cell-on/off indication (for energy saving for the base station) regardless of whether the wireless device is in a DRX active time or in a DRX inactive time (such as described with respect to FIG. 38A).

The wireless device may monitor the PDCCH for the dedicated RNTI for receiving a DCI comprising the cell-on/off indication, for example, in the DRX off (inactive) period (e.g., between TO and T2) according to the wireless device specific DRX configuration (such as described with respect to FIG. 38A). The wireless device may stop monitoring the PDCCH for other RNTIs (e.g., C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI and/or SL Semi-Persistent Scheduling V-RNTI) according to the wireless device specific DRX configuration, for example, in the DRX off period between TO and T2. At 3802, the wireless device may monitor the PDCCH for the PS-RNTI configured for the wireless device to receive a wake-up indication for the wireless device's power saving, for example, in the DRX off period between TO and T2.

The wireless device may receive, at T1, first DCI comprising the cell-on/off indication for the PDCCH monitoring for the dedicated RNTI associated with the first DCI in the DRX off period between TO and T2 (such as described with respect to FIG. 38A). At 3803, the wireless device may not start drx-onDurationTimer at a subframe (with subframe index S) (or at a slot that is drx-SlotOffset from the beginning of the subframe, if drx-SlotOffset is not zero), for example, if [(SFN*10)+S] modulo (drx-longCycle) =drxStartOffset, if the wireless device is using the long cycle DRX configuration, for example, based on (e.g., after or in response to) the first DCI comprising the cell-on/off indication indicating that the cell is in a power-off state (or a second power state/mode). A system frame number (e.g., SFN) may be a system frame number of the subframe. A value (e.g., drx-longCycle) may be a value of the DRX cycle configured for the wireless device specific DRX configuration in the one or more RRC messages. A time offset (e.g., drxStartOffset) may be a time offset of a starting point of the DRX cycle, relative to subframe 0, configured for the wireless device specific DRX configuration in the one or more RRC messages. drx-SlotOffset may be a time delay, for example, before starting the drx-onDurationTimer in the DRX cycle.

The wireless device may not start a timer (e.g., drx-onDurationTimer) at a subframe (with subframe index S) (or at a slot that is drx-SlotOffset from the beginning of the subframe, if drx-SlotOffset is not zero), for example, if [(SFN*10)+S] modulo (drx-ShortCycle)=(drxStartOffset) modulo (drx-ShortCycle), if the wireless device is using the short cycle DRX configuration, for example, based on (e.g., after or in response to) the first DCI comprising the cell-on/off indication indicating that the cell is in a power-off state (or a second power state/mode). A system frame number (e.g., SFN) may be a system frame number of the subframe. A value (e.g., drx-ShortCycle) may be a value of the DRX cycle configured for the wireless device specific DRX configuration in the one or more RRC messages. A time offset (e.g., drxStartOffset) may be a time offset of a starting point of the DRX cycle, relative to subframe 0, configured for the wireless device specific DRX configuration in the one or more RRC messages. A time delay (e.g., drx-SlotOffset) may be a time delay, for example, before starting a timer (e.g., the drx-onDurationTimer) in the DRX cycle.

A subframe (e.g., T2) may be the subframe with a subframe index (e.g., subframe index S), and/or a slot (e.g., drx-SlotOffset), for example, after the beginning of the subframe with subframe index S), such as described with respect to FIG. 38A. A slot and a subframe may be implemented such as described with respect to FIG. 7.

The wireless device may use the short cycle DRX configuration, for example if the base station is supporting dynamical cell-on/off operation. Using (e.g., always using) the short cycle DRX configuration may allow the wireless device to quickly wake up to monitor PDCCH for example, if the cell is on.

The wireless device may use the long cycle DRX configuration, for example, if the base station is supporting dynamical cell-on/off operation. Using (e.g., always using) the long cycle DRX configuration may allow the wireless device to reduce power consumption for monitoring PDCCH, for example, if the cell is on.

Within a time duration (e.g., between T2 and T4) for which the cell is in the power-off state (or the second power state/mode), the wireless device may disable the wireless device specific DRX configuration/operation (such as described with respect to FIG. 38A). Disabling the wireless device specific DRX configuration/operation may comprise not starting the DRX on duration timer in a subframe (or a slot), for example, if the wireless device is supposed to start the DRX on duration timer in the subframe according to the wireless device specific DRX configuration/operation. Not starting the DRX on duration timer may avoid the wireless device to transition to a DRX active time for which the wireless device is required to monitor PDCCH and/or send/transmit CSI report. Advantages described herein may provide for improving power consumption of the wireless device, for example, if allowing the wireless device to perform wireless device specific DRX operation for which the cell is dynamically transitioned between the power-on state and the power-off state.

At 3805, the wireless device may monitor the PDCCH for the dedicated RNTI for receiving a second DCI at 3804 comprising the cell-on/off indication (such as described with respect to FIG. 38A), for example, in a second DRX off period (e.g., between T3 and T5) according to the wireless device specific DRX configuration. The wireless device may stop monitoring the PDCCH for other RNTIs (e.g., C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI and/or SL Semi-Persistent Scheduling V-RNTI) according to the wireless device specific DRX configuration, for example, in the second DRX off period between T3 and T5. The wireless device may monitor the PDCCH for the PS-RNTI configured for the wireless device to receive a wake-up indication for the wireless device's power saving, for example, in the second DRX off period between T3 and T5. At 3804, the wireless device may receive, at T4, the second DCI comprising the cell-on/off indication for the PDCCH monitoring for the dedicated RNTI associated with the second DCI in the second DRX off period between T3 and T5 (such as described with respect to FIG. 38A).

At 3806, the wireless device may start a DRX on duration timer, for a second DRX cycle, at a subframe (with subframe index T) (at a slot that is drx-SlotOffset from the beginning of the subframe, if drx-SlotOffset is not zero)) for which [(SFN*10)+T] modulo (drx-longCycle)=drxStartOffset, for example, if the wireless device is using the long cycle DRX configuration, for example, based on (e.g., after or in response to) the second DCI comprising the cell-on/off indication indicating that the cell is in a power-on state (or a first power state/mode). A system frame number (e.g., SFN) may be a system frame number of a subframe (e.g., subframe T). A value of the DRX cycle (e.g., drx-longCycle) may be a value of the DRX cycle configured for the wireless device specific DRX configuration in the one or more RRC messages. A time offset (e.g., drxStartOffset) may be a time offset of a starting point (where the DRX on duration timer is supposed to start) of the DRX cycle, relative to subframe 0, configured for the wireless device specific DRX configuration in the one or more RRC messages. A delay (e.g., drx-SlotOffset) may be a delay, for example, before starting the DRX on duration timer of the DRX cycle.

The wireless device may start a DRX on duration timer at a subframe (with subframe index T) (or at a slot that is drx-SlotOffset from the beginning of the subframe, if drx-SlotOffset is not zero)) for which [(SFN*10)+T] modulo (drx-ShortCycle)=(drxStartOffset) modulo (drx-ShortCycle), for example, if the wireless device is using the short cycle DRX configuration, for example, based on (e.g., after or in response to) the second DCI comprising the cell-on/off indication indicating that the cell is in a power-on state (or a first power state/mode). A system frame number (e.g., SFN) may be a system frame number of a subframe (e.g., the subframe T). A value of the DRX cycle (e.g., drx-ShortCycle) may be a value of the DRX cycle configured for the wireless device specific DRX configuration in the one or more RRC messages. A time offset (e.g., drxStartOffset) may be a time offset of a starting point (where the DRX on duration timer is supposed to start) of the DRX cycle, relative to subframe 0, configured for the wireless device specific DRX configuration in the one or more RRC messages. A delay (e.g., drx-SlotOffset) may be a delay, for example, before starting the DRX on duration timer of the DRX cycle.

A subframe (e.g., the subframe T4) may be the subframe with a subframe index (e.g., subframe index T) (such as described with respect to FIG. 38A). A subframe may be implemented such as described with respect to FIG. 7. Within a time duration (e.g., between T4 and T6), for example, if the cell is in the power-on state (or the first power state/mode), the wireless device may enable the wireless device specific DRX configuration/operation (such as described with respect to FIG. 38A). Enabling the wireless device specific DRX configuration/operation may comprise starting the DRX on duration timer in a subframe, for example, if the wireless device is supposed to start the DRX on duration timer in the subframe for a DRX cycle according to the wireless device specific DRX configuration/operation. Enabling the wireless device specific DRX configuration/operation may comprise monitoring PDCCHs based on the DRX on duration timer being running, for example, after it's started in the DRX cycle within the time duration between T4 and T6. Enabling the wireless device specific DRX configuration/operation may comprise stopping monitoring PDCCHs based on the DRX on duration timer expiring in the DRX cycle within the time duration between T4 and T6.

At 3808, the wireless device may monitor the PDCCH for the dedicated RNTI for receiving a third DCI comprising the cell-on/off indication (such as described with respect to FIG. 38A), for example, in a DRX on/active period (e.g., between T6 and T8) according to the wireless device specific DRX configuration. The DRX on/active period may comprise a time duration, for example, if the DRX on duration timer is running and does not expire. In the DRX on/active period (e.g., between T6 and T8), the wireless device may monitor the PDCCH for other RNTIs (e.g., C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI and/or SL Semi-Persistent Scheduling V-RNTI) according to the wireless device specific DRX configuration. In the DRX on/active period (e.g., between T6 and T8), the wireless device may skip monitoring the PDCCH for the PS-RNTI configured for the wireless device to receive a wake-up indication for the wireless device's power saving.

At 3807, the wireless device may receive, for example, at T7, the third DCI comprising the cell-on/off indication for the PDCCH monitoring for the dedicated RNTI associated with the third DCI in the DRX on/active period (e.g., between T6 and T8) (such as described with respect to FIG. 38A). At 3809, the wireless device may stop (or disable) the DRX on duration timer (and/or other DRX timers comprising DRX inactivity timer, DRX DL/UL retransmission timer, DRX HARQ RTT timer (DL/UL), DRX retransmission timer for sidelink, DRX HARQ RTT timer for sidelink, etc.) for a third DRX cycle, at a subframe (e.g., at T7), for example, if the wireless device receives the third DCI and the DRX on duration timer is running (and/or the other DRX timers are running), for example, based on (e.g., after or in response to) the third DCI comprising the cell-on/off indication indicating that the cell is in a power-off state (or a second power state/mode). Stopping/disabling one or more running DRX timers, for example, if receiving DCI indicating that the cell is transitioned to the power-off state may enable the wireless device to stay in sleep mode and may avoid waking up the wireless device for PDCCH monitoring on the cell, DL data/RS reception on the cell and UL transmission via the cell. Otherwise, if keeping the one or more DRX timer running, for example, if the cell is in the power-off state, the wireless device may be required to monitor PDCCHs, for example, if the one or more DRX timer expires, although the base station does not send/transmit any PDCCH (e.g., if the cell is still in the power-off state). Advantages described herein may provide for reducing power consumption of the wireless device, for example, if wireless device specific DRX is supported by the wireless device and dynamic cell-on/off transitioning/switching is supported by the base station.

The wireless device may stop the DRX on duration timer for a DRX cycle at T7, for example, if the cell is in the power-off state from T7 (such as described with respect to FIG. 38A). The wireless device may maintain a DRX inactive state based on (e.g., after or in response to) stopping the DRX on duration timer at T7, for example, until receiving fourth DCI comprising a cell-on/off indication indicating that the cell is transitioned to the power-on state (or the first power state/mode).

A wireless device may monitor PDCCH for a RNTI dedicatedly configured for receiving a DCI comprising cell-on/off (or cell DTX enabling/disabling, cell DTX activation/deactivation, etc.) indication regardless of whether the wireless device is in a DRX inactive time (e.g., at T1 or T4) or in a DRX active time (e.g., at T7), such as described with respect to FIG. 38A. Advantages described herein may provide for allowing the wireless device to detect the DCI and determine whether the cell is in the power-on state or in the power-off state and accordingly perform a wireless device specific DRX operation based on whether the cell in the power-on state and the power-off state.

A wireless device may stop a DRX on duration timer (or one more other DRX timers comprising DRX inactivity timer, DRX DL/UL retransmission timer, DRX HARQ RTT timer (DL/UL), DRX retransmission timer for sidelink, DRX HARQ RTT timer for sidelink, etc.), for example, based on (e.g., after or in response to) receiving DCI comprising a cell-on/off indication indicating that the cell is transitioned to the power-off state and the DRX on duration being running (such as described with respect to FIG. 38A). Advantages described herein may provide for reducing power consumption of the wireless device, for example, if wireless device specific DRX is supported by the wireless device and dynamic cell-on/off transitioning/switching is supported by the base station.

In at least some wireless communications, if a long DRX cycle is used, a wireless device may determine whether to start a DRX on duration timer for a DRX configuration in a slot/subframe by checking the slot/subframe by checking if [(SFN×10)+subframe number] modulo (drx-LongCycle) =drx-StartOffset, wherein SFN is the system frame number of the subframe. If a short DRX cycle is used, a wireless device may determine whether to start a DRX on duration timer for a DRX configuration in a slot/subframe by checking the slot/subframe by checking if [(SFN×10)+subframe number] modulo (drx-ShortCycle)=(drx-StartOffset) modulo (drx-ShortCycle), wherein SFN is the system frame number of the subframe.

A base station may semi-statically, or dynamically power on or power off a cell (or a plurality of cells) for network energy saving. The wireless device, in at least some wireless communications, may not save power by taking advantage of the cell being switched between the power-on state and the power-off state, for example, if the cell is switched between the power-on state and the power-off state. The wireless device may start the DRX on duration timer according to DRX parameters (e.g., drx-LongCycle/drx-shortCycle, drx-StartOffset) regardless of (or independent of) whether the cell is in the power-on state or in the power-off state and thereby wasting power. In at least some wireless communications, the wireless device may monitor PDCCH on the cell (e.g., if the DRX on duration timer is running), for example, if the base station has already stopped downlink transmission on the cell. At least some wireless communications may increase power consumption of the wireless device.

A wireless device may determine whether to start a DRX on duration timer at a slot (or a subframe) based on one or more configuration parameters (drx-Cycle, drx_StartOffset, drx_slotOffset, etc.) of the wireless device specific DRX configuration/operation and one or more configuration parameters (a starting point of a cell DTX on/off duration, a length of the cell DTX on/off duration, etc.) of the cell specific DTX configuration/operation. Advantages described herein may provide for aligning the wireless device specific DRX between the wireless device and the base station, for example, if the base station transitions the cell between a cell on state (or a power-on state, a first power state/mode) and a cell off state (or a power-off state, a second power state/mode). Examples may reduce power consumption of a wireless device.

Figure 38B:
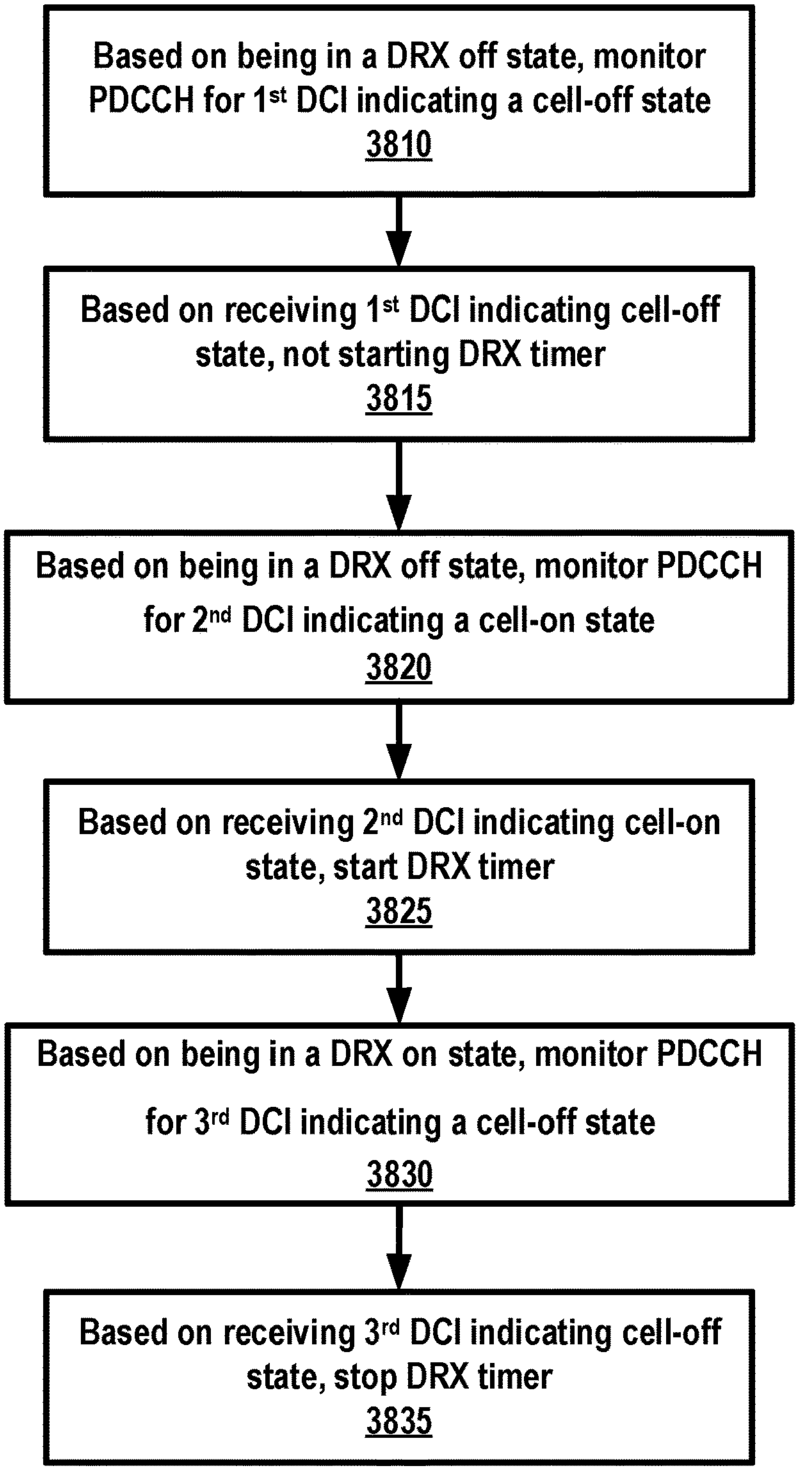
FIG. 38B shows an example method of DRX for energy saving.

FIG. 38B shows an example method of DRX for energy saving. At 3810, PDCCH may be monitored, for example, by a wireless device, for first DCI indicating a cell-off state, for example, based on being in a DRX off state. At 3815, a DRX timer may not be started, for example, based on receiving the first DCI indicating the cell-off state. At 3820, PDCCH may be monitored, for example, by the wireless device, for second DCI indicating a cell-on state, for example, based on being in a DRX off state. At 3825, a DRX timer may be started, for example, based on receiving the second DCI indicating the cell-on state. At 3830, PDCCH may be monitored, for example, by the wireless device, for third DCI indicating a cell-off state, for example, based on being in a DRX on state. At 3835, a DRX timer may be stopped/disabled, for example, based on receiving the third DCI indicating the cell-on state.

Figure 38C:
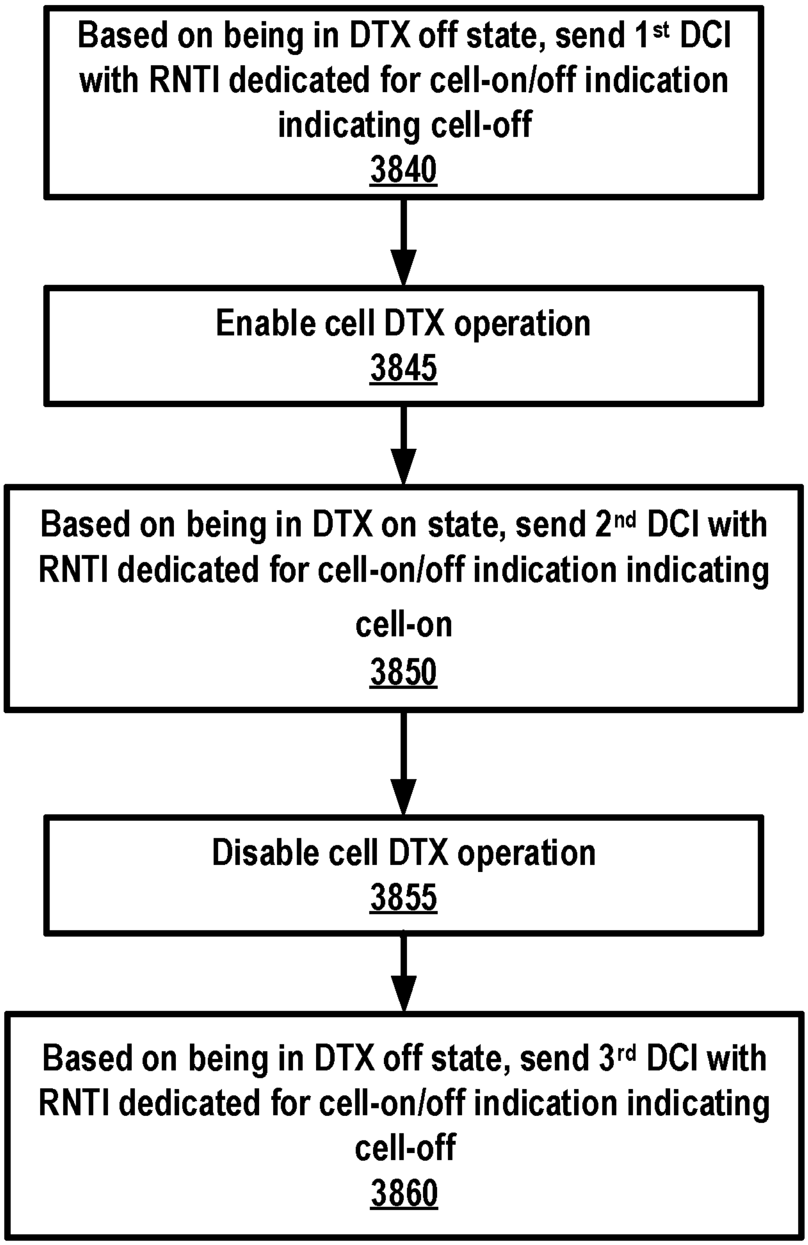
FIG. 38C shows an example method of DTX for energy saving.

FIG. 38C shows an example method of DTX for energy saving. At 3840, first DCI may be sent, for example by a base station, with RNTI (e.g., dedicated for cell-on/off indication) indicating a cell-off state, for example, based on being in a DTX off state. At 3845, cell DTX operation may be enabled, for example, by the base station. At 3850, second DCI may be sent, for example, by the base station, with RNTI indicating a cell-on state. At 3855, cell DTX operation may be disabled, for example, by the base station. At 3860, third DCI may be sent, for example, by the base station, with RNTI indicating a cell-off state.

Figure 39A:
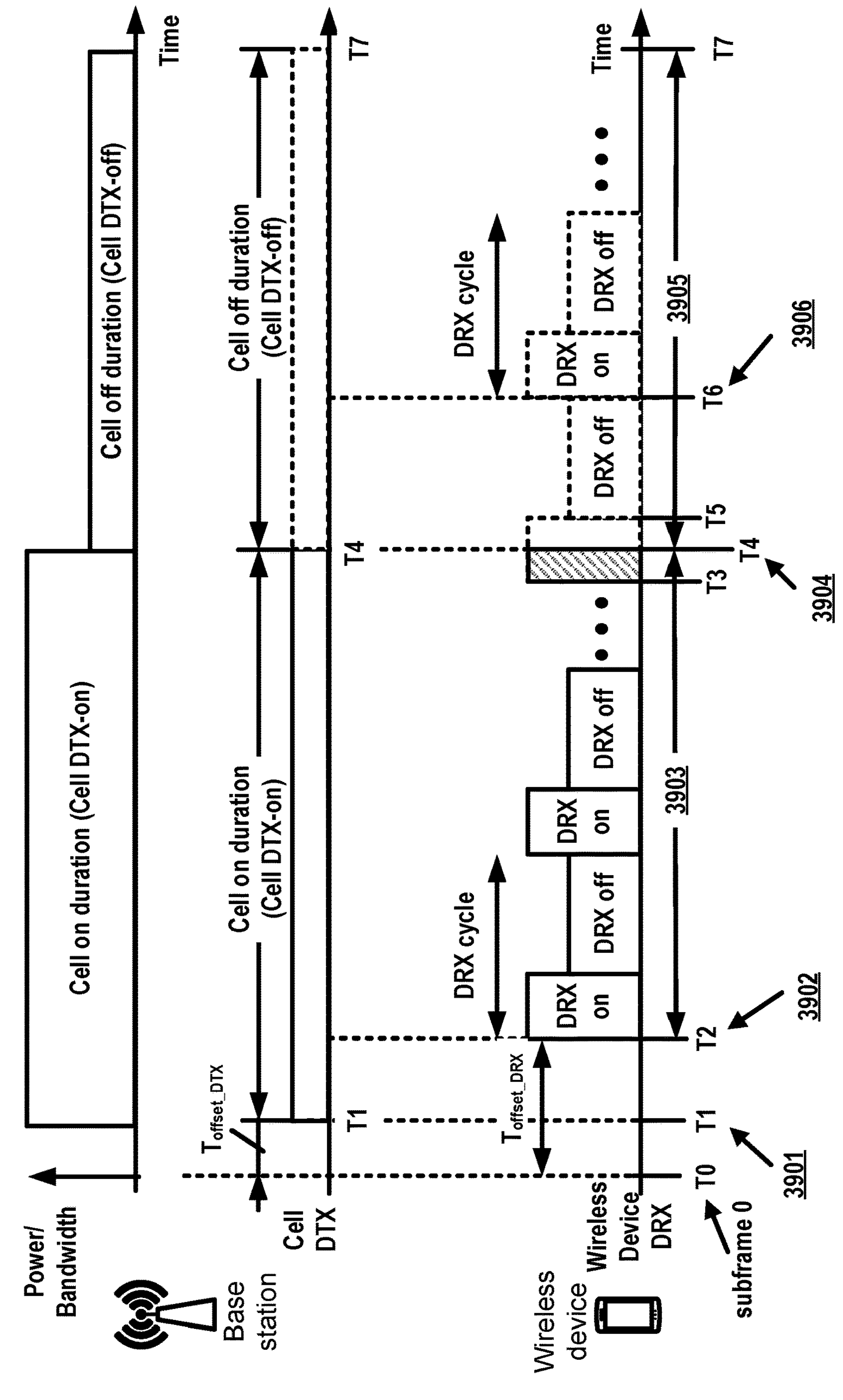
FIG. 39A shows an example of DTX and DRX for energy saving.

FIG. 39A shows an example of DTX and DRX for energy saving. The example of FIG. 39A is based on one or more examples described herein with respect to FIG. 37A and/or FIG. 38A. By implementing examples such as described herein with respect to FIG. 37A, a base station may indicate to a wireless device that a cell (or a plurality of cells) is in a first power state/mode (e.g., cell on duration) for a first time period (e.g., between T1 and T4 such as in FIG. 39A) and in a second power state/mode (e.g., cell off duration) for a second time period (e.g., between T4 and T7 such as in FIG. 39A). The cell may be periodically transitioned between the first power state/mode and the second power state/mode, for example, such as described with respect to FIG. 37A.

The total length of the first time period and the second time period of the cell DTX configuration/operation and a starting point of the first time period may be implemented such as described with respect to FIG. 37A. The starting point may be determined based on a time offset value (e.g., Toffset_DTX), relative to subframe 0, configured for the cell DTX operation/configuration of one or more RRC messages.

The wireless device may be further configured with a wireless device specific DRX configuration/operation configured in one or more RRC messages, for example, such as described with respect to FIG. 37A and/or FIG. 38A. The one or more RRC messages may comprise a second time off value (e.g., Toffset_DRX), relative to subframe 0 indicating a starting point of a DRX cycle of the wireless device specific DRX configuration/operation. A value (e.g., Toffset_DRX) may be a value (e.g., drx-StartOffset) configured for the wireless device specific DRX configuration/operation.

The base station and/or the wireless device may determine that the cell is in the first power state/mode (or in the power-on state), for example, between T1 and T4, wherein T1 starts at a subframe that is a number of subframes (determined based on Toffset_DTX), for example, after subframe 0 (e.g., TO in FIG. 39A) in a radio frame, for example, based on one or more RRC messages (such a described with respect to FIG. 39A). At 3901, the base station and/or the wireless device may start a DTX on duration timer at a time (e.g., T1), based on a timer value of the DTX on duration timer configured in the one or more RRC messages.

At 3903, the wireless device may enable (or perform) the wireless device specific DRX configuration/operation according to configuration parameters of the wireless device specific DRX configuration/operation, for example, based on determining that the cell is in the first power state/mode (e.g., between T1 and T4) (such as described with respect to FIG. 39A). At 3902, the wireless device may start a DRX on duration timer at T2 (or, for example, after drx-SlotOffset at the beginning of the subframe at T2), if [(SFN×10)+subframe number of T2] modulo (drx-Cycle)=(Toffset_DRX) and if T2 is between T1 and T4, for example, if the cell is in the first power state, for example, based on enabling the wireless device specific DRX configuration/operation. A system frame number (e.g., SFN) is a system frame number of the subframe at T2. The wireless device may start PDCCH monitoring and/or CSI feedback in a DRX on duration for which the DRX on duration timer is running based on a timer value of the DRX on duration timer configured in the one or more RRC messages, for example, based on (e.g., after or in response to) the DRX on duration timer being started at T2.

The first time offset (Toffset_DTX) for the cell DTX configuration may be different from the second time offset (Toffset_DRX) for the wireless device specific DRX configuration (such as described with respect to FIG. 39A). The length of a wireless device specific DRX cycle may be smaller than the length of the first time period (e.g., between T1 and T4), for example, if the cell is in the power-on state, which may enable the wireless device to switch on/off (for PDCCH monitoring and CSI reporting) between T1 and T4 for saving power. Allowing the base station to configure wireless device specific Toffset_DRX (and/or wireless device specific DRX cycle length) different from cell specific Toffset_DTX (and/or cell specific DTX length) may enable different wireless devices to perform different wireless device specific DRX operations, for example, if the cell is in the power-on state.

At 3904, the DTX on duration timer may expire at T4 based on configuration parameters of the cell level DTX configuration/operation (such as described with respect to FIG. 39A). At 3905, the wireless device may disable the wireless device specific DRX configuration/operation, for example, based on (e.g., after or in response to) the DTX on duration timer expiring at T4. At 3904, disabling the wireless device specific DRX configuration/operation may comprise stopping the DRX on duration timer at T4 if the DRX on duration timer is running at T4. The wireless device, based on stopping the DRX on duration timer at T4, may stop monitoring PDCCH and/or CSI transmissions in the rest time period (between T4 and T5) of the DRX on duration of a DRX cycle.

The wireless device may determine a next starting point of a new DRX cycle, for example, such as described with respect to FIG. 29, FIG. 37A and/or FIG. 38A (such as described with respect to FIG. 39A). The wireless device may determine the next starting point of the new DRX cycle is T6, for example, by checking if [(SFN×10)+subframe number of T6] modulo (drx-Cycle)=(Toffset_DRX), wherein a system frame number (e.g., SFN) is the system frame number of the subframe at T6 (such as described with respect to FIG. 39A). At 3906, the wireless device may determine not to start the DRX on duration timer at T6 (or, for example, at the slot that is after an offset (e.g., drx_SlotOffset) at the beginning of the subframe at T6) if [(SFN×10)+subframe number of T6] modulo (drx-Cycle)=(Toffset_DRX) and T6 is within the second time period (between T4 and T7) for which the cell is in the second power state/mode (or in the power-off state).

A wireless device may determine whether to start a DRX on duration timer at a slot (or a subframe) based on one or more configuration parameters (drx-Cycle, drx_StartOffset, drx_slotOffset, etc.) of the wireless device specific DRX configuration/operation and one or more configuration parameters (a starting point of a cell DTX on/off duration, a length of the cell DTX on/off duration, etc.) of the cell specific DTX configuration/operation (such as described with respect to FIG. 39A). Examples may align the wireless device specific DRX between the wireless device and the base station, for example, if the base station transitions the cell between a cell on state (or a power-on state, a first power state/mode) and a cell off state (or a power-off state, a second power state/mode). Advantages described herein may provide for reducing power consumption of a wireless device.

FIG. 39A may be modified to further improve power consumption of a wireless device. The first time offset (Toffset_DTX) of the cell DTX configuration may be jointly configured with the second time offset (Toffset_DRX) of the wireless device specific DRX configuration.

A wireless device may determine a reference slot (or subframe) of the second time offset (e.g., Toffset_DRX) is the starting point of the cell DTX configuration, instead of subframe 0. A base station may ensure all wireless devices in the cell to perform wireless device specific DRX operations within the cell on duration of the cell DTX configuration, for example, by determining the reference slot (or subframe) of the second time offset of the wireless device specific DRX cycle (wherein different wireless devices have different time offset values for their corresponding DRX cycles) as the starting point of the cell DTX configuration.

Figure 39B:
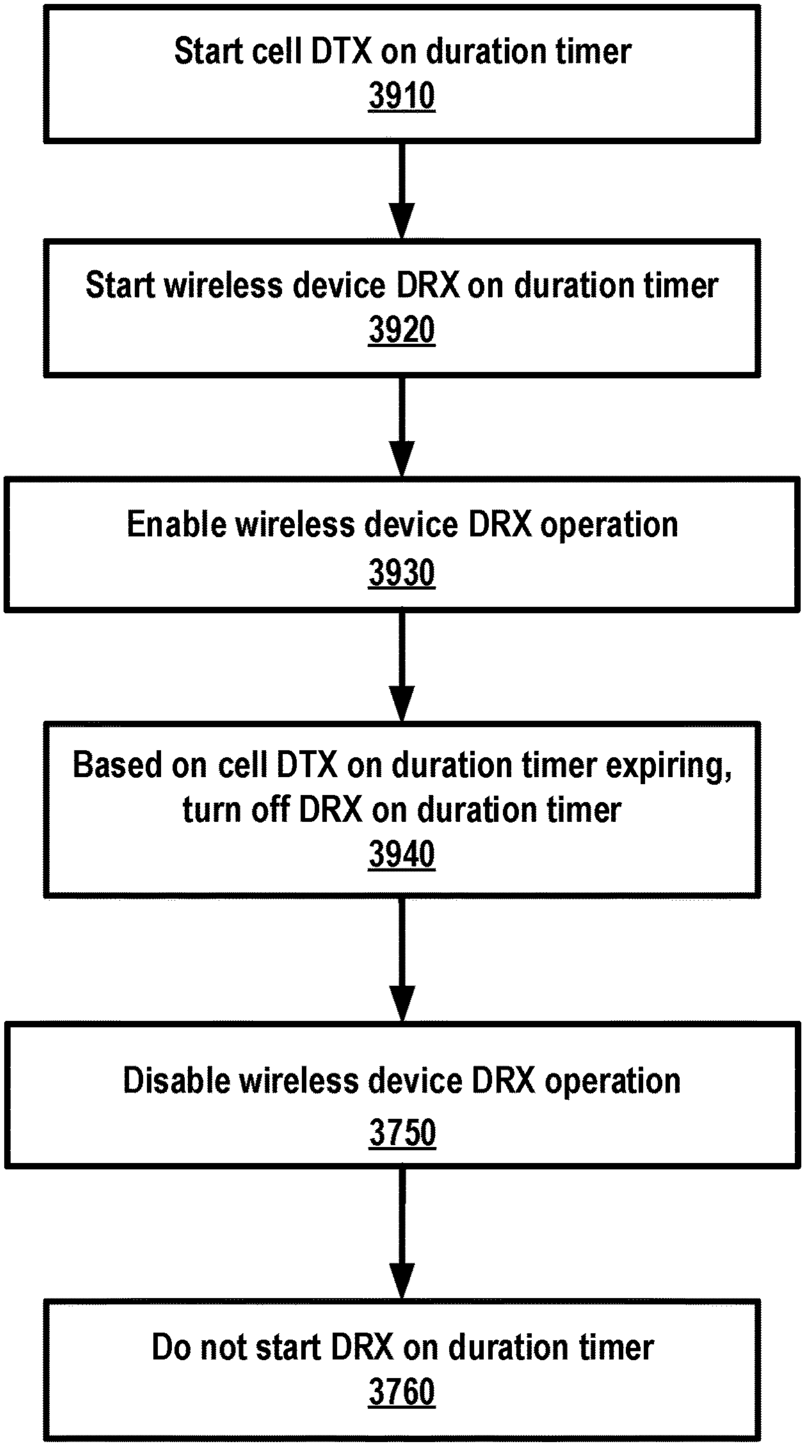
FIG. 39B shows an example method of DTX and DRX for energy saving.

FIG. 39B shows an example method of DTX and DRX for energy saving. At 3910, a cell DTX on duration timer may be started, for example, by a base station. At 3920, a wireless device DRX on duration timer may be started, for example, by a wireless device. At 3930, wireless device DRX operation may be enabled. At 3940, the DRX on duration timer may be stopped/turned off, for example, based on the cell DTX duration timer expiring. At 3750, wireless device DRX operation may be disabled. At 3760, a DRX on duration timer may not be started, for example, based on the wireless device DRX operation being disabled.

Figure 40:
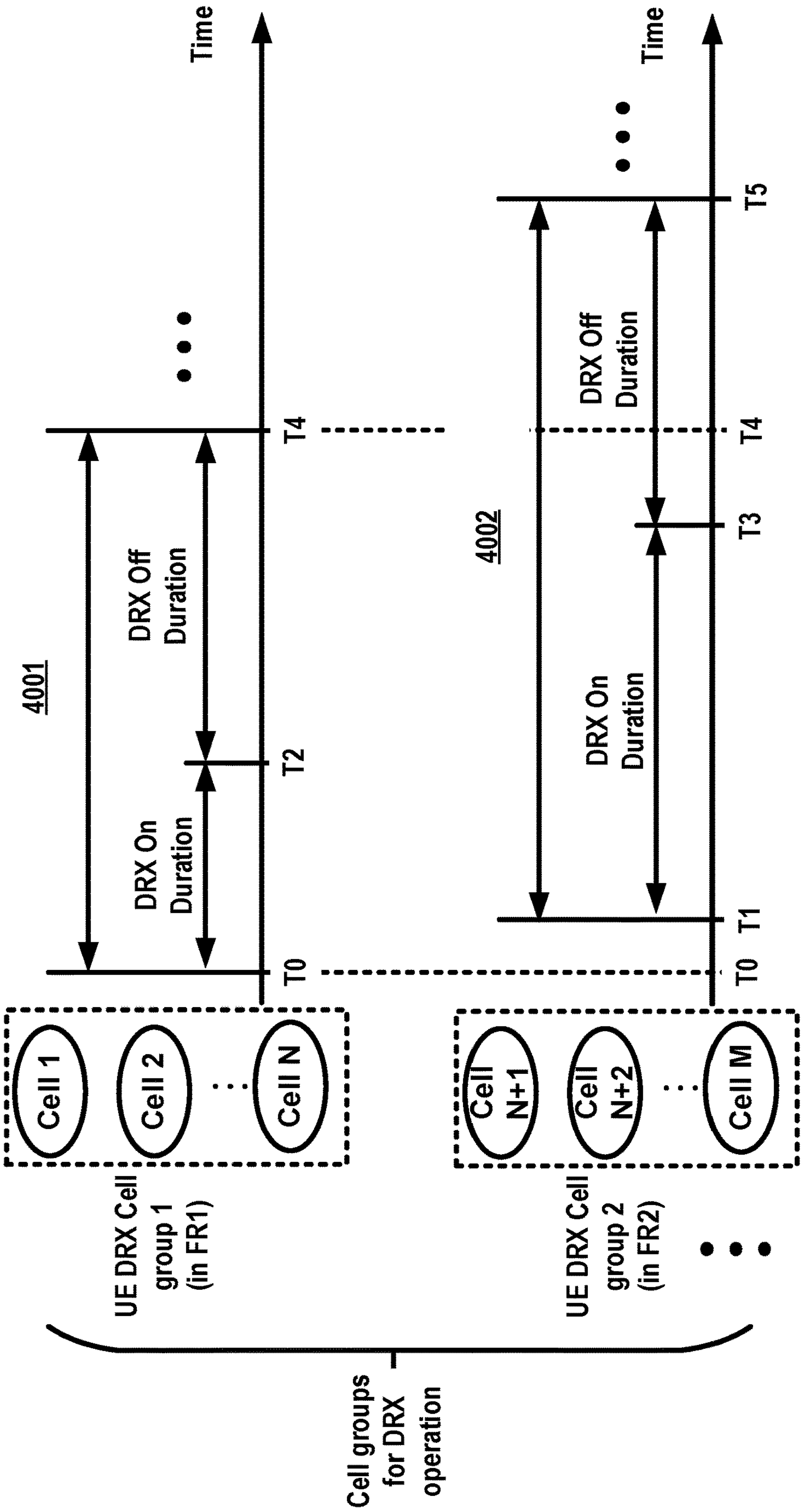
FIG. 40 shows an example of cell group based DRX operation.

FIG. 40 shows an example of cell group based DRX operation. A wireless device may receive (e.g., from a base station), one or more RRC messages comprising configuration parameters of a plurality of cells for DRX operation. The configuration parameters may indicate, for a cell (e.g., each cell), a cell group for DRX operation. A cell group for DRX operation may be in a same frequency range. Different cell groups may be in different frequency ranges. A cell may belong (e.g., uniquely belong) to a single cell group of a plurality of cell groups.

A first DRX configuration associated with a first cell group may be different from a second DRX configuration associated with a second cell group. A DRX configuration may be implemented such as described with respect to FIG. 29, FIG. 30, FIG. 37A, FIG. 38A, and/or FIG. 39A.

A first DRX configuration associated with a first cell group may be configured with a first length of a first DRX cycle 4001 and a first time offset of the start of the first DRX cycle, a first slot offset of a delay, for example, before staring a first DRX on duration timer of the first DRX cycle 4001 associated with the first cell group, a timer value of the first DRX on duration timer, etc., such as described with respect to FIG. 40. A second DRX configuration associated with a second cell group may be configured with a second length of a second DRX cycle 4002 and a second time offset of the start of the second DRX cycle, a second slot offset of a delay, for example, before staring a second DRX on duration timer of the second DRX cycle 4002 associated with the second cell group, a timer value of the second DRX on duration timer, etc.

The wireless device may perform the first DRX operation associated with the first cell group and the second DRX operation associated with the second cell group separately and/or independently. The wireless device may monitor PDCCHs on a cell (e.g., each cell) of the first cell group in a first DRX active time, for example, if the first DRX on duration timer is running, for example, based on performing the two DRX operations separately and/or independently. Monitoring the PDCCHs on the first cell group may not have impact on whether the wireless device shall monitor PDCCHs on the second cell group. The wireless device may determine to monitor PDCCHs on the second cell group based on (e.g., after or in response to) the second DRX on duration timer being running.

The wireless device may determine a first DRX cycle, for the first cell group, starting from T0 to T4 based on the configuration parameters of the first DRX configuration (such as described with respect to FIG. 40). In the first DRX cycle, the wireless device may determine that a time duration (e.g., between TO and T2) is a DRX active time (e.g., for which the first DRX on duration timer is running). The wireless device may determine a DRX active time such as described with respect to FIG. 29 and/or FIG. 30. The wireless device may perform PDCCH monitoring and/or CSI reporting for one or more cells of the first cell group in the time duration between TO and T2.

The wireless device may determine a second DRX cycle, for the second cell group, in a time duration (e.g., starting from T1 to T5) based on the configuration parameters of the second DRX configuration (such as described with respect to FIG. 40). In the second DRX cycle, the wireless device may determine that a time duration (e.g., between T1 and T3) is a DRX active time (e.g., for which the second DRX on duration timer is running). The wireless device may determine a DRX active time such as described with respect to FIG. 29 and/or FIG. 30. The wireless device may perform PDCCH monitoring and/or CSI reporting for one or more cells of the second cell group in the time duration (e.g., between T1 and T3).

A base station may enable a cell level DTX operation (e.g., based on one or more examples described herein with respect to FIG. 37A, FIG. 38A, and/or FIG. 39A). The base station may also configure cell group based wireless device specific DRX operation for multiple cell groups, for example, such as described with respect to FIG. 40. A wireless device may have difficulty in determining whether to use the cell level DTX operation to the first DRX configuration on the first cell group or to the second DRX configuration on the second cell group, for example, if both cell level DTX operation and cell group based DRX operation are supported in a system. Using a cell level DTX operation to a DRX configuration on a cell may be implemented such as described with respect to FIG. 37A, FIG. 38A and/or FIG. 39A. Misalignment between the base station and the wireless device regarding the DTX operation and the DRX operation on the multiple cell groups may occur which may lead to increased power consumption, increased latency, increased uplink interference, etc. As described herein, advantages may be achieved by improving the power consumption, latency and/or uplink interference for the DTX/DRX configuration on the multiple cell groups. Examples may comprise determining by a wireless device and/or a base station whether to use a DTX configuration to a first DRX cell group only, to a second DRX cell group only, or to both the first DRX cell group and the second DRX cell group, based on (e.g., after or in response to) receiving a message indicating the DTX configuration (or enabling/activating/initiating the DTX configuration), by (pre-) configuring or (pre-) defining a rule for the using the DTX configuration, wherein the rule is aligned between the wireless device and the base station.

Figure 41A:
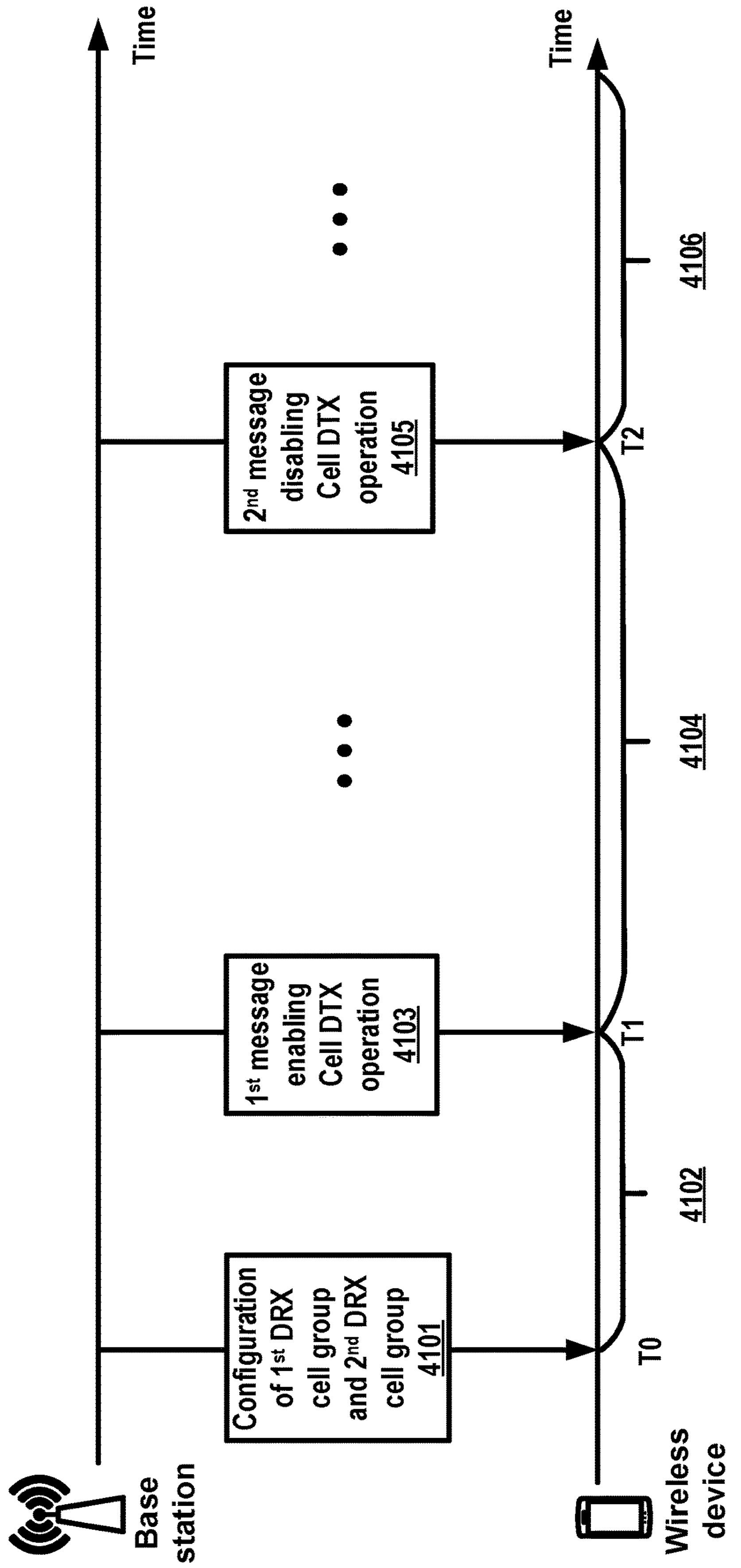
FIG. 41A shows an example of DTX and DRX for energy saving.

FIG. 41A shows an example of DTX and DRX for energy saving. The example of FIG. 41A may comprise examples of DTX and DRX for energy saving for cell groups. At 4101, a wireless device (e.g., UE) may receive from a base station (e.g., gNB) one or more RRC messages comprising configuration parameters of a first DRX cell group and a second DRX cell group. A DRX cell group (e.g., each DRX cell group) may comprise one or more cells. The one or more RRC messages may be implemented such as described with respect to FIG. 40. The one or more RRC messages may further comprise configuration parameters of a (cell level) DTX configuration (e.g., based on examples described herein with respect to FIG. 37A).

At 4103, the wireless device may receive a first message indicating to enable the DTX configuration (such as described with respect to FIG. 41A). For example, the wireless device may receive the first message at T1 after receiving the one or more RRC messages at TO. The first message may comprise RRC message(s), MAC CE(s) and/or DCI(s) such as described with respect to FIG. 37A.

At 4102, the wireless device may determine to perform the first DRX operation for the first cell group and the second DRX operation for the second cell group separately and/or independently (e.g., such as described with respect to FIG. 40). For example, the wireless device may determine to perform the first and second DRX operations after receiving the one or more RRC messages at TO and, for example, before receiving the first message at T1 (such as described with respect to FIG. 41A).

The wireless device may determine whether to use the DTX configuration on the first DRX cell group or on the second DRX cell group based on receiving the first message indicating to enable the DTX configuration (such as described with respect to FIG. 41A). The wireless device may determine whether to use the DTX configuration on the first DRX cell group or on the second DRX cell group based on at least one of: a cell on which the wireless device receives the first message, contents of the first message, one or more configured/predefined rules, etc.

The wireless device may determine to use the DTX configuration on the first DRX cell group and determine not to use the DTX configuration on the second DRX cell group based on receiving the first message via a cell belonging to the first cell group. The wireless device may determine not to use the DTX configuration on the first DRX cell group and determine to use the DTX configuration on the second DRX cell group based on receiving the first message via a cell belonging to the second cell group.

Using the cell DTX configuration on a DRX cell group may be implemented such as described with respect to FIG. 37A, FIG. 38A and/or FIG. 39A. Not using the cell DTX configuration on a DRX cell group may comprise performing DRX operation on a cell of the DRX cell group based on assuming that the cell is (always) in a power-on state (or a first power state/mode).

A first rule for using the cell DTX configuration, for example, if receiving the first message indicating to enable the DTX configuration, may comprise the wireless device determining to use the DTX configuration on both the first DRX cell group and the second DRX cell group, based on receiving the first message. A second rule for using the cell DTX configuration, for example, if receiving the first message indicating to enable the DTX configuration, may comprise the wireless device determining to use the DTX configuration on the first DRX cell group (e.g., in FR 1) and determining not to use the DTX configuration on the second DRX cell group (e.g., in FR 2), based on receiving the first message. A third rule for using the cell DTX configuration, for example, if receiving the first message indicating to enable the DTX configuration, may comprise the wireless device determining not to use the DTX configuration on the first DRX cell group (e.g., in FR 1) and determining to use the DTX configuration on the second DRX cell group (e.g., in FR 2), based on receiving the first message. A rule (e.g., the first rule, the second rule and the second rule) may be indicated in the one or more RRC messages or preconfigured to be known by both the base station and the wireless device.

At 4104, the wireless device may determine whether to use the DTX configuration on the first DRX cell group or on the second DRX cell group based on the contents of the first message. The wireless device may use the DTX configuration only on the first DRX cell group and may not use the DTX configuration on the second DRX cell group, for example, based on (e.g., after or in response to) the contents of the first message indicating to enable the DTX configuration to the first cell group. Based on (e.g., after or in response to) the contents of the first message indicating to enable the DTX configuration to the second cell group, the wireless device may use the DTX configuration only on the second DRX cell group and may not use the DTX configuration on the first DRX cell group. The wireless device may use the DTX configuration on both the first DRX cell group and the second DRX cell group, for example, based on (e.g., after or in response to) the contents of the first message indicating to enable the DTX configuration to both the first cell group and the second cell group. The first message may comprise a bitfield (e.g., 2 bits) indicating whether the DTX configuration is used on the first DRX cell group only, the second DRX cell group only or on both the first DRX cell group and the second DRX cell group.

At 4105, the wireless device may receive, at T2, a second message indicating to disable (deactivate, release, or clear) the DTX configuration (such as described with respect to FIG. 41A). At 4106, the wireless device may perform the first DRX operation on the first DRX cell group and the second DRX operation on the second DRX cell group separately and/or independently, same as the case in the time duration between TO and T1, for example, based on (e.g., after or in response to) receiving the second message.

The wireless device may determine whether to use a DTX configuration to a first DRX cell group only, to a second DRX cell group only, or to both the first DRX cell group and the second DRX cell group, for example, based on (e.g., after or in response to) receiving a message indicating the DTX configuration (or enabling/activating/initiating the DTX configuration), by (pre-) configuring or (pre-) defining a rule for the using the DTX configuration, wherein the rule is aligned between the wireless device and the base station (such as described with respect to FIG. 41A). Advantages described herein may provide for aligning the base station and the wireless device regarding the application of DTX operation, for example, if multiple DRX cell groups are configured. Advantages described herein may provide for improving power consumption of the wireless device and/or the base station.

Figure 41B:
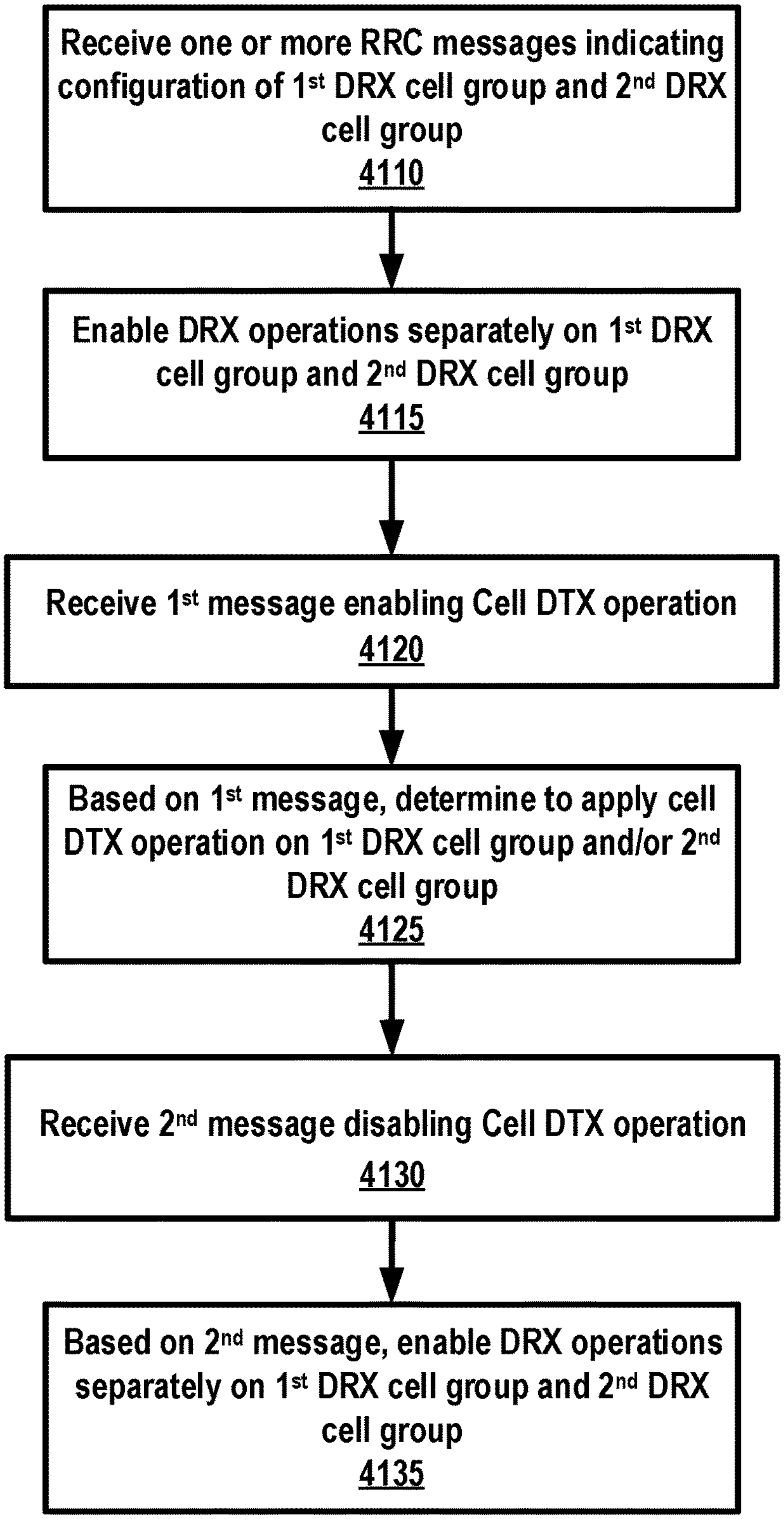
FIG. 41B shows an example method of DRX for energy saving.

FIG. 41B shows an example method of DRX for energy saving. At 4110, one or more RRC messages may be received, for example, by a wireless device, indicating configuration of a first DRX cell group and a second DRX cell group. At 4115, DRX operations may be enabled separately on the first DRX cell group and the second DRX cell group. At 4120, a first message may be received, for example, by the wireless device, enabling cell DTX operation. At 4125, a determination may be made, for example, by the wireless device, to apply cell DTX operation on the first DRX cell group and/or the second DRX cell group, for example, based on the first message. At 4130, a second message may be received, for example, by a wireless device, disabling cell DTX operation. At 4135, DRX operations may be enabled separately on the first DRX cell group and the second DRX cell group, for example, based on the second message.

Figure 41C:
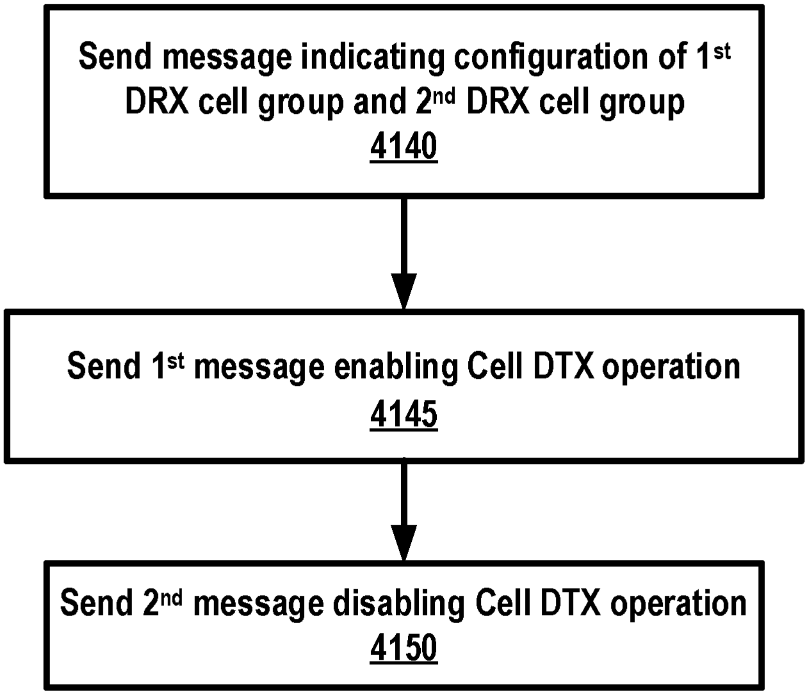
FIG. 41C shows an example method of DTX for energy saving.

FIG. 41C shows an example method of DTX for energy saving. At 4140, a message (e.g., an RRC message) may be sent, for example, by a base station, indicating configuration of a first DRX cell group and a second DRX cell group. The message may be received by one or more wireless devices. At 4145, a first message may be sent, for example, by the base station, enabling cell DTX operation. At 4150, a second message may be sent, for example, by the base station, disabling cell DTX operation.

A wireless device may receive one or more messages comprising configuration parameters of a DRX operation of a cell. The wireless device may determine that the cell is in a power-on state (or a first power state/mode) for a time duration, for example, before receiving a command indicating to enable a DTX operation in the time duration for the cell, wherein the time duration, for which the DTX operation is enabled, may comprise a first time period for which the cell is in the power-on state (the first power state/mode) and a second time period for which the cell is in a power-off state (or a second power state/mode). The wireless device may monitor, based on the configuration parameters and the determining, a PDCCH in a first DRX active time of the DRX operation. The wireless device may receive the command indicating to enable the DTX operation in the time duration. The wireless device, for example, based on enabling the DTX operation on the cell, may monitor the PDCCH in a second DRX active time of the DRX operation within the first time period of the time duration and may stop monitoring the PDCCH in a third DRX active time of the DRX operation with the second time period of the time duration.

A wireless device may receive one or more messages comprising configuration parameters of a DRX operation for a cell. The wireless device may determine that the cell is in a power-on state (or a first power state/mode) for a time duration, for example, before receiving a command indicating to enable a DTX operation in the time duration for the cell, wherein the time duration, for which the DTX operation is enabled, comprises a first time period for which the cell is in the power-on state (or the first power state/mode) and/or a second time period for which the cell is in a power-off state (or a second power state/mode). The wireless device may monitor, based on the parameters and the determining, a PDCCH in a DRX active time of the DTX operation.

The base station may send/transmit wireless device may activate the periodic RSs via the at least one PRBcell, for example, based on receiving an indication indicating an activation of the cell. The indication may comprise at least one PRB comprising the of: a SCell activation/deactivation MAC CE, DCI indicating the activation and/or a SCell state indication of a RRC message. For the first time period for which the cell is in the power-on state (or the first power state/mode), the wireless device may perform receptions, on the cell, of at least one of: a CSI-RS, a PDSCH, a PDCCH, an SIB, an SSB and/or a TRS. The wireless device may stop reception of at least one of: a CSI-RS, a PDSCH, a PDCCH, an SIB, an SSB and/or a TRS, for example, for the second time period for which the cell is in the power-off state (or the second power state/mode). The command may comprise at least one of: a RRC message, a MAC CE and/or DCI. The command may comprise at least one of: periodicity value, of the time duration, indicating a number of slots (or milliseconds), and/or a time offset value of a starting PRB and point of the time duration, relative to a reference slot. The reference slot may be a slot, with a slot index being equal to zero, of a plurality of slots in a radio frame. The command may comprise at least one of: a first length indication of the first time period and/or a second length indication of the second time period. The first length indication may comprise a timer value of a DTX on duration timer of the DTX operation.

The configuration parameters may comprise at least one of: a value of a DRX cycle of the DRX operation, a time offset value of the starting PRB being located within the third PRBspoint of the DRX cycle, relative to a reference slot, a first timer value of a DRX on duration timer, a second timer value of a DRX inactivity timer, a third timer value of a DRX retransmission timer and/or a fourth timer value of a DRX HARQ RTT timer. The DRX active time may comprise a first time interval from a first slot to a second slot, for which the DRX on duration timer of the DRX cycle is running. The wireless device may start the DRX on duration timer at the first slot and with the first timer value based on: the value of the DRX cycle of the DRX operation, a comparison between the time offset value and a gap between the first slot and the reference slot and/the first timer value. The DRX active time may comprise a first time interval from a first slot to a second slot, for which the DRX inactivity timer is running, wherein the wireless device starts the DRX inactivity timer at the first slot and with the second timer value based on receiving DCI indicating a transmission of a transport block on the cell and the second timer value.

The wireless device may skip monitoring the PDCCH in a DRX inactive time of the DRX operation. The DRX inactive time may comprise a second time interval, starting, for example, after the second slot, of the DRX cycle, for which the DRX on duration timer is not running, wherein the DRX on duration timer expires at the second slot. The wireless device may receive the command indicating to enable the DTX operation in the time duration. The wireless device, for example, based on enabling the DTX operation on the cell, may monitor the PDCCH in a second DRX active time of the DRX operation within the first time period of the time duration and stop monitoring the PDCCH in a third DRX active time of the DRX operation within the second time period of the time duration. The wireless device may stop monitoring the PDCCH in a DRX inactive time within the time duration. The DRX on duration timer of a DRX cycle may be running for the first time period of the time duration. The DRX on duration timer of a second DRX cycle may be running for the second time period of the time duration. The wireless device, based on enabling the DTX operation on the cell, may send/transmit a first CSI report for the cell in the second DRX active time of the DRX operation within the first time period of the time duration and may stop sending/transmitting a second CSI report for the cell in the third DRX active time of the DRX operation within the second time period of the time duration.

A wireless device may receive a message comprising parameters of a DRX operation for a cell. The wireless device may receive a first command indicating to enable a DTX operation in a first time duration for the cell, wherein the first time duration comprises a first time period for which the cell is in a power-on state and a second time period for which the cell is in a power-off state. The wireless device may monitor a PDCCH in a first DRX active time of the DRX operation within the first time period of the first time duration and may stop monitoring the PDCCH in a second DRX active time of the DRX operation within the second time period of the first time duration, for example, based on receiving the first command. The wireless device may receive a second command indicating to disable the DTX operation in a second time duration. The wireless device may monitor the PDCCH in a third DRX active time of the DRX operation within the second time duration and may stop monitoring the PDCCH in a fourth DRX inactive time of the DRX operation within the second time duration, for example, based on receiving the second command.

A wireless device may receive configuration parameters indicating a DRX operation for a cell and a RNTI associated with DCI comprising an energy saving indication for the cell. The wireless device may monitor a PDCCH for receiving the DCI with CRC bits being scrambled by the RNTI, regardless of whether the wireless device is in a DRX active time or a DRX inactive time of the DRX operation. The wireless device may receive the DCI comprising the energy saving indicator indicating that the cell is in energy saving state. The wireless device may maintain the DRX inactive state of the DRX operation, comprising not starting a DRX on duration timer, based on (e.g., after or in response to) receiving the DCI in the DRX inactive time, or may stop the DRX on duration timer based on (e.g., after or in response to) receiving the DC in the DRX active time, for example, based on receiving the DCI.

A wireless device may receive, from a base station, configuration parameters of a cell, indicating a DRX operation comprising PDCCH monitoring in a DRX active time and stopping PDCCH monitoring in a DRX inactive time and a DTX operation comprising sending/transmitting, by the base station, downlink signals in a DTX on duration and stopping the sending/transmitting the downlink signals in a DTX off duration. The wireless device may start a DRX on duration timer in a slot, based on the slot being within the DTX on duration. The wireless device may monitor the PDCCH in the DRX active time based on the DRX on duration timer being started. The wireless device may not start the DRX on duration timer in a second slot based on the second slot being within the DTX off duration.

A wireless device may receive configuration parameters of a cell plurality of cells being grouped into a first cell group and a second cell group, indicating a first DRX configuration associated with the first cell group and a second DRX configuration associated with the second cell group. The wireless device may receive a command indicating to enable a DTX operation in a time duration. The wireless device may determine to use the DTX operation on the first cell group based on the command. Based on the determining, the wireless device may perform the first DRX configuration for the first cell group with using the DTX operation and may perform the second DRX configuration for the second cell group without using the DTX operation.

One or more examples of FIG. 37A, FIG. 38A, FIG. 39A and/or FIG. 41A may be combined to further reduce power consumption of a wireless device and/or a base station, data transmission latency and/or signaling overhead. A wireless device may receive, for example, from a base station, one or more RRC messages comprising first parameters of a DRX configuration for the wireless device and second parameters of a DTX configuration for a cell, wherein the DTX configuration comprises periodically transitioning the cell between a first power state and a second power state. The wireless device may determine that the cell is in the first power state, after/based on receiving the messages and, for example, before receiving a command indicating to enable the DTX configuration on the cell. The wireless device may monitor, based on the first parameters and the determining that the cell is in the first power state, a PDCCH on the cell in a DRX active time of the DRX operation.

A wireless device may receive from a base station, one or more RRC messages comprising first parameters of a DRX configuration for the wireless device and second parameters of a DTX configuration for the base station, wherein in response the DTX configuration being enabled, the base station periodically transitions a cell between a first power state and a second power state. The wireless device may receive a command indicating to enable the DTX configuration on the cell, wherein after/based on receiving the messages and, for example, before receiving the command, the cell remains in the first power state.

The wireless device may monitor, based on the first parameters and the cell being in the first power state, a PDCCH on the cell in a DRX active time of the DRX operation. The wireless device may start a DRX on duration timer for the DRX configuration in a first slot, wherein the first slot is determined based on the DTX configuration being enabled for the first slot and the first slot being in a time duration for which the cell is in the first power state according to the enabled DTX configuration.

The wireless device may start a DRX on duration timer for the DRX configuration in a first slot, based on the first parameters of the DRX configuration, receiving the command indicating to enable the DTX configuration and/or the first slot being in a time duration for which the cell is in the first power state according to the enabled DTX configuration. The wireless device may not start the DRX on duration timer in a second slot based on the second slot being in a second time duration for which the cell is in the second power state according to the enabled DTX configuration. The wireless device may monitor the PDCCH in the DRX active time based on the DRX on duration timer being started.

The one or more RRC messages may comprise a RNTI associated with a DCI comprising the command indicating to enable the DTX configuration. The wireless device may monitor a second PDCCH for receiving the DCI with CRC bits being scrambled by the RNTI, regardless of whether the wireless device is in the DRX active time or in a DRX inactive time of the DRX configuration. The wireless device may maintain the DRX inactive state of the DRX operation, comprising not starting a DRX on duration timer, based on (e.g., after or in response to) receiving the DCI in the DRX inactive time, and/or stops the DRX on duration timer based on (e.g., after or in response to) receiving the DCI in the DRX active time, for example, based on receiving the DCI.

The wireless device may monitor a third PDCCH for receiving a second DCI with CRC bits being scrambled by a second RNTI for receiving a wake-up indication for the wireless device, in the DRX inactive time of the DRX configuration. The wireless device starts the DRX on duration timer, based on (e.g., after or in response to) receiving the second DCI in the DRX inactive time, wherein the second DCI comprises the wake-up indication for the wireless device, for example, based on receiving the second DCI.

The wireless device may monitor a fourth PDCCH for receiving a third DCI with CRC bits being scrambled by a third RNTI for receiving downlink assignments or uplink grants, in the DRX active time of the DRX configuration. Based on receiving the third DCI, the wireless device may restart a DRX inactivity timer based on (e.g., after or in response to) receiving the third DCI in the DRX active time, wherein the third DCI indicates downlink assignments or uplink grants.

The one or more RRC messages may indicate a plurality of cells being grouped into a first cell group and a second cell group, wherein the first cell group is associated with a first DRX configuration and the second cell group is associated with a second DRX configuration. The wireless device may receive the command indicating to enable the DTX configuration in a time duration. The wireless device may determine to use the DTX configuration on the first cell group based on the command. The wireless device may perform the first DRX configuration for the first cell group based on using the DTX configuration and/or performs the second DRX configuration for the second cell group based on not using the DTX configuration, for example, based on the determining.

A wireless device may perform a method comprising multiple operations. The wireless device may receive, from a base station, at least one message comprising: at least one first parameter associated with a discontinuous reception (DRX) configuration for the wireless device; and at least one second parameter associated with a discontinuous transmission for at least one cell associated with switching the at least one cell between a first power state and a second power state. The wireless device may determine, based on the at least one second parameter, a first command indicating to enable the DTX configuration for the at least one cell. The wireless device may monitor, based on the at least one first parameter and based on the at least one cell being in the first power state, a physical downlink control channel (PDCCH) on the cell during a DRX active time of a DRX configuration. The wireless device may receive, from the base station, at least one third parameter indicating: a plurality of cells being grouped into a first cell group and a second cell group; a first DRX configuration for the first cell group; and a second DRX configuration for the second cell group. The wireless device may receive, from the base station, a second command indicating to enable a DTX operation for the first cell group. The wireless device may enable, based on the second command, the DTX operation for the first cell group. The wireless device may enable, based on the DTX operation being enabled for the at least one cell, the first DRX configuration for the first cell group. The wireless device may receive, from the base station, a third command indicating to disable the DTX operation for the first cell group. The wireless device may enable, based on the DTX operation being disabled for the first cell group, the second DRX configuration for the second cell group. The wireless device may receive, from the base station, at least one fourth parameter indicating: the DRX operation for the at least one cell; and a radio network temporary identifier (RNTI) associated with downlink control channel information (DCI) comprising an energy saving indicator for the at least one cell, wherein the energy saving indicator indicates that the at least one cell is in an energy saving state. The wireless device may receive, from the base station, the DCI. The wireless device may stop, based on receiving the DCI during a DRX active time, a DRX on duration timer. The second power state may comprise the energy saving state. The at least one message may comprise an RNTI associated with DCI comprising the first command indicating to enable the DTX configuration. The wireless device may receive, from the base station and/or based on the at least one cell being in the first power state, one of a channel state information reference signal (CSI-RS), a physical downlink shared channel (PDSCH) transmission, the PDCCH transmission, a system information block (SIB), a synchronization signal block (SSB), or a tracking reference signal (TRS). The wireless device may stop receiving, from the base station and/or based on the at least one cell being in the second power state, at least one of a CSI-RS, a PDSCH transmission; the PDCCH transmission, an SIB, an SSB, or a TRS. The first command may comprise at least one of: a periodicity value, of a time duration, indicating an amount of a plurality of slots; and a time offset value of a starting point of the time duration, relative to a reference slot. The reference slot may be a slot, associated with a slot index of zero, of a plurality of slots in a radio frame. The first command may comprise at least one of: a first length indication of a first time period during which the at least one cell is in the first power state; and a second length indication of a second time period during which the at least one cell is in the second power state. The at least one first parameter may comprise at least one of: a value of a DRX cycle of the DRX operation; a time offset value of a starting point of a DRX cycle, relative to a reference slot; a value of a DRX on duration timer; a value of a DRX inactivity timer; a value of a DRX retransmission timer; or a value of a DRX hybrid acknowledgement repeat request (HARQ) round trip time (RTT) timer. A computing device may comprise one or more processors; and memory storing instructions that, when executed by the one or more processors, cause the computing device to perform the described method, additional operations, and/or include additional elements. A system may comprise: a wireless device configured to perform the described method, additional operations, and/or include additional elements; a base station configured to send the at least one message to the wireless device, and/or additional elements. A computer-readable medium may store instructions that, when executed, cause performance of the described method and/or additional operations.

A wireless device may perform a method comprising multiple operations. The wireless device may receive, from a base station, at least one parameter indicating: a first discontinuous reception (DRX) configuration for a first cell group; and a second DRX configuration for a second cell group. The wireless device may receive, from the base station, a command indicating to enable a discontinuous transmission (DTX) operation, for the first cell group. The wireless device may enable, based on the DTX operation being enabled for the first cell group, the first DRX configuration for the first cell group. The wireless device may receive, from the base station, a second command indicating to disable the DTX operation for the first cell group. The wireless device may enable, based on the DTX operation being disabled for the first cell group, the second DRX configuration for the second cell group. The wireless device may receive, from the base station, at least one second parameter indicating: at least one DRX operation for at least one of the plurality of cells; and a radio network temporary identifier (RNTI) associated with downlink control channel information (DCI) comprising an energy saving indicator for the at least one of the plurality of cells. The wireless device may receive, from the base station, the DCI comprising the energy saving indicator indicating that the at least one of the plurality of cells is an energy saving state. The wireless device may maintain, based on receiving the DCI during a DRX inactive time, a DRX inactive state of the DRX operation. The wireless device may stop, based on receiving the DCI during a DRX active time, a DRX on duration timer. The command may comprise at least one of: a periodicity value, of a time duration, indicating an amount of a plurality of slots; or a time offset value of a starting point of the time duration relative to a reference slot. The command may comprise at least one of: a first length indication of a first time period during which the at least one cell is in a first power state; and a second length indication of a second time during which the at least one cell is in a second power state. A computing device may comprise one or more processors; and memory storing instructions that, when executed by the one or more processors, cause the computing device to perform the described method, additional operations, and/or include additional elements. A system may comprise: a wireless device configured to perform the described method, additional operations, and/or include additional elements; a base station configured to send the one or more messages to the wireless device, and/or additional elements. A computer-readable medium may store instructions that, when executed, cause performance of the described method and/or additional operations.

A wireless device may perform a method comprising multiple operations. The wireless device may receive, from a base station, at least one parameter indicating: a discontinuous reception (DRX) operation for a cell; and a radio network temporary identifier (RNTI) associated with downlink control channel information (DCI) comprising an energy saving indicator for the cell, wherein the energy saving indicator indicates that the cell is in an energy saving state. The wireless device may receive, from the base station, the DCI. The wireless device may stop, based on receiving the DCI during a DRX active time, a DRX on duration timer. The wireless device may receive, from the base station, the DCI via a physical downlink control channel (PDCCH) during a DRX active time or during a DRX inactive time. The at least one parameter may comprise at least one of: a value of a DRX cycle of the DRX operation; a time offset value of the starting point of the DRX cycle relative to a reference slot; a value of the DRX on duration timer; a value of a DRX inactivity timer; a value of a DRX retransmission timer; or a value of a DRX hybrid acknowledgement repeat request (HARQ) round trip time (RTT) timer. A computing device may comprise one or more processors; and memory storing instructions that, when executed by the one or more processors, cause the computing device to perform the described method, additional operations, and/or include additional elements. A system may comprise: a wireless device configured to perform the described method, additional operations, and/or include additional elements; a base station configured to send the one or more messages to the wireless device, and/or additional elements. A computer-readable medium may store instructions that, when executed, cause performance of the described method and/or additional operations.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, 6G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, 6G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:

receiving, by a wireless device, at least one message comprising:

at least one first parameter associated with a discontinuous reception (DRX) configuration for the wireless device; and at least one second parameter associated with a discontinuous transmission (DTX) configuration for at least one cell associated with switching the at least one cell between a first power state and a second power state;

determining, based on the at least one message, that the at least one cell is in the first power state;

receiving, based on the at least one second parameter, a first command indicating to enable a DTX operation for the at least one cell; and monitoring, based on the at least one first parameter and based on the at least one cell being in the first power state, a physical downlink control channel (PDCCH) on the at least one cell during a DRX active time of the DRX configuration.

2. The method of claim 1, further comprising:

receiving, by the wireless device, at least one third parameter indicating a plurality of cells being grouped into a first cell group and a second cell group, wherein the at least one third parameter indicates:

a first DRX configuration for the first cell group; and a second DRX configuration for the second cell group;

receiving a second command indicating to enable a DTX operation for the first cell group;

enabling, based on the second command, the DTX operation for the first cell group; and enabling, based on the DTX operation being enabled for the at least one cell, the first DRX configuration for the first cell group.

3. The method of claim 2, further comprising:

receiving a third command indicating to disable the DTX operation for the first cell group; and enabling, based on the DTX operation being disabled for the first cell group, the second DRX configuration for the second cell group.

4. The method of claim 1, further comprising:

receiving, by the wireless device, at least one fourth parameter indicating:

a DRX operation for the at least one cell; and a radio network temporary identifier (RNTI) associated with downlink control channel information (DCI) comprising an energy saving indicator for the at least one cell, wherein the energy saving indicator indicates that the at least one cell is in an energy saving state;

receiving the DCI; and stopping, based on receiving the DCI during a DRX active time, a DRX on duration timer.

5. The method of claim 4, wherein the second power state comprises the energy saving state.

6. The method of claim 1, wherein the at least one message comprises an RNTI associated with DCI comprising the first command indicating to enable the DTX configuration.

7. The method of claim 1, further comprising receiving, by the wireless device and based on the at least one cell being in the first power state, at least one of:

a channel state information reference signal (CSI-RS);

a physical downlink shared channel (PDSCH) transmission;

a PDCCH transmission;

a system information block (SIB);

a synchronization signal block (SSB); or a tracking reference signal (TRS).

8. The method of claim 1, further comprising stopping receiving, based on the at least one cell being in the second power state, at least one of:

a CSI-RS;

a PDSCH transmission;

a PDCCH transmission;

an SIB;

an SSB; or a TRS.

9. The method of claim 1, wherein the first command comprises at least one of:

a periodicity value, of a time duration, indicating an amount of a plurality of slots; and a time offset value of a starting point, of the time duration, relative to a reference slot.

10. The method of claim 9, wherein the reference slot is a slot, associated with a slot index of zero, of a plurality of slots in a radio frame.

11. The method of claim 9, wherein the first command comprises at least one of:

a first length indication of a first time period during which the at least one cell is in the first power state; and a second length indication of a second time period during which the at least one cell is in the second power state.

12. The method of claim 1, wherein the at least one first parameter comprises at least one of:

a value of a DRX cycle of the DRX configuration;

a time offset value of a starting point of a DRX cycle, relative to a reference slot;

a value of a DRX on duration timer;

a value of a DRX inactivity timer;

a value of a DRX retransmission timer; or a value of a DRX hybrid acknowledgement repeat request (HARQ) round trip time (RTT) timer.

13. A method comprising:

receiving, by a wireless device, at least one parameter indicating a discontinuous reception (DRX) configuration for a cell group;

receiving a command indicating to enable a discontinuous transmission (DTX) operation for a cell of the cell group; and monitoring, during a time period in which the DTX operation is enabled for the cell, a physical downlink control channel (PDCCH) on the cell using the DRX configuration for the cell.

14. The method of claim 13, further comprising:

receiving a second command indicating to disable the DTX operation for the cell of the cell group; and enabling, based on the DTX operation being disabled for the cell, a second DRX configuration for a second cell group.

15. The method of claim 13, further comprising:

receiving, by the wireless device, at least one second parameter indicating:

at least one DRX operation for at least one of a plurality of cells; and a radio network temporary identifier (RNTI) associated with downlink control channel information (DCI) comprising an energy saving indicator for the at least one of the plurality of cells;

receiving the DCI comprising the energy saving indicator indicating that the at least one of the plurality of cells is an energy saving state;

maintaining, based on receiving the DCI during a DRX inactive time, a DRX inactive state; and stopping, based on receiving the DCI during a DRX active time, a DRX on duration timer.

16. The method of claim 13, wherein the command comprises at least one of:

a periodicity value, of a time duration, indicating an amount of a plurality of slots; or a time offset value of a starting point of the time duration relative to a reference slot.

17. The method of claim 13, wherein the command comprises at least one of:

a first length indication of a first time period during which the cell is in a first power state; and a second length indication of a second time period during which the cell is in a second power state.

18. A method comprising:

receiving, by a wireless device, at least one parameter indicating:

a discontinuous reception (DRX) operation for a cell; and a radio network temporary identifier (RNTI) associated with downlink control channel information (DCI) comprising an energy saving indicator for the cell, wherein the energy saving indicator indicates that the cell is in an energy saving state;

receiving the DCI indicating to enable a discontinuous transmission (DTX) operation for the cell; and stopping, during a DRX active time in which the DTX operation is enabled for the cell, a DRX timer.

19. The method of claim 18, further comprising receiving the DCI via a physical downlink control channel (PDCCH) during the DRX active time or during a DRX inactive time.

20. The method of claim 18, wherein the at least one parameter comprises at least one of:

a value of a DRX cycle of the DRX operation;

a time offset value of a starting point of the DRX cycle relative to a reference slot;

a value of the DRX on duration timer;

a value of a DRX inactivity timer;

a value of a DRX retransmission timer; or a value of a DRX hybrid acknowledgement repeat request (HARQ) round trip time (RTT) timer.

21. The method of claim 13, wherein the at least one parameter indicates a second DRX configuration for a second cell group.

* * * * *